(12) United States Patent
Ong

(10) Patent No.: US 9,679,664 B2
(45) Date of Patent: Jun. 13, 2017

(54) METHOD AND SYSTEM FOR PROVIDING A SMART MEMORY ARCHITECTURE

(71) Applicant: Adrian E. Ong, Pleasanton, CA (US)

(72) Inventor: Adrian E. Ong, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 652 days.

(21) Appl. No.: 13/936,134

(22) Filed: Jul. 5, 2013

(65) Prior Publication Data

US 2014/0157065 A1 Jun. 5, 2014
US 2016/0284422 A9 Sep. 29, 2016

Related U.S. Application Data

(63) Continuation-in-part of application No. 13/691,639, filed on Nov. 30, 2012, now Pat. No. 9,069,719.
(Continued)

(51) Int. Cl.
G11C 29/00 (2006.01)
G11C 29/12 (2006.01)
G06F 11/00 (2006.01)
G06F 21/00 (2013.01)
G06F 15/78 (2006.01)
G11C 29/42 (2006.01)
(Continued)

(52) U.S. Cl.
CPC .............. G11C 29/12 (2013.01); G06F 11/00 (2013.01); G06F 15/7821 (2013.01); G06F 21/00 (2013.01); G11C 29/42 (2013.01); G11C 29/44 (2013.01); G11C 11/16 (2013.01); G11C 13/0002 (2013.01)

(58) Field of Classification Search
CPC ......... G11C 29/50; G11C 29/56; G11C 29/48; G11C 29/44; H05K 999/99
USPC ......................................................... 714/718
See application file for complete search history.

(56) References Cited

U.S. PATENT DOCUMENTS 6,138,249 A 10/2000 Nolet
6,272,588 B1 * 8/2001 Johnston ............... G11C 29/028
365/201
(Continued)

FOREIGN PATENT DOCUMENTS

CN 101647004 B 2/2010
CN 102479556 A 5/2012

*Primary Examiner* — Albert Decady
*Assistant Examiner* — Enam Ahmed
(74) *Attorney, Agent, or Firm* — Renaissance IP Law Group LLP

(57) ABSTRACT

A smart memory system preferably includes a memory including one or more memory chips, and a processor including one or more memory processor chips. The system may include a smart memory controller capable of performing a bit error rate built-in self test. The smart memory control may include bit error rate controller logic configured to control the bit error rate built-in self test. A write error rate test pattern generator may generate a write error test pattern for the bit error rate built-in self test. A read error rate test pattern generator may generate a read error test pattern for the built-in self test. The smart memory controller may internally generate an error rate timing pattern, perform built-in self test, measure the resulting error rate, automatically adjust one or more test parameters based on the measured error rate, and repeat the built-in self test using the adjusted parameters.

30 Claims, 42 Drawing Sheets

Related U.S. Application Data

(60) Provisional application No. 61/597,773, filed on Feb. 11, 2012.

(51) Int. Cl.
    *G11C 29/44*    (2006.01)
    *G11C 11/16*    (2006.01)
    *G11C 13/00*    (2006.01)

(56) References Cited

U.S. PATENT DOCUMENTS

| | | |
|---|---|---|
| 6,480,972 B1 | 11/2002 | Cromer et al. |
| 6,584,589 B1 | 6/2003 | Tran et al. |
| 6,657,914 B1 | 12/2003 | Ong et al. |
| 6,754,866 B1 | 6/2004 | Ong et al. |
| 6,760,865 B2 | 7/2004 | Ledford et al. |
| 6,904,389 B2 | 6/2005 | Hornberger et al. |
| 6,950,334 B2 | 9/2005 | Shimizu et al. |
| 7,365,557 B1 | 4/2008 | Ong |
| 7,466,160 B2 | 12/2008 | Ong et al. |
| 7,466,603 B2 | 12/2008 | Ong |
| 7,533,309 B2 * | 5/2009 | Mukherjee ............ G11C 29/10 365/201 |
| 7,664,993 B2 | 2/2010 | Alladi et al. |
| 7,673,193 B1 | 3/2010 | Ong et al. |
| 7,768,847 B2 | 8/2010 | Ong et al. |
| 7,779,311 B2 | 8/2010 | Ong |
| 8,042,012 B2 | 10/2011 | Baker |
| 2004/0128591 A1 * | 7/2004 | Ihs .................... G01R 31/31709 714/704 |
| 2005/0281112 A1 * | 12/2005 | Ito ......................... G11C 11/406 365/222 |
| 2006/0259814 A1 | 11/2006 | Korhonen |
| 2008/0181033 A1 * | 7/2008 | Clinton ................. G11C 11/413 365/194 |
| 2009/0161442 A1 * | 6/2009 | New ....................... G11C 7/08 365/189.04 |
| 2010/0130139 A1 * | 5/2010 | Panikkath ................ H03L 7/08 455/76 |
| 2010/0283480 A1 * | 11/2010 | Nagatani ......... G01R 31/31709 324/555 |
| 2010/0332942 A1 * | 12/2010 | Wezelenburg ...... G06F 11/1048 714/763 |
| 2012/0146965 A1 * | 6/2012 | Baek .................... G09G 3/006 345/204 |

* cited by examiner

Table 1: Pin Out

| Symbol | Number of Pins | Type | Description |
|---|---|---|---|
| RD | 1 | Input | Read enable |
| WR | 1 | Input | Write enable |
| A<0:j> | j+1 | Input | Address |
| DQ<0:n> | n+1 | I/O | Data I/O |
| ACK | 1 | Output | Acknowledge |
| Vdd | TBD | Power | Supply Voltage |
| Vss | TBD | Ground | Supply Ground |

FIG. 15A

Table 2: Command Table

| RD | WR | Mode | I/O Pin | Address | ACK Output |
|---|---|---|---|---|---|
| L | L | Stand-by | Hi-Z | X | H |
| H | L | Read | $D_{OUT}$ | Valid | H → L → H |
| L | H | Write | $D_{IN}$ | Valid | H → L → H |

FIG. 15B

| Description | Symbol | Min | Max | Units |
|---|---|---|---|---|
| Input Set-up Time | tS | 2.5 | - | ns |
| Input Hold Time | tH | 2.5 | - | ns |
| Pre-charge Time | tPRE | 5 | - | ns |
| Read Start Time | tRD | - | 2 | ns |
| Read Hold Time | tRH | User defined | - | ns |
| Read Pulse Width | tRP | - | 10 | ns |
| Access Time | tAC | 1 | - | ns |
| Data Hold Time | tOH | - | 1 | ns |

| Description | Symbol | Min | Max | Units |
|---|---|---|---|---|
| Input Set-up Time | tS | 2.5 | - | ns |
| Input Hold Time | tH | 2.5 | - | ns |
| Pre-charge Time | tPRE | 5 | - | ns |
| Write Start Time | tWR | - | 2 | ns |
| Write Hold Time | tWH | 5 | - | ns |
| Write Pulse Width | tWP | 15 | - | ns |
| Output High-Z to Data-in Active | tZD | 5 | - | ns |
| ACK Pulse width | tACK | 3 | - | ns |

METHOD AND SYSTEM FOR PROVIDING A SMART MEMORY ARCHITECTURE

CROSS-REFERENCES TO RELATED APPLICATIONS

This application is a continuation-in-part of commonly assigned application Ser. No. 13/691,639, filed Nov. 30, 2012, entitled "METHOD AND SYSTEM FOR PROVIDING A SMART MEMORY ARCHITECTURE," which claims the benefit of commonly assigned provisional application Ser. No. 61/597,773, filed Feb. 11, 2012, entitled "A METHOD AND SYSTEM FOR PROVIDING A SMART MEMORY ARCHITECTURE," the contents of which are incorporated herein by reference in their entirety.

BACKGROUND

The present inventive concepts relate to a smart memory architecture, and more particularly to a method and system for providing a smart memory architecture for resistive type memory.

The present inventive concepts relate to memory systems for storing and retrieving information from memory integrated circuits, including static random access memory (SRAM), dynamic random access memory (DRAM), Flash memory, phase-change random access memory (PCRAM), spin-transfer torque random access memory (STT-RAM), magnetic random access memory (MRAM), resistive random access memory (RRAM), and future memory devices. Inventive aspects described herein are particularly well-suited for memories such as STT-RAM, MRAM and RRAM memories, which exhibit probabilistic-type characteristics and relatively high error rates.

Semiconductor memory devices have been widely used in electronic systems to store data. There are two general types of semiconductor memories: non-volatile and volatile memories. A volatile memory device, such as a Static Random Access Memory (SRAM) or a Dynamic Random Access Memory (DRAM), loses its data when the power applied to it is turned off. A non-volatile semiconductor memory device, however, such as a Flash, Erasable Programmable Read Only Memory (EPROM) or a magnetic random access memory (MRAM), retains its charge even after the power applied thereto is turned off. Where loss of data due to power failure or termination is unacceptable, a non-volatile memory is therefore used to store the data.

FIGS. 1A-1D are simplified, schematic cross-sectional illustrations of a magnetic tunnel junction (MTJ) structure 10 used in forming a spin transfer torque (STT) MRAM cell. Referring to FIGS. 1A-1D, an MTJ 10 is shown as including, in part, a reference layer 12, a tunneling layer 14, and a free layer 16. The reference layer 12 and the free layer 16 can be ferromagnetic layers, while the tunneling layer 14 is a nonmagnetic layer. The direction of magnetization of reference layer 12 is fixed during manufacture and therefore does not change during operation of the STT-RAM memory device. However, the direction of magnetization of the free layer 16 can be varied during operation by passing a current of the required strength through the MTJ structure.

In FIG. 1A, the reference layer 12 and the free layer 16 are shown having the same directions of magnetization, i.e., in a parallel magnetic state. In FIG. 1B, the reference layer 12 and the free layer 16 are shown having opposite magnetization directions, i.e., in an anti-parallel state. In FIG. 1C, the reference layer 12 and the free layer 16 are shown having the same magnetization direction (parallel state), with the magnetization direction perpendicular to a plane defined by the interface of free layer 16 and tunneling layer 14. In FIG. 1D, the reference layer 12 and the free layer 14 are shown having opposite magnetization directions (anti-parallel state), where the magnetization directions are perpendicular to a plane defined by the interface of free layer 16 and tunneling layer 14.

To switch from the parallel state, as shown in FIGS. 1A and 1C, to the anti-parallel state, as shown in FIGS. 1B and 1D, the voltage potential of reference layer 12 is increased relative to that of free layer 16. This voltage difference causes spin polarized electrons flowing from free layer 16 to reference layer 12 to transfer their angular momentum and change the magnetization direction of free layer 16 to the anti-parallel state. To switch from the anti-parallel state to the parallel state, the voltage potential of free layer 16 is increased relative to that of reference layer 12. This voltage difference causes spin polarized electrons flowing from reference layer 12 to free layer 16 to transfer their angular momentum and change the magnetization direction of free layer 16 to the parallel state.

To switch from the parallel state to the non-parallel state or vice versa, the voltage applied to MTJ 10 and the corresponding current flowing through MTJ must each be greater than a respective pair of threshold values. The voltage that must exceed a threshold voltage in order for the switching to occur is also referred to as the switching voltage $V_c$. Likewise, the current that must exceed a threshold current in order for the switching to occur is referred to as the switching current $I_c$.

As is well known, when free layer 16 and reference layer 12 have the same magnetization direction (i.e., parallel state), MTJ 10 has a relatively low resistance. Conversely, when free layer 16 and reference layer 12 have the opposite magnetization direction (i.e., anti-parallel state), MTJ 10 has a relatively high resistance. This difference in resistance values provides the ability of the MTJ 10 to act as a memory storage device. Due to the physical properties of an MTJ, the critical current required to change an MTJ from a parallel state to an anti-parallel state is often greater than the critical current required to change the MTJ from an anti-parallel state to a parallel state.

FIG. 2A shows a magnetic tunnel junction (MTJ) 10, which forms a variable resistor in an STT-MRAM type memory cell, and an associated select transistor 20, together forming an STT-MRAM cell 30. The MTJ 10 includes a reference or pinned layer 12, a free layer 16, and a tunneling layer 14 disposed between the reference layer 12 and the free layer 16. Transistor 20 is often an NMOS transistor due to its inherently higher current drive, lower threshold voltage, and smaller area relative to a PMOS transistor. The current used to write a "1" in MRAM 30 can be different than the current used to write a "0". The asymmetry in the direction of current flow during these two write conditions is caused by the asymmetry in the gate-to-source voltage of transistor 20.

In the following description, an MRAM cell is defined as being in a logic "0" state when the free and reference layers of its associated MTJ are in a parallel (P) state, i.e., the MTJ exhibits a low resistance. Conversely, an MRAM cell is defined as being in a logic "1" state when the free and reference layers of its associated MTJ are in an anti-parallel (AP) state, i.e., the MTJ exhibits a high resistance. It will be understood that in other embodiments, the MRAM cell can be defined as being in the logic "0" state when in an AP state, and the logic "1" state when in a P state. Furthermore, in the following, it is assumed that the reference layer of the MTJ 10 faces its associated select transistor, as shown in FIG. 2A.

Therefore, in accordance with the discussion above, a current flowing along the direction of arrow 35 (i.e., the up direction) either (i) causes a switch from the P state to the AP state thus to write a "1", or (ii) stabilizes the previously established AP state of the associated MTJ. Likewise, a current flowing along the direction of arrow 40 (i.e., the down direction) either (i) causes a switch from the AP state to the P state thus to write a "0", or (ii) stabilizes the previously established P state of the associated MTJ. It is understood, however, that in other embodiments this orientation may be reversed so that the free layer of the MTJ faces its associated select transistor. In such embodiments (not shown), a current flowing along the direction of arrow 35 either (i) causes a switch from the AP state to the P, or (ii) stabilizes the previously established P state of the associated MTJ Likewise, in such embodiments, a current flowing along the direction of arrow 40 either (i) causes a switch from the P state to the AP state, or (ii) stabilizes the previously established AP state.

FIG. 2B is a schematic representation of MRAM 30 of FIG. 2A in which MTJ 10 is shown as a storage element whose resistance varies depending on the data stored therein. The MTJ 10 changes its state (i) from P to AP when the current flows along arrow 35, and/or (ii) from AP to P when the current flows along arrow 40.

The voltage required to switch the MTJ 10 from an AP state to a P state, or vice versa, must exceed the critical switching voltage, $V_{c0}$. The current corresponding to this voltage is referred to as the critical or switching current $I_{c0}$. While the specified critical value $V_{c0}$ and related critical switching current $I_{c0}$ can be defined in various ways, such values can be selected based on a 50% switching probability of the memory cell within a specified time. In other words, the critical switching current $I_{c0}$ can be selected or otherwise determined based on the design of the MTJ 10 and/or based on measurements of the probability of switching at a particular critical value $V_{c0}$ and/or switching current $I_{c0}$. When the threshold critical switching current $I_{c0}$ is satisfied, there can be a 50% chance that the stored memory bit switches values (e.g., from a "0" to a "1" or a "1" to a "0"). An overdrive current is applied to guarantee that switching occurs at an error rate that is acceptable to meet standard reliability expectations. This overdrive current, or switching current, $I_{sw}$, may be 1.3 times, 1.5 times, 2 times, or more than 2 times the value of $I_{c0}$. For example, if the $I_{c0}$ for an MTJ device is 7 microamps (uA) at a 20 nanosecond (ns) write pulse width, then the $I_{sw}$ used to reliably switch the states of the MTJ may be 11 uA or greater.

In some cases, the "safe" write current (e.g., where the write error rate is less than about 10 e−9) may be 1.5 to 2 times the critical switching current $I_{c0}$ for a certain period of time, for example, 10 nanoseconds. To read the bit value back out of the memory cell, a relatively "safe" read current can be applied (e.g., where the read error rate is less than about 10 e−9). For example, the "safe" read current may be 0.2 times (i.e., 20%) of the critical switching current $I_{c0}$. By way of another example, if the critical switching current $I_{c0}$ is 6 microamps (uA), then the write current under a normal operation mode can be at least 12 uA, or thereabout, and the read current under a normal operating mode can be less than 1.2 uA, or thereabout. In this manner, the probability of the memory cell properly switching under a normal write condition is very high, in some cases near 100%. Similarly, the probability of accidentally switching the value of the memory cell under a normal read condition can be very low, in some cases near zero.

Once in the AP state, removing the applied voltage does not affect the state of the MTJ 10. Likewise, to transition from the AP state to the P state under the normal operating mode, a negative voltage of at least $V_{c0}$ is applied so that a current level of at least the switching current $I_{c0}$ flows through the memory cell in the opposite direction. Once in the P state, removing the applied voltage does not affect the state of the MTJ 10.

In other words, MTJ 10 can be switched from an anti-parallel state (i.e., high resistance state, or logic "1" state) to a parallel state so as to store a "0" (i.e., low resistance state, or logic "0" state). Assuming that MTJ 10 is initially in a logic "1" or AP state, to store a "0", under the normal operating mode, a current at least as great or greater than the critical current $I_{c0}$ is caused to flow through transistor 20 in the direction of arrow 40. To achieve this, the source node (SL or source line) of transistor 20 is coupled to the ground potential via a resistive path (not shown), a positive voltage is applied to the gate node (WL or wordline) of transistor 20, and a positive voltage is applied to the drain node (BL or bitline) of transistor 20.

As mentioned above, MTJ 10 can also be switched from a parallel state to an anti-parallel state so as to store a "1". Assuming that MTJ 10 is initially in a logic "0" or P state, to store a "1", under the normal operating mode, a current at least as great or greater than the critical current $I_{c0}$ is caused to flow through transistor 20 in the direction of arrow 35. To achieve this, node SL is supplied with a positive voltage via a resistive path (not shown), node WL is supplied with a positive voltage, and node BL is coupled to the ground potential via a resistive path (not shown).

FIG. 3 represents the variation in the MTJ state (or its resistance) during various write cycles. To transition from the P state (low resistance state) to AP state (high resistance state), a positive voltage at least as great or greater than the critical switching voltage $V_{c0}$ is applied. Once in the AP state, removing the applied voltage does not affect the state of the MTJ. Likewise, to transition from the AP state to the P state, a negative voltage less than the critical switching voltage $V_{c0}$ is applied. Once in the P state, removing the applied voltage does not affect the state of the MTJ. The resistance of the MTJ is $R_{high}$ when it is in the AP state. Likewise, the resistance of the MTJ is $R_{low}$ when it is in the P state.

FIG. 4A shows an MTJ 10 being programmed to switch from an anti-parallel state (i.e., high resistance state, or logic "1" state) to a parallel state so as to store a "0" (i.e., low resistance state, or logic "0" state). In this Figure, it is assumed that the MTJ 10 is initially in a logic "1" or AP state. As described above, to store a "0", a current $I_{sw}$ at least as great or greater than the critical current $I_{c0}$ is caused to flow through transistor 20 in the direction of arrow 40. To achieve this, the source node (SL) of transistor 20 is coupled to the ground potential via a resistive path (not shown), a positive voltage $V_{PP}$ is applied to the gate node (WL or wordline) of transistor 20, and a positive voltage $V_{CC}$ is applied to the drain node (BL or bitline) of transistor 20.

FIG. 5 is an exemplary timing diagram of the voltage levels at nodes WL, SL, SN and BL during a write "0" operation, occurring approximately between times 25 ns and 35 ns, and a write "1" operation, occurring approximately between times 45 ns and 55 ns, for a conventional MTJ such as MTJ 10 shown in FIGS. 4A and 4B. The supply voltage $V_{CC}$ is assumed to be about 1.8 volts. The wordline signal WL, as well as the column select signal CS, are shown as having been boosted to a higher $V_{PP}$ programming voltage of 3.0 volts. During the write "0" operation, the voltages at nodes BL, SL and SN are shown as being approximately equal to 1.43V, 0.34V, and 0.88V respectively. During the write "1" operation, the voltages at nodes BL, SL and SN are shown as being approximately equal to 0.23V, 1.43V, and 0.84V respectively. Although not shown, for this exemplary computer simulation, the currents flowing through the MTJ during write "0" and "1" operations are 121 µA and 99.2 µA, respectively.

FIG. 4B shows an MTJ being programmed to switch from a parallel state to an anti-parallel state so as to store a "1". It is assumed that MTJ 10 is initially in a logic "0" or P state. To store a "1", a current $I_{sw}$ that is greater than the critical current $I_{c0}$ is caused to flow through transistor 20 in the direction of arrow 35. To achieve this, node SL is supplied with the voltage $V_{CC}$ via a resistive path (not shown), node WL is supplied with the voltage $V_{PP}$, and node BL is coupled to the ground potential via a resistive path (not shown). Accordingly, during a write "1" operation, the gate-to-source voltage of transistor 20 is set to $(V_{WL}-V_{SN})$, and the drain-to-source voltage of transistor 20 is set to $(V_{SL}-V_{SN})$. This STT-RAM type memory cell can provide an excellent non-volatile memory solution.

Unfortunately, with STT-RAM or any other type of memory chip, manufacturing or other defects may result in not all memory cells on a memory chip functioning properly. During memory repair, a memory chip may be tested and failed memory elements replaced by redundant memory elements. Typically called laser repair, this memory repair is generally performed after the first wafer sort test. A laser is used to blow the memory fuse banks to disable the defective memory elements and replace them with the redundant elements. Memory repair is not made available to the memory's end-user.

Various memory systems have been proposed to provide memory access, secure data storage, data verification and recovery, data testing, and memory repair. These systems include, for instance, U.S. Pat. No. 6,657,914, entitled "CONFIGURABLE ADDRESSING FOR MULTIPLE CHIPS IN A PACKAGE"; U.S. Pat. No. 6,754,866, entitled "TESTING OF INTEGRATED CIRCUIT DEVICE"; U.S. Pat. No. 7,365,557, entitled "INTEGRATED TESTING MODULE INCLUDING DATA GENERATOR"; U.S. Pat. No. 7,466,160, entitled "SHARED MEMORY BUS ARCHITECTURE FOR SYSTEM WITH PROCESSOR AND MEMORY UNITS"; U.S. Pat. No. 7,466,603, entitled "MEMORY ACCESSING CIRCUIT SYSTEM"; U.S. Pat. No. 7,673,193, entitled "PROCESSOR-MEMORY UNIT FOR USE IN SYSTEM-IN-PACKAGE AND SYSTEM-IN-MODULE DEVICES"; U.S. Pat. No. 7,768,847, entitled "PROGRAMMABLE MEMORY REPAIR SCHEME"; and U.S. Pat. No. 7,779,311 entitled "TESTING AND RECOVERY OF MULTILAYER DEVICE", the contents of each of which are hereby incorporated by reference in their entirety.

Although these and other systems have addressed similar problems to those addressed by the present inventive principles, they have not been designed for, or applied specifically to, memory with high error rates and probabilistic tendencies such as PCRAM, MRAM, and RRAM devices. In particular, U.S. Pat. No. 7,673,193 describes an apparatus and method for a processor memory unit for use in system-in-package (SiP) and system in module (SiM) integrated circuit devices which includes a processing module, a memory module, and a programmable system module. The programmable system module is configured to function as an interface between the memory module and a testing device to facilitate integration and testing of processor-memory units including functional components having different communication protocols. The interface layer (system module) 120 can include process specific signal processing algorithms for yield enhancement, data compression, test algorithms, power management, etc. This system is particularly useful for multi-chip DRAM plus logic interface products. According to additional features and embodiments incorporating principles of the inventive concept, however, the usefulness of this type of system can be extended to Flash memory, PCRAM, MRAM, RRAM, and future memory devices.

BRIEF SUMMARY

According to features and principles of the present inventive concepts, a smart memory system preferably allows memories with high error rates and slow read/write times relative to a logic processor to work reliably and seamlessly. These inventive features can provide particularly useful benefits for memories suffering from probabilistic tendencies and higher error rates. Among other things, a smart memory system incorporating principles of the present inventive concept can be configured to allow non-volatile memory bits with a high write error rate to be used by tagging the failed location and corresponding data, and by then performing re-writes at a convenient time or by simply masking the failed location and re-writing the data to a different location.

Some features of embodiments incorporating one or more of the present inventive concepts may include a common asynchronous memory bus with acknowledge signaling to guarantee write and read success. The handshaking memory interface may allow for process-independent, voltage-independent, and temperature-independent operation by using internal read and write tracking and verifying schemes.

The system may further be configured to dynamically monitor memory system failures and record fail locations and error types by storing them in a memory controller non-volatile memory (NVM). The system can further be configured to recall the fail location and type of failure from the NVM table and perform an appropriate fix based on the type of failure. These fixes can, for instance, include re-writing the data, repairing the memory, isolating the failed memory location, or other appropriate fixes.

The system may further be configured to provide refresh cycles to the memory with poor retention characteristics. An initial stress test may be provided by a smart controller to screen for weakness in the memory. Based on failure modes and stress level (voltage, current, temperature, etc) statistical data, the smart memory can be automatically configured to provide a certain fix refresh interval. The refresh interval can be 3 seconds, 10 days, 5 weeks, 2 months, or more, for example. The time can be determined by an internal very low power clock. Refresh cycle consists of reading the entire memory and then re-writing the same data. The circuitry can be internal to the memory to implement the read and re-write function similar to the write-verify re-write circuitry.

The smart memory system may further be configured to permit on-chip testing even after implementation in an end-user device by allowing external Automated Test Equipment (ATE) direct access to the system memory. The ATE can schedule and perform a test pattern to test the system memory based, for instance, on a user request, an automatic test schedule, or in response to detected memory errors.

The smart memory system can also be configured to implement power management technologies. These power management technologies can, for instance, control SA read current, control SA clamp voltages, control SA read delay, control write voltage, control periphery voltage during stand-by, and/or manage other power requirements of the memory device.

A RISC processor or other types processors can also be included in the smart memory system, such as in the memory controller, to perform simple and/or complex computations on the data before storing it into the main system memory. This can provide added value for the smart memory system by allowing the device processor to offload various tasks to the memory controller processor and thereby free up device resources for other processes.

According to one specific embodiment incorporating principles of the present inventive concept, a smart memory system can comprise a memory consisting of one or more memory chips fabricated using memory processes, and a processor consisting of one or more memory processor chips fabricated using logic processes. The processor may, for instance, include a common address/data/control memory bus configured to provide an asynchronous handshaking interface between the memory array and the memory processor. The processor can also include a mechanism for offloading Write Error Tag memory data from the memory chip for analysis. Program logic for memory address reconfiguration can also be included, as well as power management logic.

The memory may also include a common address/data/control memory bus that provides an asynchronous handshaking interface between the memory array and memory processor. Write Error Tag and write/verify WRITE circuits can also be included in the memory along with a Design for Test (DFT) circuit for performing a fast parallel retention test. A test interface can also be included for SiP memory testing. Control registers and multiplexing circuitry are also preferably provided for address reconfiguration, and separate power planes and gating circuitry can be included for power management.

Various benefits can be provided by the present inventive principles, including, among other things enabling compatibility to multiple systems. Configurable address schemes can be used which support multiple processors and peripherals, along with a programmable and memory-type independent I/O interface.

Certain of the inventive features may be best achieved by implementing them in a System-in-Package (SiP) or System-on-Chip (SoC). Such implementations need good connectivity between a memory array and memory processor chips. This may be accomplished, for instance, using True Silicon Via (TSV) or other SiP technology. Using low latency and high throughput SiP interconnects can provide improved system performance. The cost disadvantages of such a system may be minimized as SiP interconnect technology costs continue to decrease.

The inventive principles can also enable reduced power consumption by reducing I/O loading using SiP solutions, by providing clock-less memory operation, and/or by shutting down unused memory sections. Voltage control, temperature compensation, and asynchronous timing circuitry can also help reduce power consumption and provide more efficient operation.

Other principles allow the device processor to offload repetitive computations or other tasks to the smart memory system. For instance, an ARM, MIPs, or other desired proprietary processor combination can be provided in the memory controller or other area of the smart memory system to perform various processing tasks to free up device resources.

Memory monitoring, repair, correction, and re-assignment can also be performed by the smart memory controller according to principles of the present inventive concept. ECC, anti-fuse repair, error masking, read-compare-write, weak bit replacement, and other error correction technologies can be implemented in the smart memory system to enhance data stability and reduce error rates.

In accordance with one embodiment incorporating principles of the present inventive concept, a memory circuit can include, in part, a compare block configured to compare a first data adapted to be stored in a memory cell to a second data previously stored in the memory cell. The compare block is further configured to store an address of the memory cell in which the second data is stored if the second data does not match the first data. The memory cell is written to during subsequent write cycles. The address may be stored in a tag memory. The memory cell may, for instance, be a DRAM, SRAM, ROM, PROM, EEPROM, FLASH, FeRAM, PCRAM, RRAM, MRAM or STT-MRAM cell.

In some embodiments, the memory circuit can further include a memory array, a write block and a read block. The write block can be coupled between the memory array and the compare block. The read block can be coupled between the memory array and the compare block such that the read block is adapted to sense the second data. The memory circuit may further include control logic configured to store an inverse of the second data to the memory cell when the memory cell is not being accessed for a normal write operation by a device external to the memory.

In one embodiment, the memory array can include at least one column coupled to a multitude of the memory cells. The column includes a first signal line and a second signal line. The memory cell includes a first current carrying terminal coupled to the first signal line, a second current carrying terminal coupled to the second signal line and a control terminal coupled to a word-line. The memory cell may further include a magnetic tunnel junction and a first transistor. The magnetic tunnel junction can have a first terminal coupled to the first current carrying terminal of the memory cell. The first transistor can have a first current carrying terminal coupled to the second current carrying terminal of the non-volatile memory cell, a gate terminal coupled to the control terminal of the non-volatile memory cell, and a second current carrying terminal coupled to a second terminal of the magnetic tunnel junction.

In accordance with one embodiment, a method of correcting write errors during a write operation in a memory circuit can include comparing a first data adapted to be stored in a memory cell to a second data previously stored in the memory cell during a write operation, storing an address of the memory cell in which the second data is stored if the second data does not match the first data, and writing to the memory cell during subsequent write cycles to correct the write error. The method can further include latching the address of the memory cell, latching the first data, writing the first data into a memory array at the address of the memory cell, and sensing the second data during the write operation.

In accordance with another aspect, a method of correcting write errors during a write operation in a memory circuit can include comparing a first data adapted to be stored in a memory cell to a second data previously stored in the memory cell during a write operation, inverting the second data if the second data does not match the first data and writing the inverted second data to an address of the memory cell in which the second data is stored if the second data does not match the first data to correct the write error. The method can further include latching the address of the memory cell, latching the first data, writing the first data into a memory array at the address of the memory cell and sensing the second data during the write operation.

In accordance with yet another aspect, a method of correcting write errors after a write operation in a memory circuit can include loading an address of a memory cell in which a second data is stored if the second data does not match a first data after a write operation, sensing the second data, inverting the second data and writing the inverted second data to an address of the memory cell in which the second data is stored to correct the write error.

Some embodiments may include a method for providing a bit error rate built-in self test on a memory device. The method may include, for example, entering a test mode, internally generating, by the memory device, an error rate timing pattern, performing, by the memory device, the bit error rate built-in self test based on the internally generated error rate timing pattern, measuring the error rate resulting from the bit error rate built-in self test, adjusting, based on the measured error rate, one or more test parameters, and repeating the bit error rate built-in self test using the adjusted parameters.

Some embodiments may include a method for providing a bit error rate built-in self test on a memory device. The method may include performing, by the memory device, at least one of a write error rate built-in self test and a read error rate built-in self test, analyzing results of the at least one of the write error rate built-in self test and the read error rate built-in self test, and automatically adjusting one or more test parameters responsive to the analysis.

In accordance with some embodiments, a memory device includes bit error rate controller logic configured to control a bit error rate built-in self test, an address and data generator coupled to the bit error rate control logic, an on-chip oscillator configured to generate an internal reference clock for the bit error rate built-in self test, a write error rate test pattern generator configured to generate a write error test pattern for the bit error rate built-in self test, and a read error rate test pattern generator configured to generate a read error test pattern for the bit error rate built-in self test.

In still further embodiments, a non-volatile memory (NVM) program memory can be utilized to store information regarding failed address locations and the type of error. The NVM program memory can further be used to reassign addresses of failed memory locations to new memory locations. A memory controller of the smart memory system can interface with the NVM program memory to perform memory tests, reassign memory addresses, perform memory refreshes, or take other appropriate action based on the error information stored in the NVM program memory.

BRIEF DESCRIPTION OF THE DRAWINGS

The foregoing and additional features and advantages of the present inventive principles will become more readily apparent from the following detailed description, made with reference to the accompanying figures, in which:

FIGS. 15A and 15B are a pin out table and command table, respectively, according to inventive concepts.

DETAILED DESCRIPTION

Figure 1A:
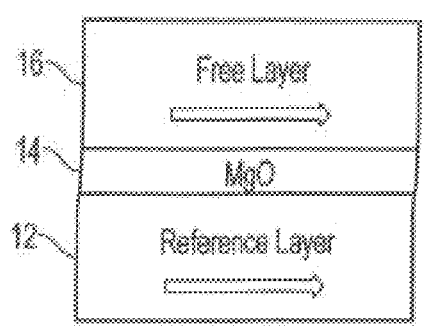
FIG. 1A is a simplified schematic, cross-sectional view of a magnetic tunnel junction structure of a magnetic random access memory cell when placed in a parallel magnetization state, as known in the related art.
Figure 1B:
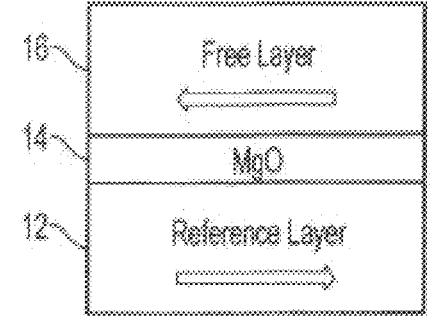
FIG. 1B is a simplified schematic, cross-sectional view showing the magnetic tunnel junction structure of FIG. 1A when placed in an anti-parallel magnetization state, as known in the related art.
Figure 1C:
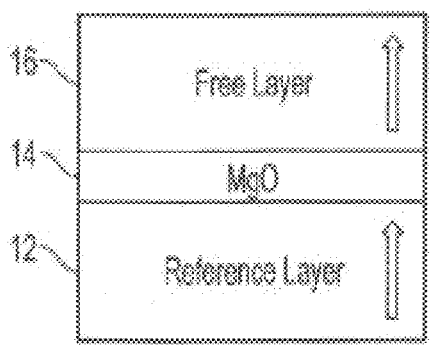
FIG. 1C is a simplified schematic, cross-sectional view of a magnetic tunnel junction structure of a magnetic random access memory (MRAM) cell when placed in a parallel magnetization state, as known in the related art.
Figure 1D:
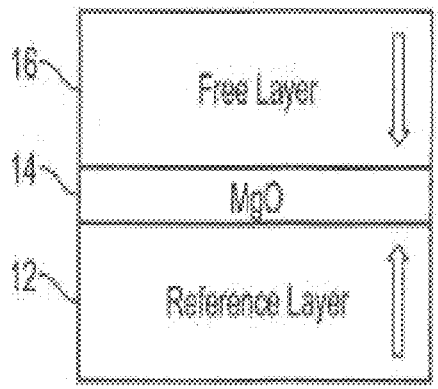
FIG. 1D is a simplified schematic, cross-sectional view showing the magnetic tunnel junction structure of FIG. 1C when placed in an anti-parallel magnetization state, as known in the related art.
Figure 2A:
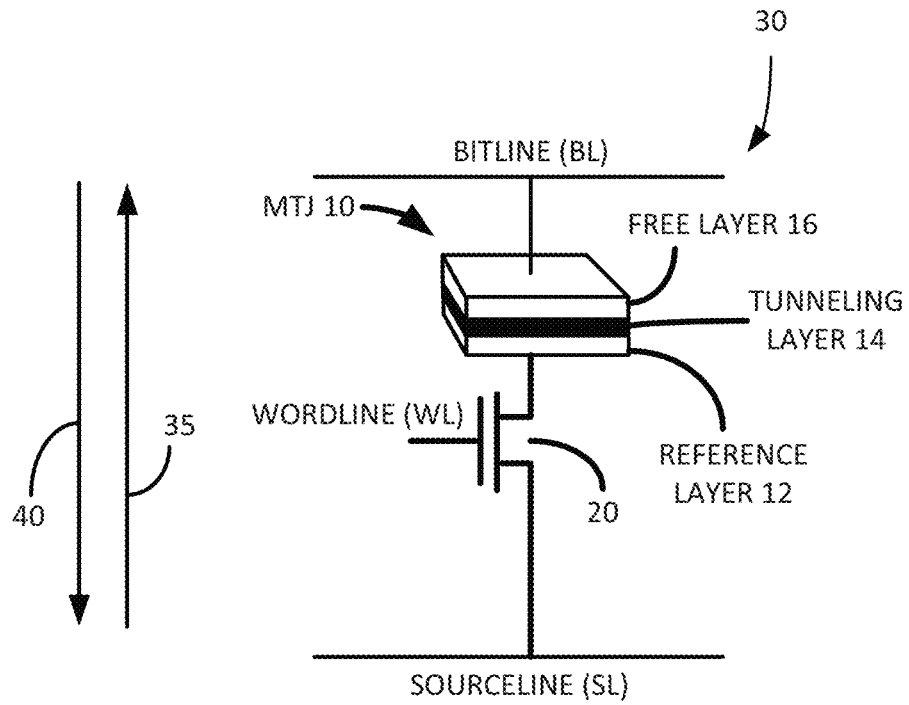
FIG. 2A is a schematic illustration showing layers of a magnetic tunnel junction structure coupled to an associated select transistor, as known in the related art.
Figure 2B:
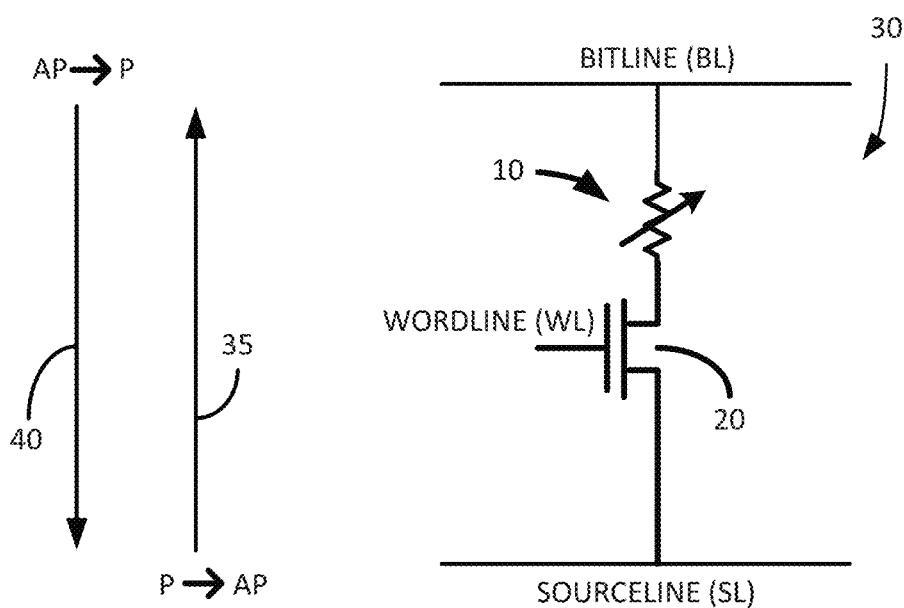
FIG. 2B is a schematic representation of the magnetic tunnel junction structure and its associated select transistor of FIG. 2A, as known in the related art.
Figure 3:
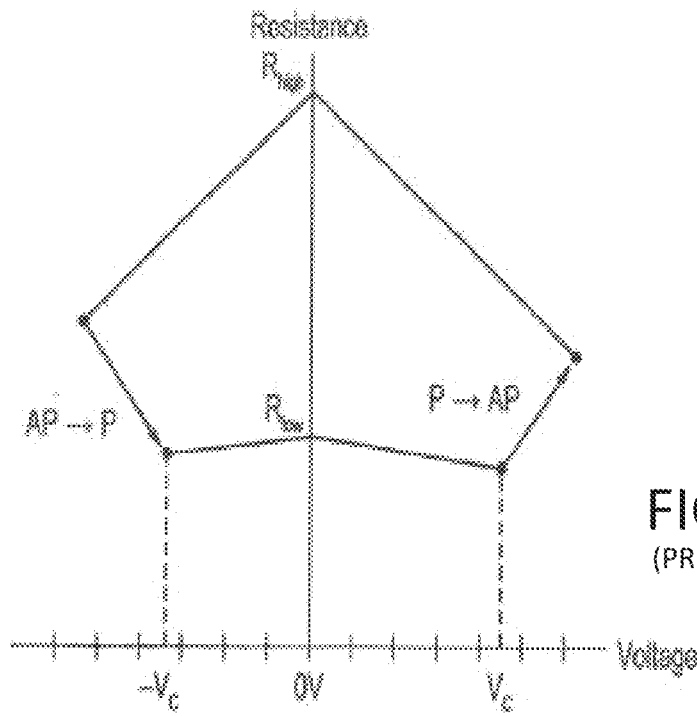
FIG. 3 is a graphical illustration showing the variation in the resistance of the magnetic tunnel junction structure of FIG. 2A in response to applied voltages, as known in the related art.
Figure 4A:
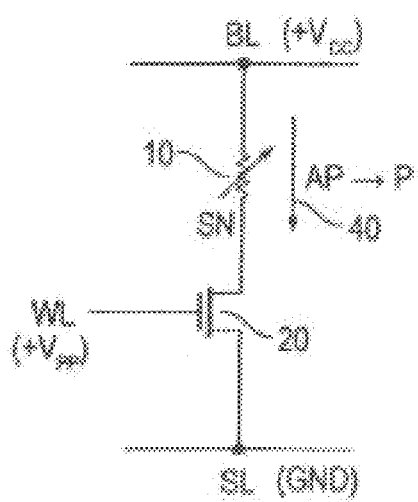
FIG. 4A is a schematic diagram showing a magnetic tunnel junction structure being programmed to switch from an anti-parallel state to a parallel state, as known in the related art.
Figure 4B:
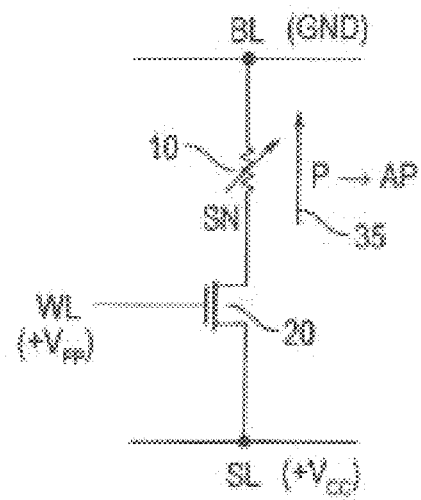
FIG. 4B is a schematic diagram showing a magnetic tunnel junction structure being programmed to switch from a parallel state to an anti-parallel state, as known in the related art.
Figure 5:
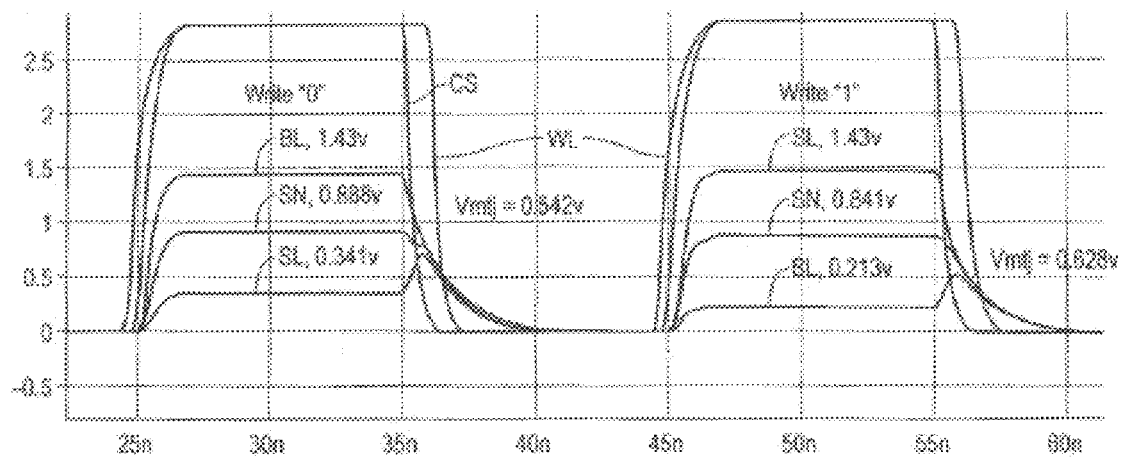
FIG. 5 is a timing diagram representing a number of signals associated with a magnetic random access memory during write "0" and write "1" operations, as known in the related art.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first circuit could be termed a second circuit, and, similarly, a second circuit could be termed a first circuit, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

During a write operation, a memory cell may exhibit randomly different write times at different occasions even under the same, stable conditions. Such behavior may not be the result of wear-out mechanisms that could have been screened out during factory testing, but may instead result from probabilistic behavior of the memory cell's write characteristics. Memory cells determined to be defective for non-probabilistic reasons can be removed from a cell population during testing and repair operations performed at the factory. For instance, certain defects can be repaired by replacing defective cells with on-chip redundant cells during a redundancy operation. Where the defects cannot be repaired, the bad chips can be scrapped. However, even after testing and repair operations, the remaining memory cell population may still exhibit probabilistic behavior that affects the reliability of the memory chip.

After factory testing and repair has been completed, the chip is shipped out and incorporated in a device for use by an end-user. When the chip is in regular use by the end-user, the memory system may be able to flag and repair address locations corresponding to defective cells, such as those which are slow to write, by mapping them out of the usable address space. This process of mapping out memory locations of slow-to-write cells, however, results in a dwindling number of usable address locations over time, since the mapped out cells are not expected to recover to normal and their address locations are therefore permanently rerouted. Thus, defective memory operations resulting from probabilistic cell behavior would result in either low factory yield due to depleting limited redundant elements, or depletion of the address space usable by an end-user over time in the field.

In particular, during a write operation, a memory cell may exhibit randomly different write times at different occasions under stable environmental conditions. At different times, therefore, this behavior may produce an error during writing data into a memory system, even for a cell population determined to be otherwise defect free. A new memory circuit solution is required to overcome this probabilistic cell behavior problem.

In accordance with certain embodiments of the present inventive principles, a tag memory or non-volatile memory (NVM) stores address locations of data which fail to write properly due to probabilistic behavior. The stored tag address locations can be used to rewrite and correct the data after the user initiated regular write operation. Alternatively, a write, hidden from the user, can be performed during the user initiated regular write operation when the cell fails to write in the allocated time due to probabilistic behavior.

Figure 6A:
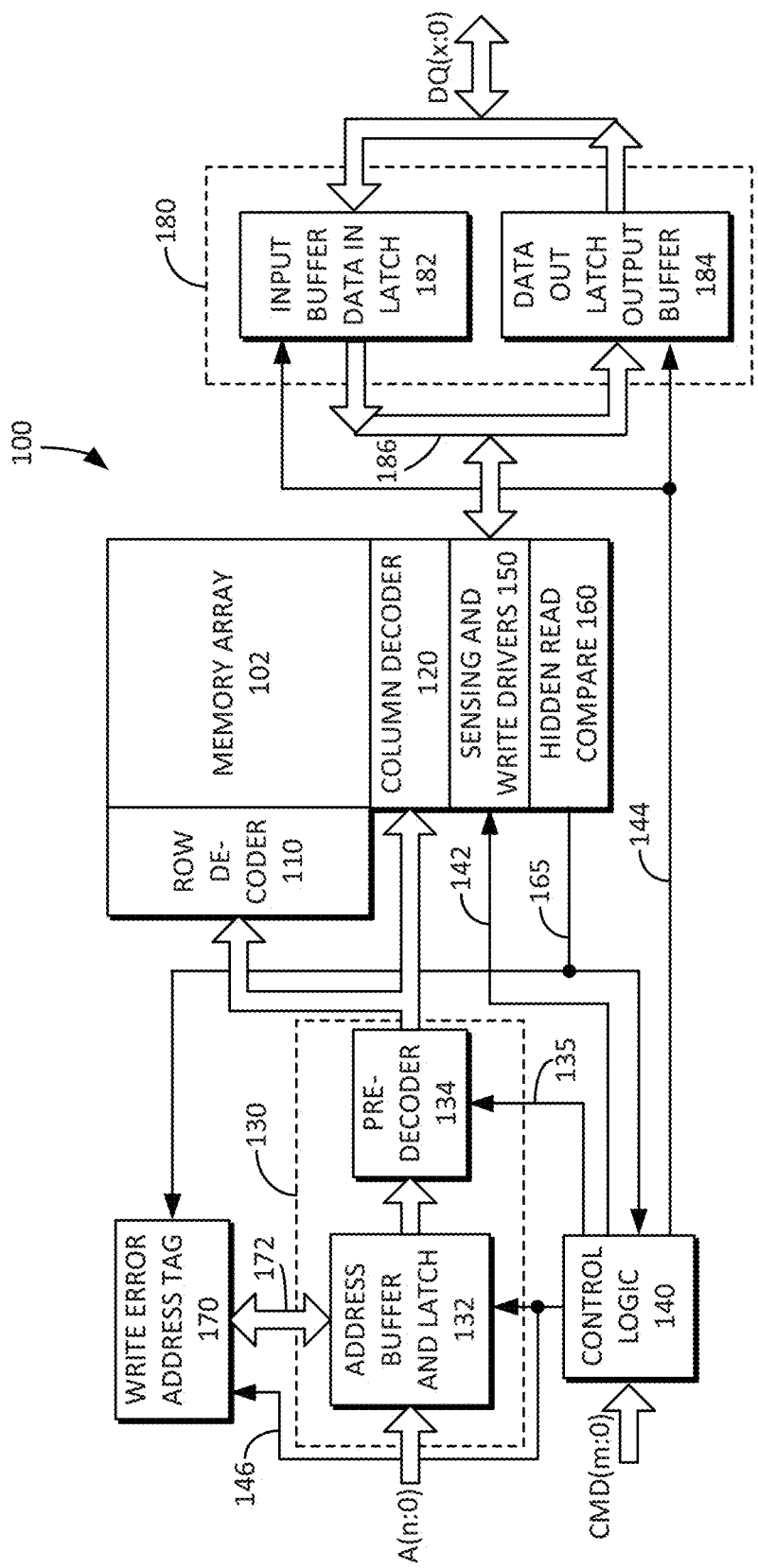
FIG. 6A is a schematic block diagram of a memory system and associated circuitry, in accordance with an inventive concept.

FIG. 6A is a schematic block diagram of a memory system and associated circuitry 100, in accordance with an inventive concept. Referring to FIG. 6, the memory system 100 includes a memory array 102, a row decoder 110, a column decoder 120, an addressing circuit 130, a control logic 140, sensing and write drivers 150, a hidden read compare section 160, a write error address tag memory 170 (alternatively referred to herein as tag memory) and a data input output section 180.

The addressing circuit 130 further includes an address buffer and latch 132 and a pre-decoder 134. The data input output (I/O) section 180 further includes an input buffer data-in latch 182 and a data-out latch output buffer 184. It should be noted the terms sensing and reading may be used interchangeably herein, as are the terms sense and read.

The memory array 102 includes many columns, wordlines and memory cells located at the intersections of the columns and wordlines. Each memory cell is capable of storing a data bit. The memory cell may, for example, be a DRAM, SRAM, ROM, PROM, EEPROM, FLASH, FeRAM, PCRAM, MRAM, STT-MRAM, RRAM or other type of memory cell depending on the technology. By way of example, but not limitation, some of the embodiments described below will use STT-MRAM cells, as have been previously described.

The row decoder 110 selects and drives one of the wordlines determined by its input bus driven by the pre-decoder 134. Similarly, the column decoder 120 selects and drives one of the columns determined by its input bus also driven by the pre-decoder 134. The pre-decoder 134 drives the row and column decoder input bus signals responsive to the address bus signals from the address buffer and latch 132 and responsive to the address (ADDR) enable signal 135 from the control logic. The address buffer and latch 132 operates responsive to the signals from the address bus A(n:0) and is capable of latching the n+1 address signals received from outside the memory system corresponding to the location of a desired data bit. The address buffer and latch 132 also operate responsive to the control logic 140.

The control logic 140 receives signals from outside the memory system on a command bus CMD(m:0) and operates responsive to an error flag 165 from hidden read compare section 160. The control logic sends various signals, which are used to control the operation of the memory system. The signals include, for instance: a read write (R/W) control signal 142, which is sent to the sensing and write drivers 150, a data latch control (DQ control) signal 144, which is sent to the data I/O 180, and a control signal 146, which is sent to the write error address tag memory 170.

The write error address tag memory 170 sends and receives address signals from address buffer and latch 132 via a bidirectional bus 172 responsive to the control logic 140 and responsive to the error flag 165, as will be described in greater detail below. The write error address tag memory 170 is preferably capable of storing addresses of memory cells that exhibit probabilistic behavior and therefore do not write successfully during a write cycle of the memory system. The addresses stored in the write error address tag memory 170 represent stored data bits in memory that can be be logically inverted to properly represent the data originally input to the memory system.

The write error address tag memory of this embodiment may, for example, be a non-volatile memory, FIFO, SRAM or D flip-flop registers. The memory cells in the write error address tag memory 170 may be based on the same technology type and/or design as the memory cells in the memory array 102 or may be of different technology type and/or design. The width of the memory in write error address tag memory 170 may correspond to the number of address signals (i.e., n+1). The depth of the memory in write error address tag memory 170 may depend on the number of error correctable bits desired or required for each re-write operation. For example, if the probabilistic write error rate is high for the average memory cell population, the write error address tag memory depth may be chosen to be larger than if the error rate is small.

The input buffer data-in latch 182 receives and latches data on a bidirectional bus DQ(x:0) from outside the memory system and transmits that data via a separate bidirectional bus to the hidden read compare section 160, which can be integrated between the sensing circuit and write driver as will be explained in more detail below. The data-out latch output buffer 184 receives and latches data on a bidirectional bus 186 from the sensing and write drivers 150 and transmits data via the bidirectional bus DQ(x:0) to outside the memory system.

Figure 6B:
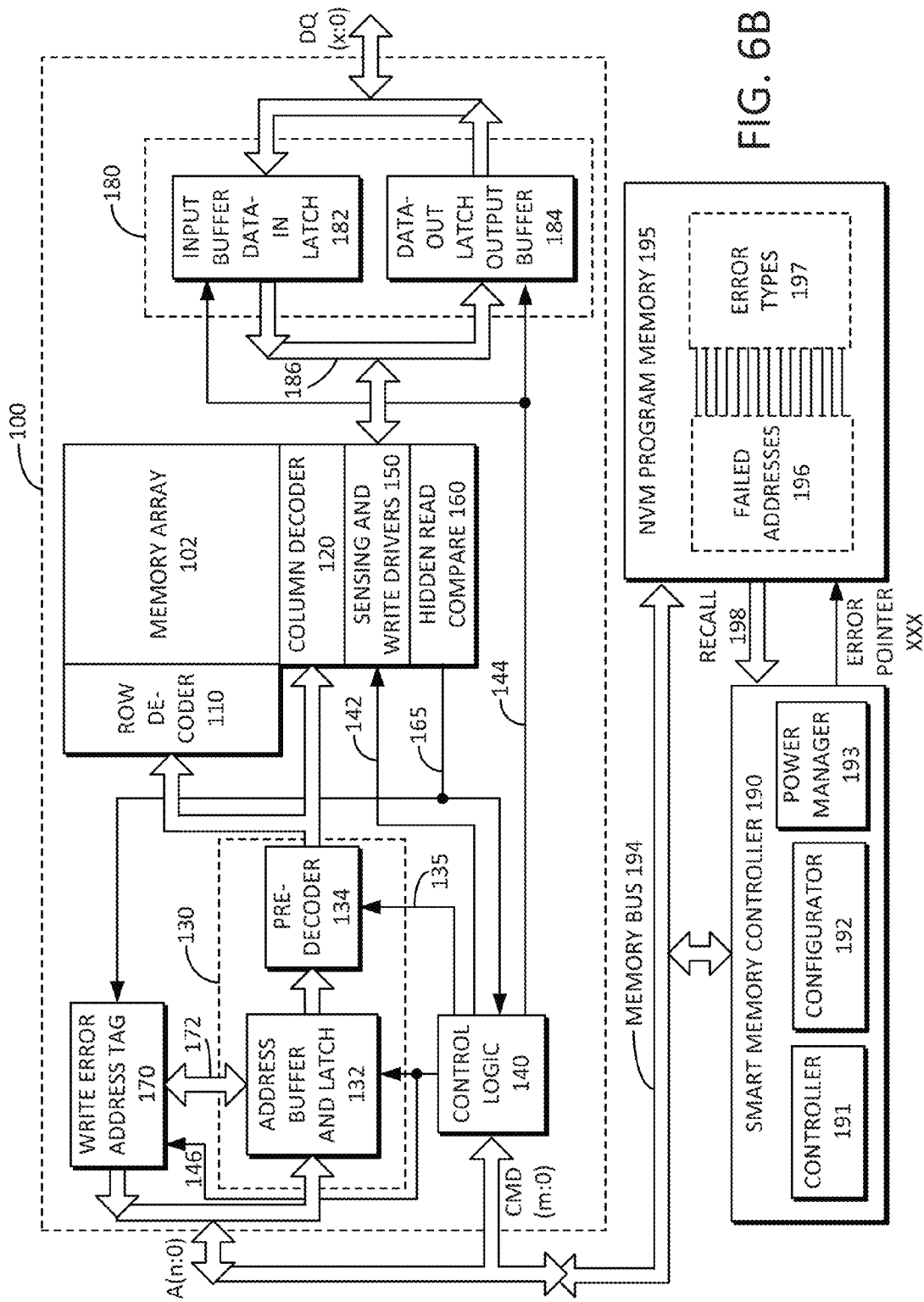
FIG. 6B is a schematic block diagram of a smart memory system and associated circuitry, including a non-volatile memory (NVM) program memory and memory controller, according to principles of the inventive concept.

FIG. 6B is a schematic block diagram of an error detection and address table generation circuit similar to that shown in FIG. 6A, but which incorporates further principles of the inventive concept. Specifically, unlike the circuit shown in FIG. 6A, the error detection and address table generation circuit of FIG. 6B further includes an external smart memory controller 190 and non-volatile memory (NVM) program memory 195. The smart memory controller 190 can be referred to as a smart memory processor, a memory processor, or a smart controller, and such terms are used herein interchangeably. The NVM program memory 195 is in addition to the Write Error Tag Memory 170 of the previous embodiment, which, in this case, can be a FIFO. The NVM program memory 195 can be referred to herein as a non-volatile error retention memory.

Referring to FIG. 6B, the smart memory controller 190 can include a memory controller 191, memory configurator 192, and power manager 193. The smart memory controller 190 can communicate with the smart memory 100 and the NVM memory 195 through a memory bus 194. The system may be configured to dynamically monitor memory system failures and record fail locations as well as fail/error types by storing them in the non-volatile memory (NVM) 196. Specifically, the write error address tag information temporarily stored in the FIFO 170 can be transferred to the NVM program memory 195 via the memory bus 194 under the control of the memory controller 190. The NVM program memory 195 can receive an error pointer 199 from the smart memory controller 190. The NVM program memory 195 can accumulate a database 196 of the failed memory addresses as well as a tabulation 197 of the error types. The system can then recall the fail location (i.e., RECALL 198) from the NVM table and perform an appropriate fix operation based on the type of failure. The memory configurator 193 can be used to map out address locations with unrepairable errors.

By enabling a failed memory address to be stored in the tag memory 170 and/or the NVM program memory 195 along with the type of data error 197, the memory controller 190 can be configured to access the tag or NVM program memory and to perform an appropriate fix operation for that address location based on the type of error indicated. These fix operations can include, for instance, a memory rewrite, an address reconfiguration to isolate a failed memory location, a memory repair operation, or other appropriate fixes. Memory monitoring, repair, correction, and re-assignment can therefore be performed by a smart memory controller according to principles of the present inventive concept. ECC, anti-fuse repair, error masking, read-compare-write, weak bit refresh, and other error correction technologies can be implemented in the smart memory system to enhance data stability and reduce error rates.

Figure 7:
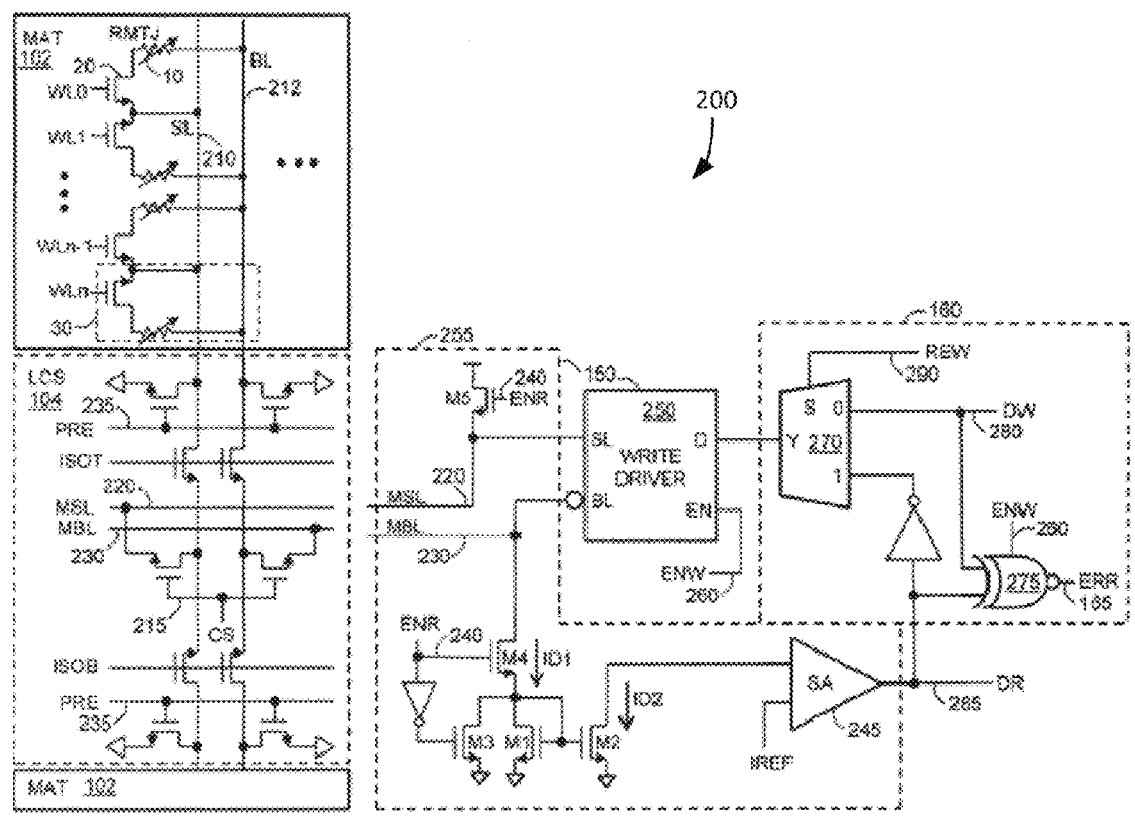
FIG. 7 is a schematic circuit diagram representing portions of a memory system and associated writing and reading circuitry, in accordance with inventive concepts.

FIG. 7 is a schematic block and circuit diagram illustrating portions 200 of the memory system 100 and associated writing and reading circuitry, in accordance with inventive concepts. The circuitry 200 includes a memory array tile (MAT) 102, a local column select circuit (LCS) 104, sensing and write drivers 150, and a hidden read compare 160. Although this embodiment includes STT-MRAM cells, it is not limited thereto, and may include other memory types as discussed above.

Referring to FIG. 7, the MAT 102 includes a number of STT-MRAM cells 30 whose select transistors are coupled to wordlines (WL0-WLn), which are driven by the row decoder 110 as described above in connection with FIGS. 6A and 6B. The STT-MRAM cells are also coupled to a source line (SL) 210 and bit line (BL) 212 pair corresponding to one of the columns in the memory array 102. The MAT 102 includes a plurality of SL and BL pairs, which are selectable by LCS 104. The LCS 104 includes a selection circuit having pairs of n-channel select transistors, which couple a selected SL and BL pair in MAT 102 to a source line and bit line pair (e.g., MSL 220 and MBL 230) in the LCS 104 under the control of a column select signal (CS) 215, a precharge signal (PRE) 235, an isolation top signal (ISOT), and an isolation bottom signal (ISOB).

There are two separate memory arrays 102 shown in this embodiment, arranged on the top and bottom, respectively, of the LCS 104. The LCS 104 determines which of the adjacent MATs 102 to select by enabling one of the respective ISOT or ISOB signals. In the example shown in FIG. 7, the top MAT is selected by enabling ISOT and disabling ISOB. One of the SL and BL pairs is then selected by the CS signal (as driven by the column decoder), to couple the selected SL and BL pair in the top MAT array to the respective MSL and MBL lines. The SL/BL pair and corresponding MSL/MBL pair are then ready to perform a write or read operation for the selected memory cell when the precharge signal PRE is disabled.

MSL 220 and MBL 230 are coupled from LCS 104 to a sensing circuit 255 (alternatively referred to herein as a read block) and write driver 250 (alternatively referred to herein as a write block). In an alternate embodiment (not shown) the SL and MSL signals may be omitted from the column and associated circuitry to provide a single line column for memory cells that do not require a complementary column pair to function, and whose sources are coupled to ground within the MAT (such as in some ROM, PROM, EPROM, EEPROM, and Flash, as is commonly known in the art).

As is shown in FIG. 7, the write driver 250 is coupled to an enable write signal (ENW) 260 driven by the control logic and an output (Y) from hidden read compare 160 coupled to the data (D) input of the write driver. During a write mode operation, the write driver 250 drives the MSL and MBL lines (and the respective SL and BL line pair) in complementary fashion as will be described in detail later under control of ENW. When ENW is disabled, write driver 250 does not drive the MSL and MBL lines.

The sensing circuit (i.e., read block) 255 is enabled by an enable read (ENR) 240 signal and includes a transistor M5 coupled to the power supply and a transistor M3 coupled to the ground. M5 and M3 are coupled to the ENR signal and its complement, respectively. The ENR and ENW signals are not enabled simultaneously. When ENR is enabled high, transistor M3 is turned off, while a transistor M4, controlled by ENR is turned on and passes the MBL signal to a current mirror M1 and M2, and transistor M5 couples MSL 220 to the power supply. Current ID1 flows in MBL through transistor M4 to transistor M1 of the current mirror.

A sense amplifier (SA) 245 is coupled to a current reference signal IREF and a second current ID2, which flows through the second transistor M2 of the current mirror. The SA compares the two currents (ID2 with IREF) and issues a data-out signal (DR) on a data read line 285. The data read line 285 is coupled via the bidirectional bus (see FIGS. 6A and 6B) to the data-out latch output buffer 184 and to the hidden read compare 160. When ENR is disabled low, M4 isolates MBL 230 from the current mirror and M3 couples the current mirror input to a ground voltage. The SA 245 may also be placed locally within MAT 102 or placed with the global sense amps and global write drivers (not shown).

The hidden read compare 160 (alternatively referred to herein as a compare block) can include an exclusive disjunction gate (XNOR) 275, an inverter, and a multiplexer 270. The hidden read compare is controlled by ENW 260 and a re-write (REW) signal 290, both sent from control logic 140 (see FIGS. 6A and 6B). The inputs to the XNOR gate 275 are the data read signal (DR) 285 from the sensing circuit 255 and the data write signal (DW) 280 from input buffer data-in latch 182, responsive to ENW 260. The multiplexer selects which of its two inputs, an inverted DR 285 signal or the DW signal, to pass through from its output Y to the input D of the write driver responsive to REW. The compare block 160 may alternatively be placed locally within MAT 102 or placed with the global sense amps and global write drivers.

Figure 8:
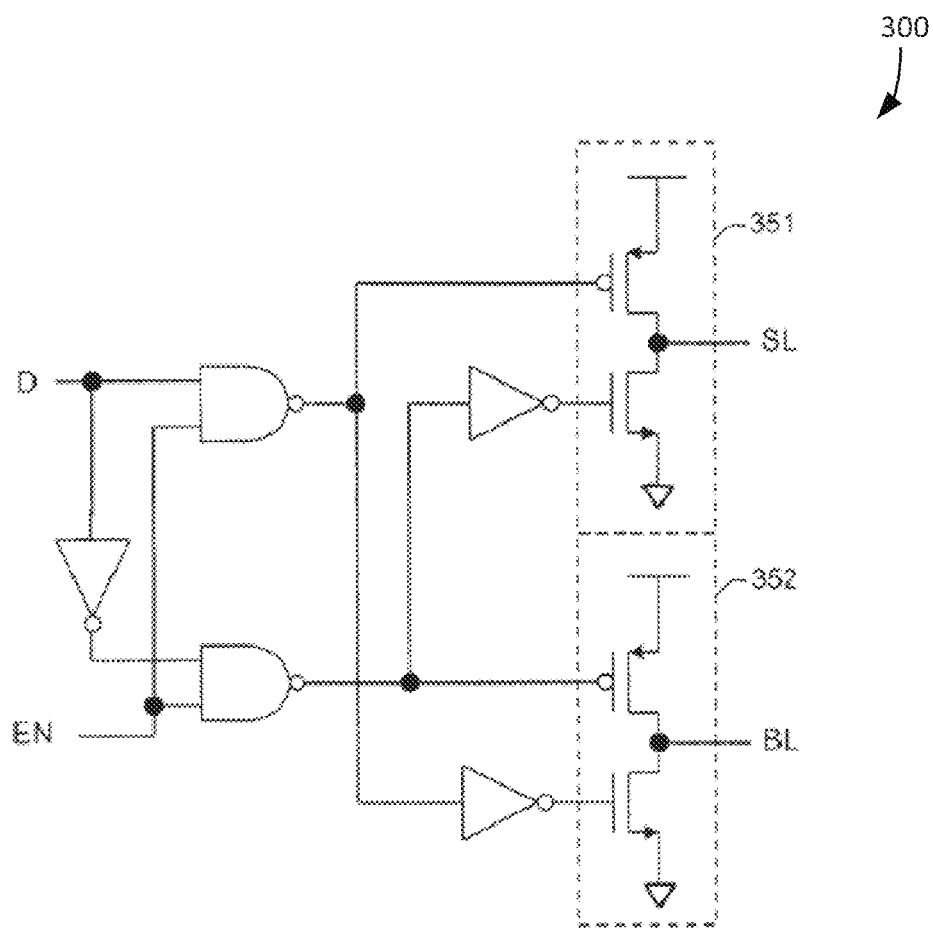
FIG. 8 is a schematic circuit diagram representing additional portions of a memory system and associated writing circuitry, in accordance with inventive concepts.

FIG. 8 is a schematic circuit and logic diagram illustrating one embodiment of a write driver 300 of the memory system and associated writing circuitry 100, in accordance with inventive concepts. The write driver circuitry 300 of FIG. 8 can, for instance, supply the write driver 250 of FIG. 7. Referring to FIGS. 7 and 8, the write driver 300 (250) can include two inverter drivers 351 and 352 driving SL and BL signals respectively under control of ENW 260. The signal line (SL) is coupled to MSL, while an inverted bit line signal (BL) is coupled to MBL. When EN (ENW) is enabled high, an inverted version of input D from the hidden read compare 160 is coupled to the BL signal while a non-inverted version of input D is coupled to the SL signal, such that the BL and SL signals are logical complements. When EN (ENW) is disabled low, the transistors in both inverter drivers 351 and 352 are off, independent of the state of input D, and control of the MSL and MBL lines reverts to the sensing circuits.

Each write cycle can be followed by a hidden read cycle of the same memory location. The data from the hidden read operation (data-out) can then be compared to the data bit value which was just being written. If the data matches, the write cycle is finished. If the data doesn't match, the output of the XNOR will go active low and an ERROR flag is generated. The memory address for this location can then be "tagged" or stored in the write error address tag memory for a later re-write operation.

In accordance with one inventive aspect, the memory array described above can also include circuitry for carrying out the following operations: latching the address of the data bit into the addressing circuit; latching the data bit into the data input output circuit; writing the data bit into the memory array at the address of the data bit; reading a data-out bit from the memory array at the address of said the bit; comparing the data bit with the data-out bit to determine if the data bit equals the data-out bit; writing the address of the data bit in the write error address tag memory if the comparing step determines the data bit does not equal the data-out bit; and not writing the address of the data bit in the write error address tag memory if the comparing step determines the data bit equals the data-out bit.

Figure 9A:
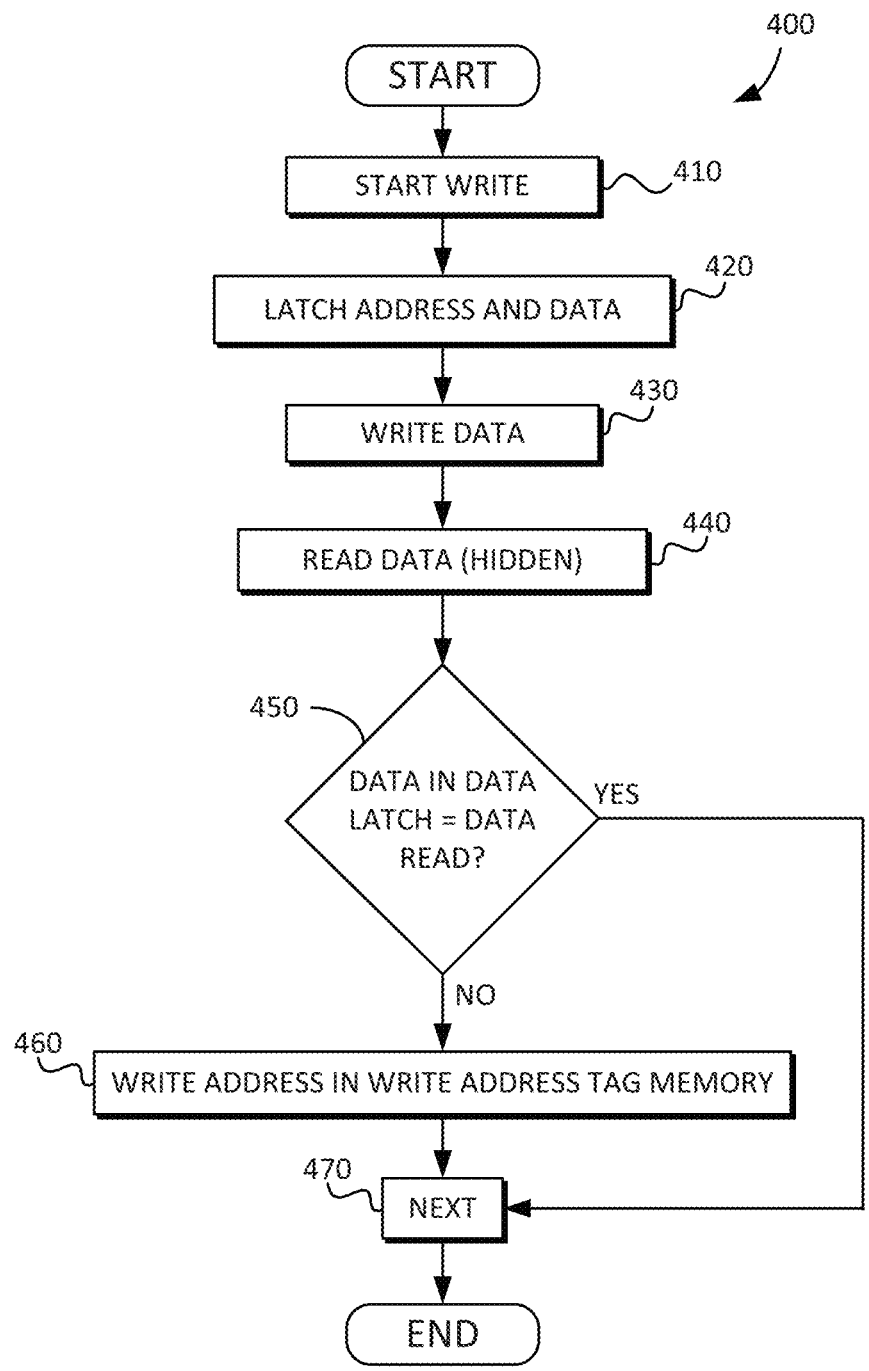
FIG. 9A is a flow chart illustrating steps of a writing method of a memory system, in accordance with inventive concepts.

FIG. 9A is a flow diagram 400 illustrating various steps of a writing method of a memory system. Referring to FIGS. 7 through 9A, after the start of a write operation 410, during a latch address and data step 420, the data (alternatively referred to herein as first data) is latched in input buffer data-in latch 182 and passed through multiplexer 270 in the hidden read compare section 160 to the D input of the write driver 250. Also during the latch address and data step 420, the address of the data bit is latched in the address buffer and latch 132 and passed through to the pre-decoder 134, which drives the input buses for the row and column decoders, which in turn select a wordline and column in the memory array. The write data step 430 writes the data into the memory cell at the selected address in the memory array by enabling ENW.

Following the write data step 430, a hidden read data step 440 is executed on the same address location passing a data-out bit to the hidden read compare section 160. The read is considered hidden since it is performed automatically as part of the write operation without having to instruct the memory system via the CMD bus. Next, during a compare step 450, the data bit from the input buffer data-in latch 182 (i.e., the "true" or first data bit) is compared against the data-out bit from the SA 245 (i.e., the data bit written to memory, which may or may not have written successfully, and alternatively referred to herein as second data) to determine if the first data bit equals the second data bit. This logical comparison is performed by the exclusive disjunction or XNOR gate 275 in the hidden read compare section 160. If the first data bit equals the second data bit, the write operation was successful and the next operation 470 can proceed. However, if the first data bit does not equal the second data bit, the exclusive disjunction or XNOR gate sets error flag (ERR) 165, which signals the controller 140 to pass the "tagged" address from the address buffer and latch over the bidirectional bus to the write error address tag memory 170, where the address is written (during step 460) and stored therein until a re-write operation can be performed as will be further described below. The tag memory storage operation 460 is a transparent operation and can be easily done at the beginning of the next memory cycle such that it does not delay the next memory operation 470.

In another aspect of the inventive concept, the total write cycle may be extended to include an additional hidden write operation. In this case, the write correction operation (re-write) may be transparent to the user. The write timing specification can be made to include this transparent re-write time. Therefore, the write cycle time may be the same whether or not a re-write is required.

Figure 9B:
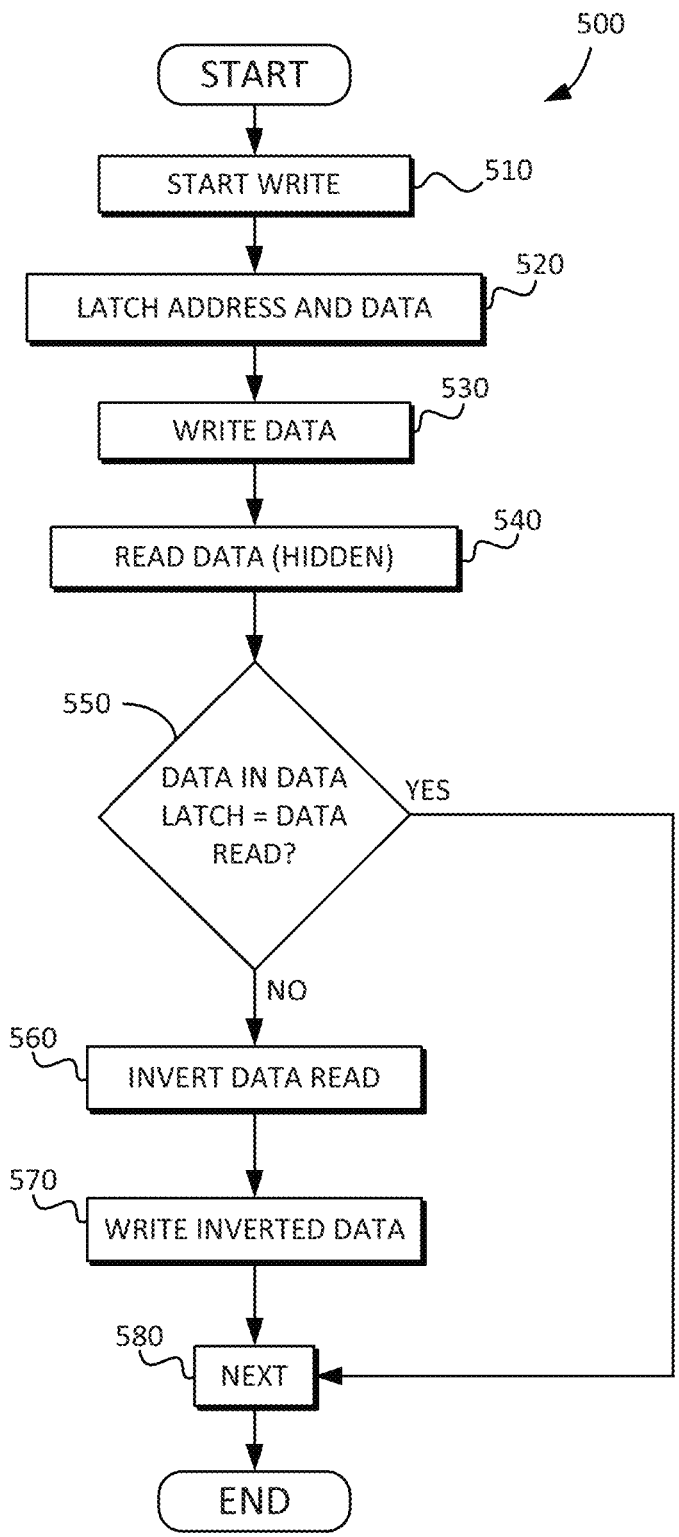
FIG. 9B is a flow chart illustrating steps of a writing method of a memory system, in accordance with inventive concepts.

FIG. 9B is a flow diagram 500 illustrating various steps of a writing method of a memory system, in accordance with inventive concepts. The steps 510 through 550 of FIG. 9B are the same as steps 410 through 450 in FIG. 9A and will therefore not be described again. In step 560, however, the data-out at the current address location in the memory array is passed to the SA output DR 285. Next, an invert data read step 560 is performed by the inverter in the hidden read compare section 160 to invert the data-out bit. The inverted data-out bit is then directed to the D input of the write driver 250 via the multiplexer 270 responsive to the REW signal 290 from the control logic. A write inverted data step 570 is then performed to write the now corrected inverted data-out bit into the current address in the memory array. The next 580 operation can then be performed.

A re-write operation will now be explained in greater detail. Depending on the memory system specification, the tagged address from the defective write operation can be used to re-write the memory cell located at the tagged address, at a convenient time when the processor or system periphery is not accessing the memory. During the re-write cycle, the data in the tagged address can simply be inverted. To invert the data, the memory bit must be read first using the hidden read feature and the opposite data can then be written into the cell. Thus, the original writing error caused by the cell's previous probabilistic lengthy write behavior can be corrected.

Rather than wait to perform the re-write operation at a later time, the data can instead be corrected immediately in a handshaking system where the memory sends a "halt access" signal to the processor or master system while the re-write cycle is in progress. A "re-write complete" signal can then be sent to the master system once the re-write operation is completed. Additional handshaking systems for ensuring a proper write operation will be discussed in further detail below.

In accordance with yet another embodiment, the memory array described above can also include circuitry for carrying out the following operations: loading the address of the data bit from the write error address tag memory into the addressing circuit; reading a data-out bit in the memory array at the address of the data bit; inverting the data-out bit in the hidden read compare circuit; and, writing the inverted data-out bit into the memory array at the address of the data bit.

Figure 10:
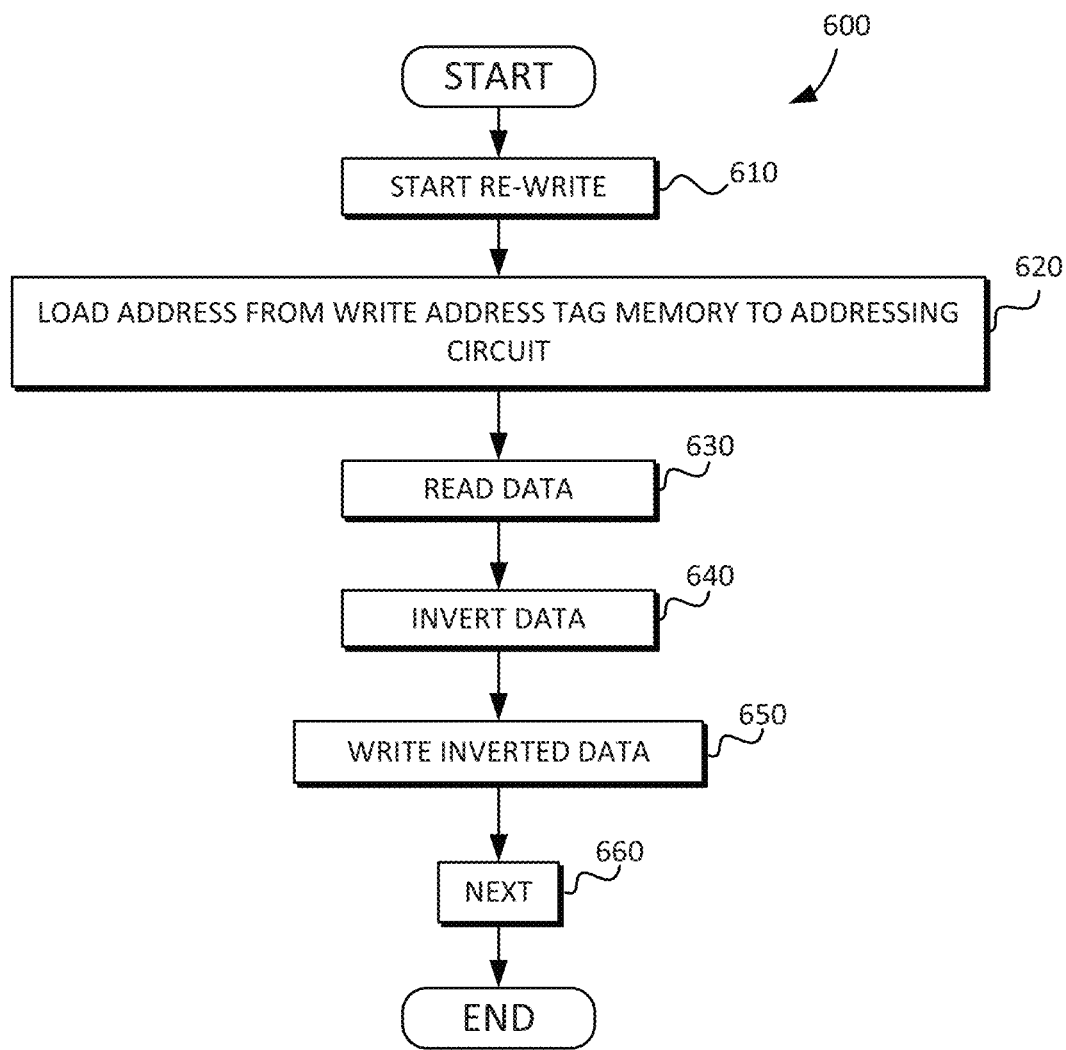
FIG. 10 is a flow chart illustrating steps of a re-writing method of a memory system, in accordance with inventive concepts.

FIG. 10 is a flow diagram 600 illustrating various steps of a re-writing method of a memory system, in accordance with inventive concepts. Referring to FIG. 10, after the start of a re-write operation 610, during a load error address from write address tag memory to addressing circuit step 620, the "tagged" address from write error address tag memory 170 is loaded over the bidirectional bus into address buffer and latch 132. Then, the data at the previously "tagged" address is read out during a read data 630 step. The data-out at the "tagged" address location in the memory array is passed to SA output DR 285. Next, an invert data step 640 is performed by the inverter in the hidden read compare 160 to invert the data-out bit. The inverted data-out bit is then directed to the D input of the write driver 250 via the multiplexer 270 responsive to the REW signal from the control logic. A write inverted data step 650 is then performed to write the now corrected inverted data-out bit into the previously "tagged" address in the memory array. Then the next memory operation can then be performed in step 660. The memory space taken up by the previously "tagged" address stored in the write error address tag memory can now be made available to new "tagged" addresses in subsequent write cycles.

Figure 11:
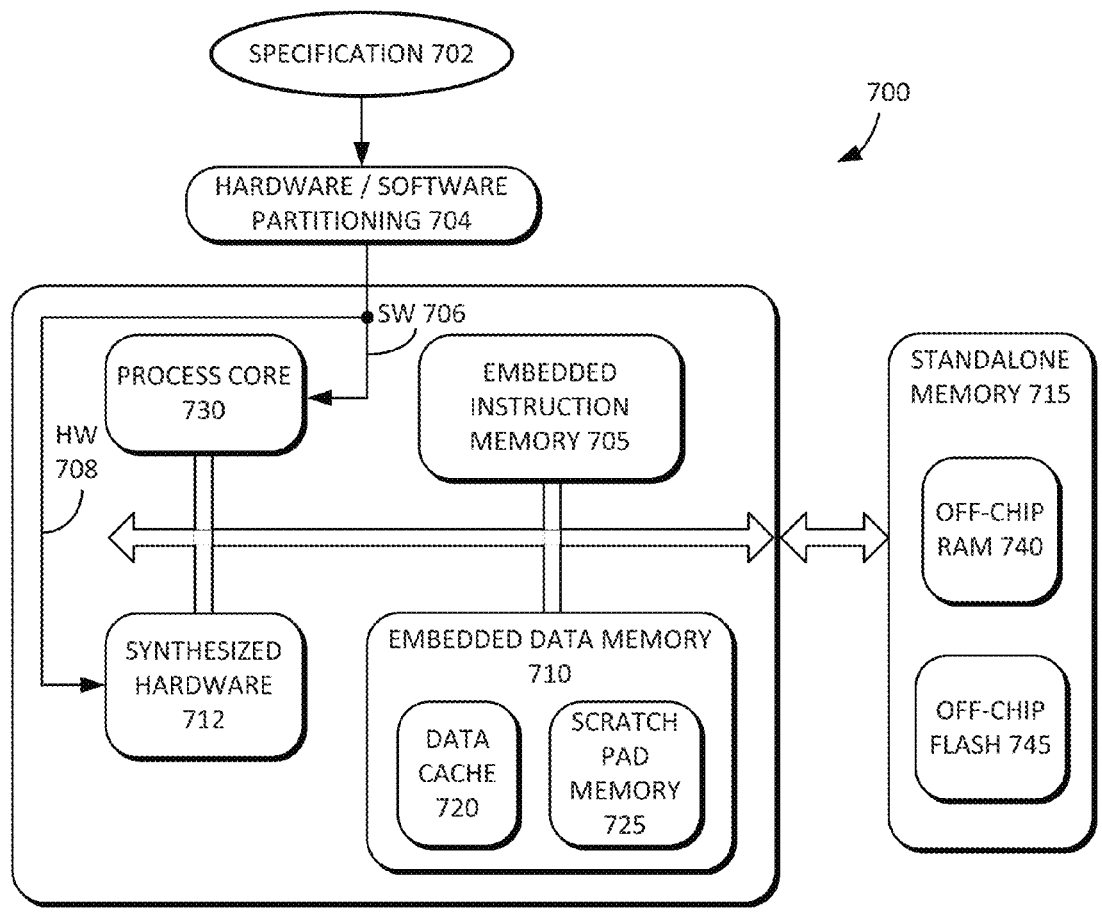
FIG. 11 is a schematic block diagram of a conventional memory system.

FIG. 11 is a schematic block diagram of a conventional memory system 700. Referring to FIG. 11, the conventional memory system 700 is provided using specification 702 and hardware/software partitioning section 704, which distributes software functionality 706 to the processor core 730 and hardware functionality 708 to the synthesized hardware section 712. The memory system 700 may consist of a device having a small amount of embedded memory, such as embedded instruction memory 705 and data memory 710, and a larger amount of memory provided as a separate, standalone memory device 715, such as a separate RAM 740 or Flash memory chip 745 or chip package. The embedded memory can include both instruction memory 705 for providing program instructions to the processor, and data memory 710 (including both data cache 720 and scratch pad memory 725) for storing small amounts of data that are being transferred between the device and the standalone memory 715, or that are being used for computations or other processes being performed by the processor core 730.

Conventional memory systems have typically relied on error correction processes performed by a factory to catch and fix memory errors before implementation in an end-user device. Such systems are therefore not well-adapted for use with memories exhibiting probabilistic characteristics (e.g., PCRAM, MRAM, and RRAM), which may result in higher error rates and slower read/write times.

Figure 12:
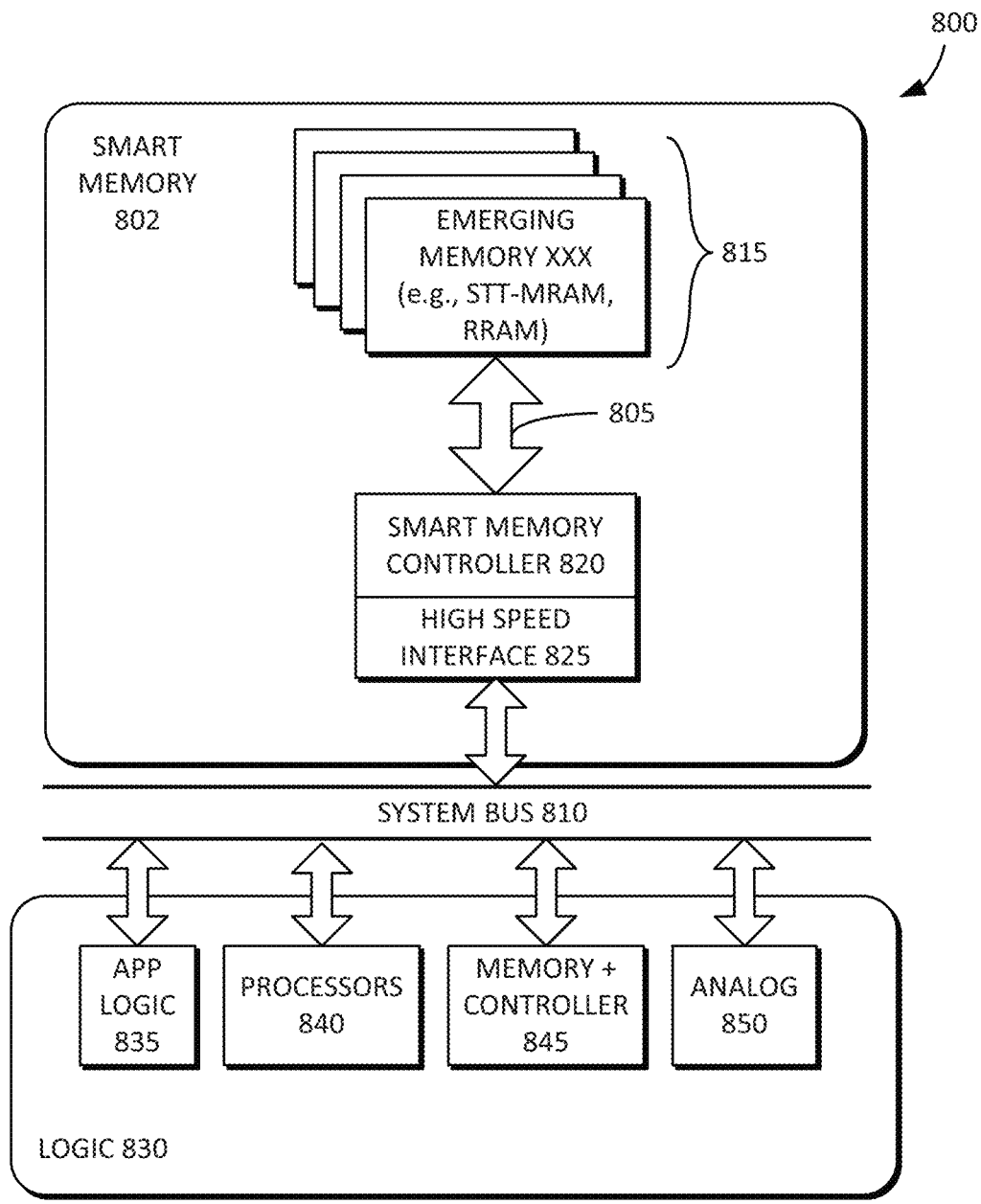
FIG. 12 is a schematic block diagram of a smart memory system constructed according to inventive concepts.

According to features and principles of the present inventive concepts, a smart memory system preferably allows memories with high error rates and slow read/write times relative to a logic processor to work reliably and seamlessly. FIG. 12 is a schematic block diagram of one embodiment of a smart memory system 800 constructed according to principles of the present inventive concept. Referring to FIG. 12, the smart memory system 800 can include smart memory 802, which may be configured to provide a handshaking interface 805 with an ultra-wide input output (I/O) between the memory 815 and smart memory controller 820 to ensure successful read and write operations. More specifically, a common asynchronous memory bus 810 can be provided with acknowledge signaling to guarantee write and read operation successes. The common asynchronous memory bus preferably implements a handshaking procedure during both the read and write operations to ensure that the desired data has been successfully read from, or written to, the main system memory 815. In addition, the handshaking memory interface 805 can also help avoid bottlenecks and provide re-routing capabilities. Although here labeled emerging memory (STT-MRAM, RRAM) 815, the main system memory 815 can be any type of memory, including, for example, DRAM, SRAM, ROM, PROM, EEPROM, FLASH, FeRAM, PCRAM, RRAM, MRAM, STT-MRAM, RRAM or future memory types.

The smart memory system 800 can further provide various additional error rate reduction schemes, including, for example, allowing non-volatile memory bits or sectors with poor retention to be used by tagging them and performing occasional refresh operations to maintain the data stored therein. Error-correcting code (ECC), signal processing, and programmable repair operations can also be provided to reduce and correct memory errors. The smart memory controller 820 can perform re-configuration and optimization processes to ensure proper memory retention and read/write operations. A high-speed interface 825 can be included between the smart controller 820 and the system bus 810 in order to match the speed of the logic processes.

The smart memory 802 can, for instance, be implemented in or associated with a device having any one or more of multiple logic processors or other devices. In this embodiment, the device logic 830 is shown as having application logic 835, processors 840, internal memory plus controller 845, and analog device functions 850. The smart memory 802 can be configured to communicate with any one or more of the logic components through the system bus 810. Embodiments incorporating the present inventive concepts can further be configured to enable compatibility to multiple systems. Configurable address schemes can be used, for instance, which support multiple processors and peripherals, along with a programmable and memory-type independent I/O interface.

Figure 13:
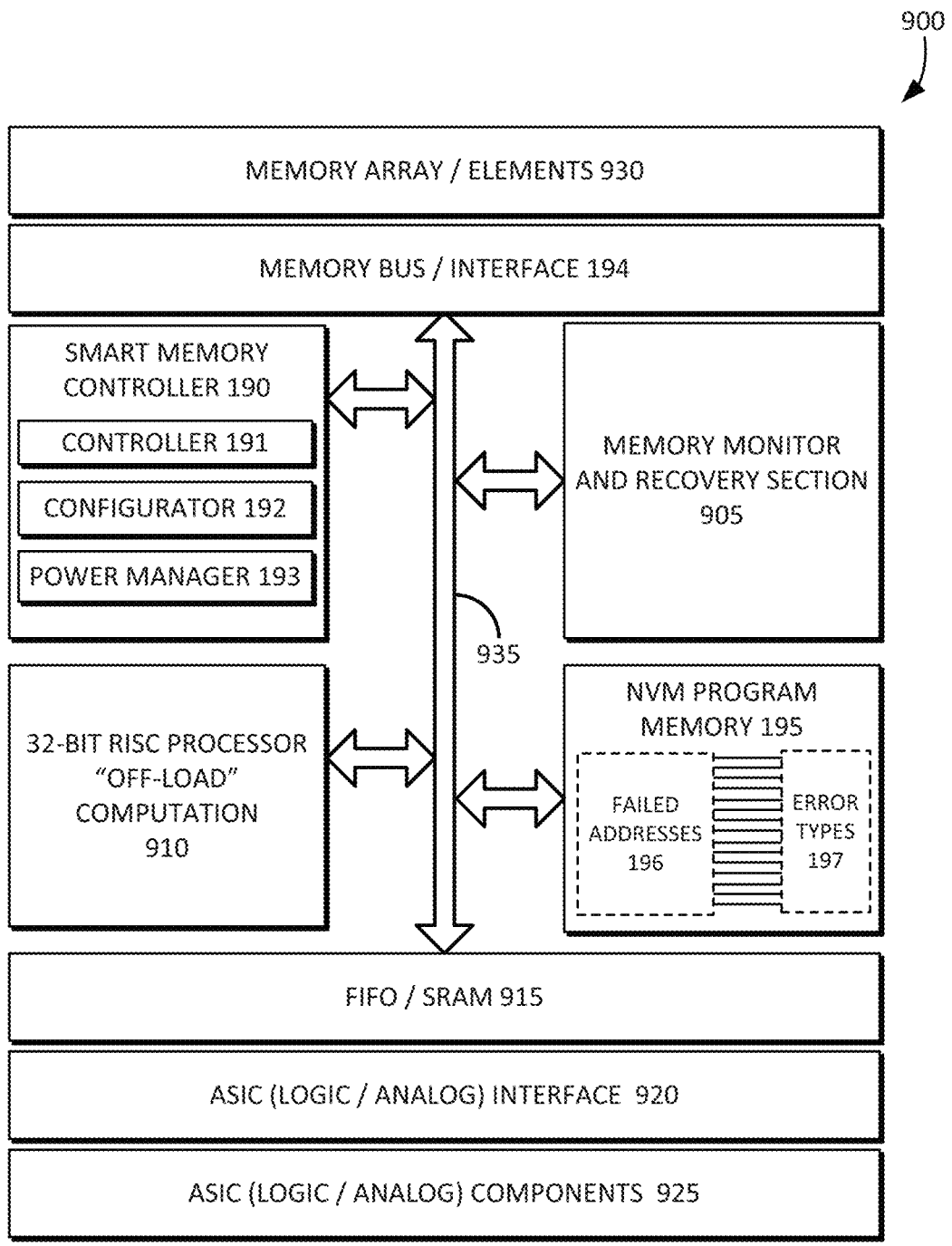
FIG. 13 is a schematic block diagram of a memory controller having an intelligent memory and logic interface according to inventive concepts.

FIG. 13 is a schematic block diagram of a memory system 900 memory controller having an intelligent memory and logic interface according to principles of the present inventive concept. Referring to FIG. 13, a smart memory controller 190 can include a memory controller 191 that oversees the communication between the user device and the memory as well as controls the other operations of the smart controller. A memory configurator 192 can also be provided to reconfigure the usable address space based on errors during field use and provide other memory configuration processes. Power manager 193 can further be included to compensate for temperature fluctuations and other power variables to provide stable supply voltages for the memory operations.

The system 900 may further be configured to dynamically monitor memory system failures and record fail locations by storing them in a memory controller non-volatile memory (NVM) 195. The system can then recall the fail location from the NVM table 196 and perform an appropriate fix operation based on the type of failure 197. These fixes can, for instance, include re-writing the data, repairing the memory, isolating the failed memory location, or other appropriate fixes. The smart memory controller 190 can, for instance, include or otherwise be associated with memory monitoring and recovery system capabilities in section 905 to diagnose memory problems and provide appropriate fixes depending on the type of errors detected. The NVM program memory 195 can be included to store address locations of defective memory cells, along with the types of errors detected. In this embodiment, the NVM program memory 195 can be utilized to store information regarding failed address locations 196 along with the type of error 197. The NVM program memory 195 can further be used to reassign addresses of failed memory locations to new memory locations. The smart memory controller 190 of the smart memory system 900 can interface with the NVM program memory 195 to perform memory tests, reassign memory addresses, perform memory refreshes, or take other appropriate action based on the error information stored in the NVM program memory 195.

Other principles can provide the smart memory controller 190 with the ability to allow the device processor to offload repetitive computations or other tasks to the smart memory system 900. For instance, an ARM, MIPs, or other desired processor combination 910 (e.g., 32-bit RISC Processor) can be incorporated in or otherwise associated with the smart controller 190 of the smart memory system 900 to perform various processing tasks to free up device resources.

More specifically, an ARM, MIPs, or other RISC processor or other types of CPU 910 can also be included in the smart memory system 900, such as in the smart memory controller 190, to perform simple and/or complex computations on the data before storing it into the main system memory via the memory interface 194. This can provide added value for the smart memory system by allowing the device processor to offload various tasks to the memory controller processor(s) 910 and thereby free up device resources for other processes. Smart memory system bus 935 may connect the various components of the smart memory system together, such as the smart memory controller 190, the off-load processor 910, the memory monitor and recovery section 905, the NVM program memory 195, the memory interface 194, and/or the FIFO/SRAM section 915.

The smart memory controller 190 can further include or otherwise be associated with a FIFO and/or SRAM memory section 915 to buffer memory transfers to the smart memory controller 190 from the device and/or logic components 920. An ASIC (logic and/or analog) interface 920 can be included to provide an interface between the smart memory controller 190 and the ASIC (logic and/or analog) components 925. The memory bus and/or interface 194 can provide the connectivity between the smart controller 190 and the memory array and/or memory elements 930.

Figure 14A:
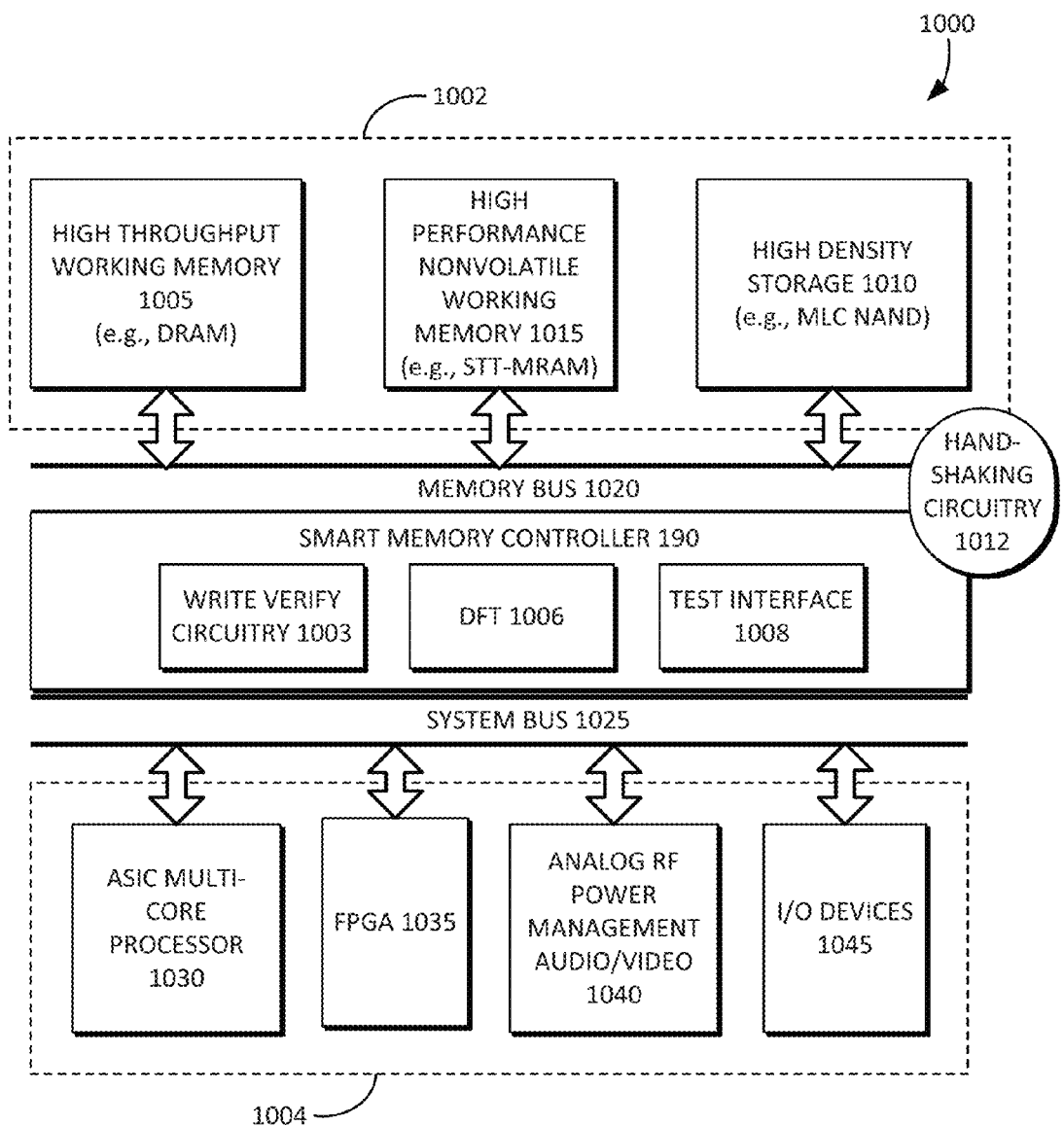
FIGS. 14A and 14B provide schematic block diagrams of embodiments incorporating a smart memory system according to inventive concepts.
Figure 14B:
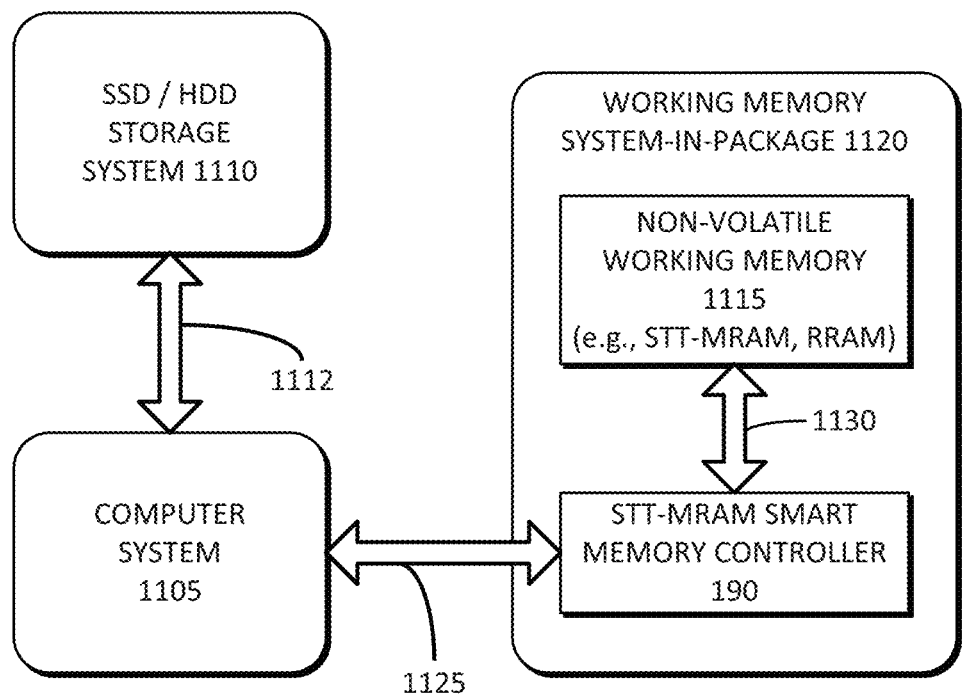

FIGS. 14A and 14B provide schematic block diagrams of devices incorporating a smart memory system according to inventive concepts. Referring to FIG. 14A, according to one embodiment incorporating principles of the present inventive concept, a smart memory system 1000 can comprise a memory 1002 including one or more memory chips (e.g., 1005, 1015, and/or 1010) fabricated using various memory processes, and a smart memory controller 190 including of one or more memory processor chips (not shown) fabricated using various logic processes. The smart memory controller 190 may, for instance, include or otherwise be associated with a common address, data, and/or control memory bus 1020 that is configured to provide an asynchronous handshaking interface between the memory array 1002 and the smart memory controller 190. The smart memory controller 190 can also include a mechanism for offloading write error tag memory data from the memory chip 1002 for analysis, and a mechanism for storing poor retention bit address information in a poor retention address table (PRAT) for future refreshing, as described above. Program logic can also be included for memory address re-configuration, as well as power management logic, as also described above.

The memory system may include a common address, data, and/or control memory bus 1020, which provides an asynchronous handshaking interface between the memory array 1002 and the smart memory controller 190. Write error tag and write/verify circuitry 1003 can also be included in the memory along with a Design for Test (DFT) circuit 1006 for performing a fast parallel retention test. A test interface 1008 can also be included for SiP memory testing. Control registers and multiplexing circuitry are also preferably provided for address reconfiguration, and separate power planes and gating circuitry can be included for power management, as described above. The inventive principles can also enable reduced power consumption by reducing I/O loading using SiP solutions, by providing clock-less memory operation, and by shutting down unused memory sections. Voltage control, temperature compensation, and asynchronous timing circuitry can also help reduce power consumption and provide more efficient operation.

More specifically, as shown in FIG. 14A, the smart memory processor can be provided as an interface between various types of memory solutions 1004 (e.g., DRAM 1005, STT-RAM 1015, and MLC NAND memories 1010, for example), each having different benefits and capabilities, and the various device logic and processing components (e.g., ASIC multi-core processor 1030, Field-Programmable Gate Array (FPGA) 1035, Analog RF Power Management and Audo/Video processes 1040, and various Input/Output (I/O) devices 1045, for example). The smart memory controller 190 communicates with the various memory devices via the memory bus 1020, which preferably provides handshaking circuitry 1012 to guarantee read and write successes. The smart memory controller 190 communicates with the various device logic and processing components 1004 via the system bus 1025. The smart memory controller 1004 can include components such as those depicted and described above with respect to FIGS. 12 and 13, which provide further error reduction and correction capabilities and other value to the system.

Referring to FIG. 14B, a computer system 1105 can communicate with a data storage system 1110, such as a hard drive or other high capacity storage device (SSD/HDD) through a SATA, SCSI, USB, or other interface 1112. According to principles of the present inventive concept, the computer system 1105 can further be configured to communicate with working memory 1120 (e.g., a smart memory system) provided in a SiP, for instance, through a high-speed memory bus 1125. Within the working memory 1120, the smart memory controller 190 (here, an STT-MRAM controller) can be configured to communicate with the memory 1115 (non-volatile working memory, e.g., STT-MRAM, RRAM) through an asynchronous handshaking interface 1130. The handshaking interface 1130 preferably provides read/write acknowledgement as well as write error tagging and re-write capabilities. A constant voltage and/or current control system can also be provided along with fast error rate screening capabilities.

Figure 15C:
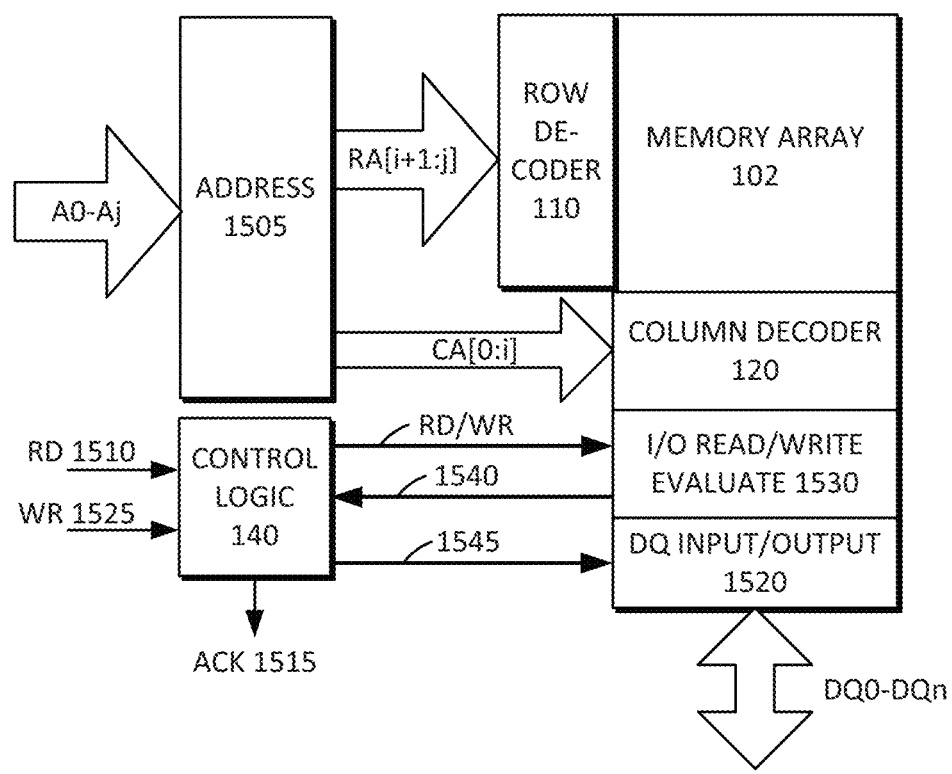
FIG. 15C is a schematic diagrams illustrating read/write operation handshaking circuitry associated with the tables of FIGS. 15A and 15B, according to additional principles of the inventive concept.
Figures 16A, 16B:
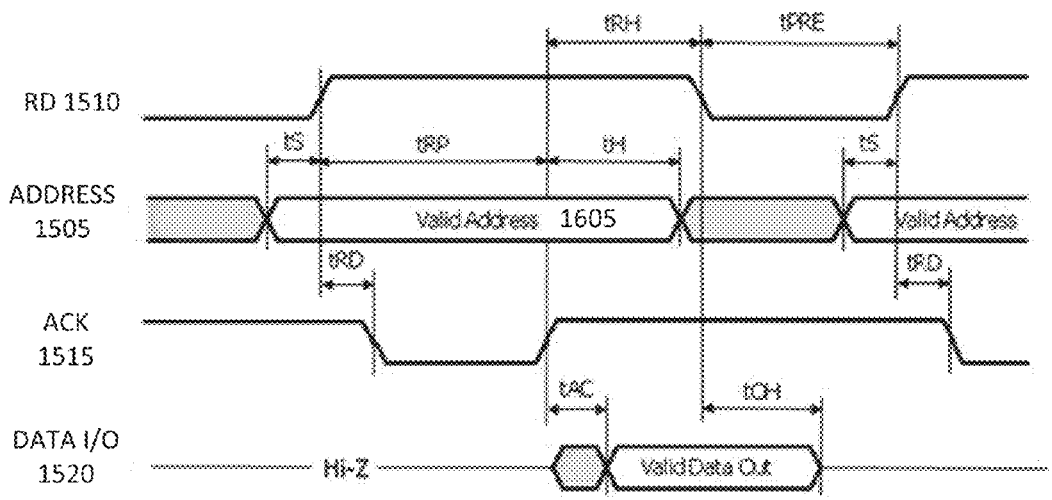
FIG. 16A is a Signal Table according to inventive concepts.
FIG. 16B is a schematic timing diagram of an asynchronous read operation with acknowledgement, associated with the table of FIG. 16A, according to inventive concepts.
Figures 17A, 17B:
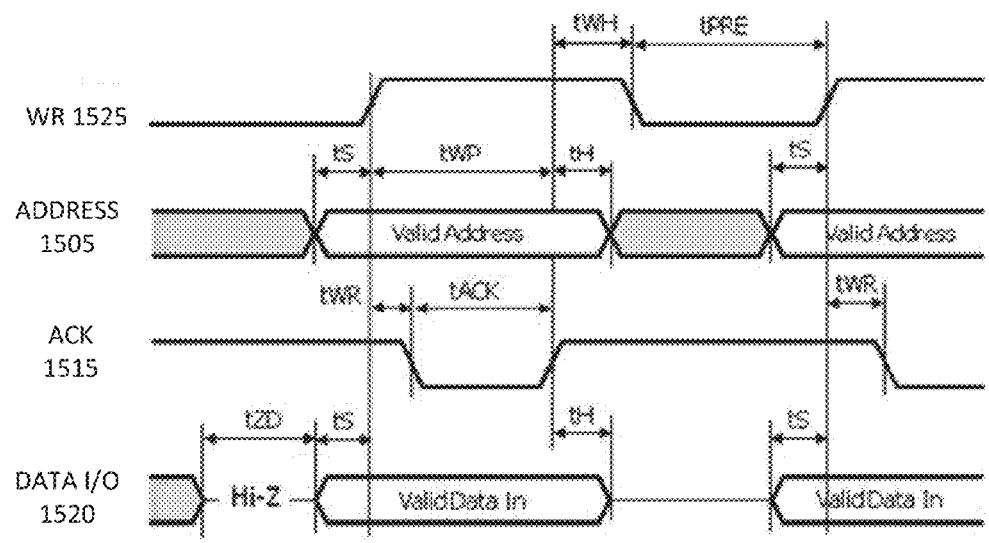
FIG. 17A is a Signal Table according to inventive concepts.
FIG. 17B is a schematic timing diagram of an asynchronous write operation with acknowledgement, associated with the table of FIG. 17A, according to inventive concepts.

FIGS. 15A and 15B are a pin out table and command table, respectively, according to inventive concepts. FIG. 15C is a schematic diagrams illustrating read/write operation handshaking circuitry associated with the tables of FIGS. 15A and 15B, according to additional principles of the inventive concept. FIG. 16A is a signal table according to inventive concepts. FIG. 16B is a schematic timing diagram of an asynchronous read operation with acknowledgement, associated with the table of FIG. 16A, according to inventive concepts. FIG. 17A is a Signal Table according to inventive concepts. FIG. 17B is a schematic timing diagram of an asynchronous write operation with acknowledgement, associated with the table of FIG. 17A, according to inventive concepts.

Referring to FIGS. 15A through 17B, the smart memory controller preferably includes a handshaking interface with acknowledgement to ensure proper read and/or write operations, thereby providing a reduction in memory errors. Referring specifically to FIGS. 15A-15C and 16A-16B, during an asynchronous read operation with handshaking, an address (e.g., A0-Aj) is placed on the address line 1505 and a read signal (RD) 1510 is sent to the control logic 140 to enable the read operation. As a valid address (e.g., valid address 1605) appears on the address line 1505, an acknowledgement signal (ACK) 1515 transitions from high to low. Once the data is successfully read out from the indicated address location, the acknowledgement signal (ACK) 1515 transitions back from low to high to indicate that the data is valid. The data is then output through the Data I/O 1520.

Referring now to FIGS. 15A-15C and 17A-17B, during an asynchronous write operation with handshaking, data to be written to the memory is placed on the Data I/O line 1520 and an address is placed on the address line 1505. A write signal (WR) 1525 is sent to initiate the write operation to the memory cell at the address location specified on the address line 1505. An acknowledgement signal (ACK) 1515 drops from high to low once the write process has started. Once the write operation is completed and the data is verified as having been properly written to the selected memory cell, the acknowledgement signal (ACK) 1515 transitions back from low to high to indicate that the write operation was successful.

The I/O read/write evaluate section 1530 may receive RD and/or WR signal from the control logic 140 and process the read or write signal. The section 1530 may also send a return signal 1540 to the control logic 140 based on the processing. The DQ input/output section 1520 may be controlled by the control logic 140 via the control signal 1545. By providing read and write operations with acknowledgement, memories such as those exhibiting probabilistic tendencies or slow read/write times can be implemented with lower error rates.

Figure 18A:
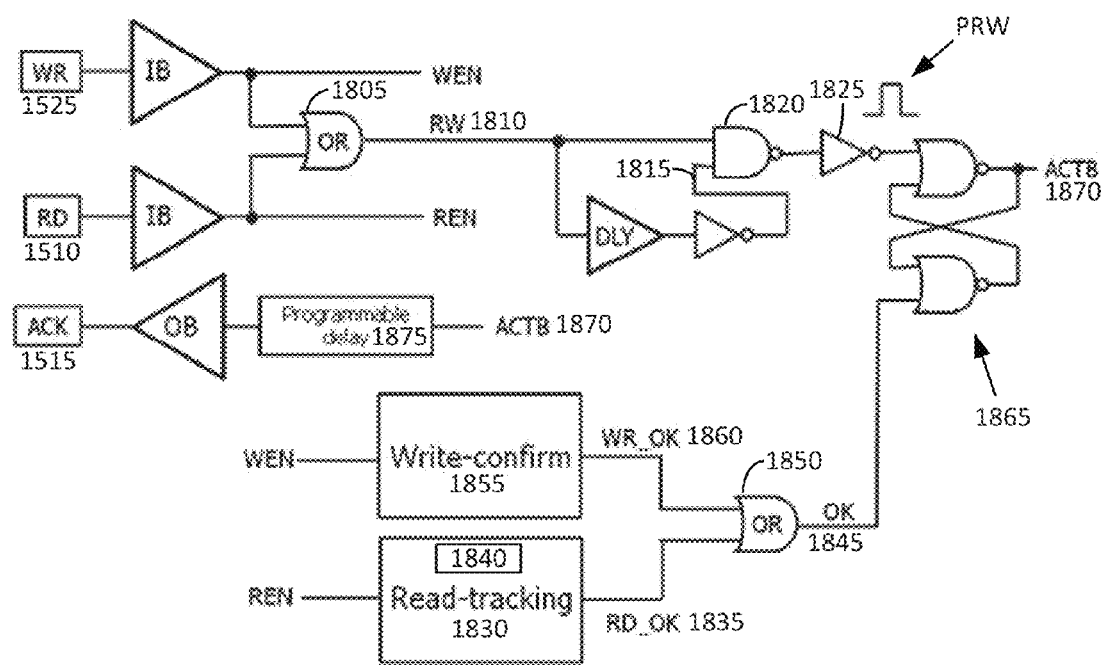
FIG. 18A is a schematic block and logic diagram of a memory control circuit for controlling the asynchronous read and write operations represented in FIGS. 16A through 17B.
Figure 18B:
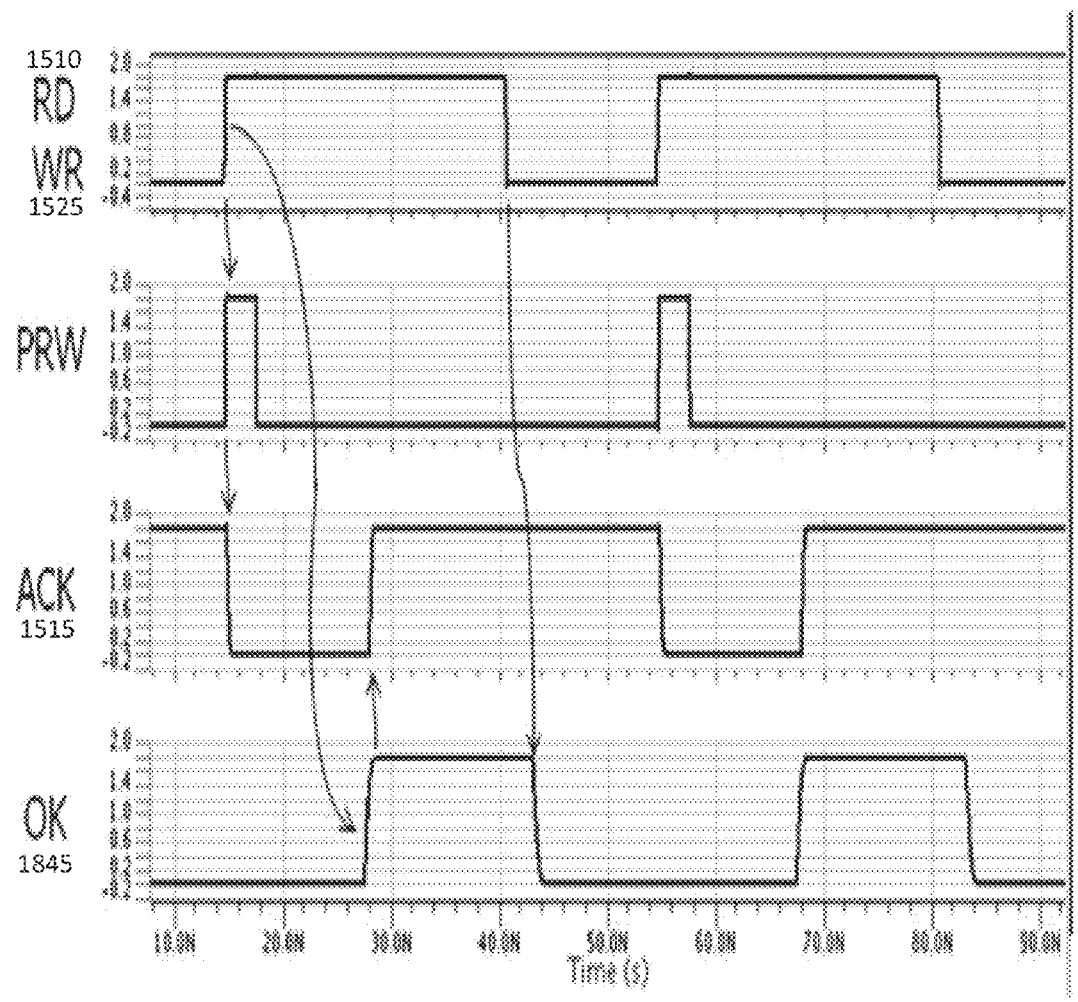
FIG. 18B is a signal timing diagram illustrating the timing of signals for the control circuit of FIG. 18A.

FIG. 18A is a schematic block and logic diagram of a memory control circuit, which can be used for controlling the read and write operations with acknowledgement as described above with respect to FIGS. 15A through 17B. FIG. 18B is a timing diagram illustrating the signals used and generated by the circuit of FIG. 18A. Referring now to FIGS. 18A and 18B, a read (RD) signal 1510 and/or write (WR) signal 1525 is generated by the device in response to user instructions. When either the RD or WR signal is activated, the circuit will generate a signal pulse PRW, which in turn initiates the acknowledge (ACK) signal 1515 by causing it to fall from high to low.

More specifically, an active write signal WR 1525 passes through an input buffer (IB) to provide the write enable signal (WEN). Similarly, an active read signal (RD) 1510 passes through an input buffer (IB) to provide the read enable signal (REN). When either enable signal WEN or REN passes through the OR gate 1805, it will generate a high RW signal 1810 that, when combined with its delayed complement 1815 in the NAND gate 1820 and then inverted by inverter 1825, creates the pulse PRW.

In a read cycle, the RD signal 1510 turns on the read path and the read tracking circuit 1830 (as further described with reference to FIG. 21 below). When data read from the memory cell is successfully retrieved and latched in a data output latch, the read ok (RD_OK) signal 1835 is generated by the SAE timing tracking and control circuitry 1840 (as further shown and described with reference to FIG. 23A below), producing the OK signal 1845 from the OR gate 1850, which brings the acknowledge (ACK) signal 1515 back to high to indicate that the read cycle has successfully completed.

Similarly, during a write cycle, the write (WR) signal 1525 turns on the write path and the write confirmation circuit 1855 (as further shown and described with reference to FIG. 20B below). Once the data has been written, and verified using the write confirmation circuit 1855, the write ok (WR_OK) signal 1860 is generated, which also produces the OK signal 1845 from the OR gate 1850, which brings the acknowledge (ACK) signal 1515 back to high to indicate that the write cycle has successfully completed.

More specifically, either the WR_OK signal 1860 from the write confirm circuit 1855 or the RD_OK signal 1835 from the read tracking circuit 1830 when passed through the OR gate 1850 will generate the OK signal 1845. The OK signal 1845 is then transmitted to a latch 1865, which outputs the acknowledge triggering signal (ACTB) 1870. The ACTB signal 1870 is then passed through a programmable delay 1875 to an output buffer (OB) to bring the ACK signal 1515 back to high.

Figure 19:
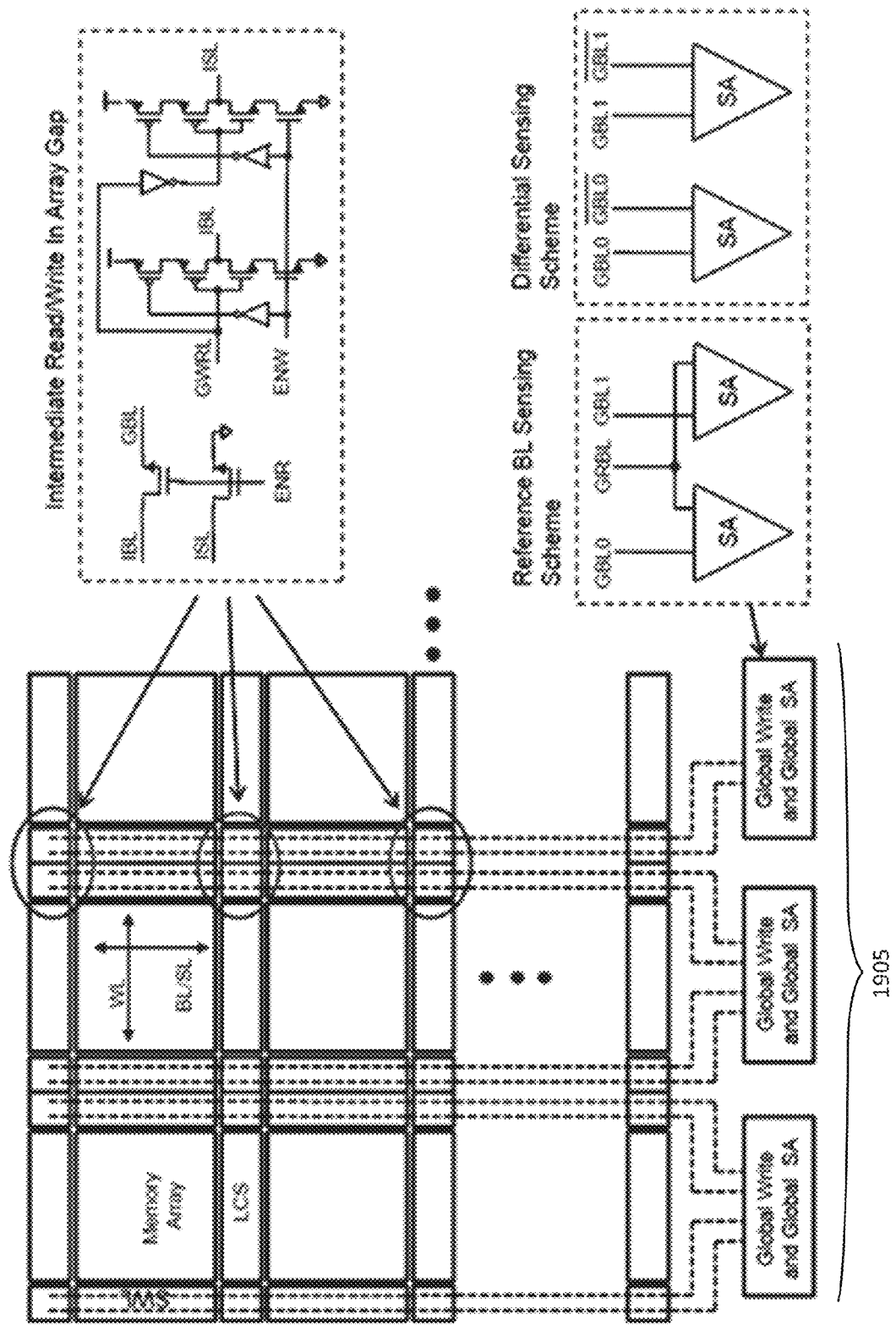
FIG. 19 is a schematic block and circuit diagram of a scalable heirarchical read/write architecture that can be used in the read and write operations represented in FIGS. 16A through 17B.

FIG. 19 is a schematic diagram of a scalable hierarchical read/write architecture, which can be used in the read and write operations of FIGS. 16A through 17B. Referring to FIG. 19, read or write operations of the memory device proceed with respect to memory cells selected from a memory array using wordlines and bitlines/select lines. Data retrieved from the selected memory cell is passed to a global sense amplifier (SA) (e.g., 1905) to read the data output from the cell. Data to be written to the selected memory cell is provided to the cell by the global write circuit (e.g., 1905).

Figure 20A:
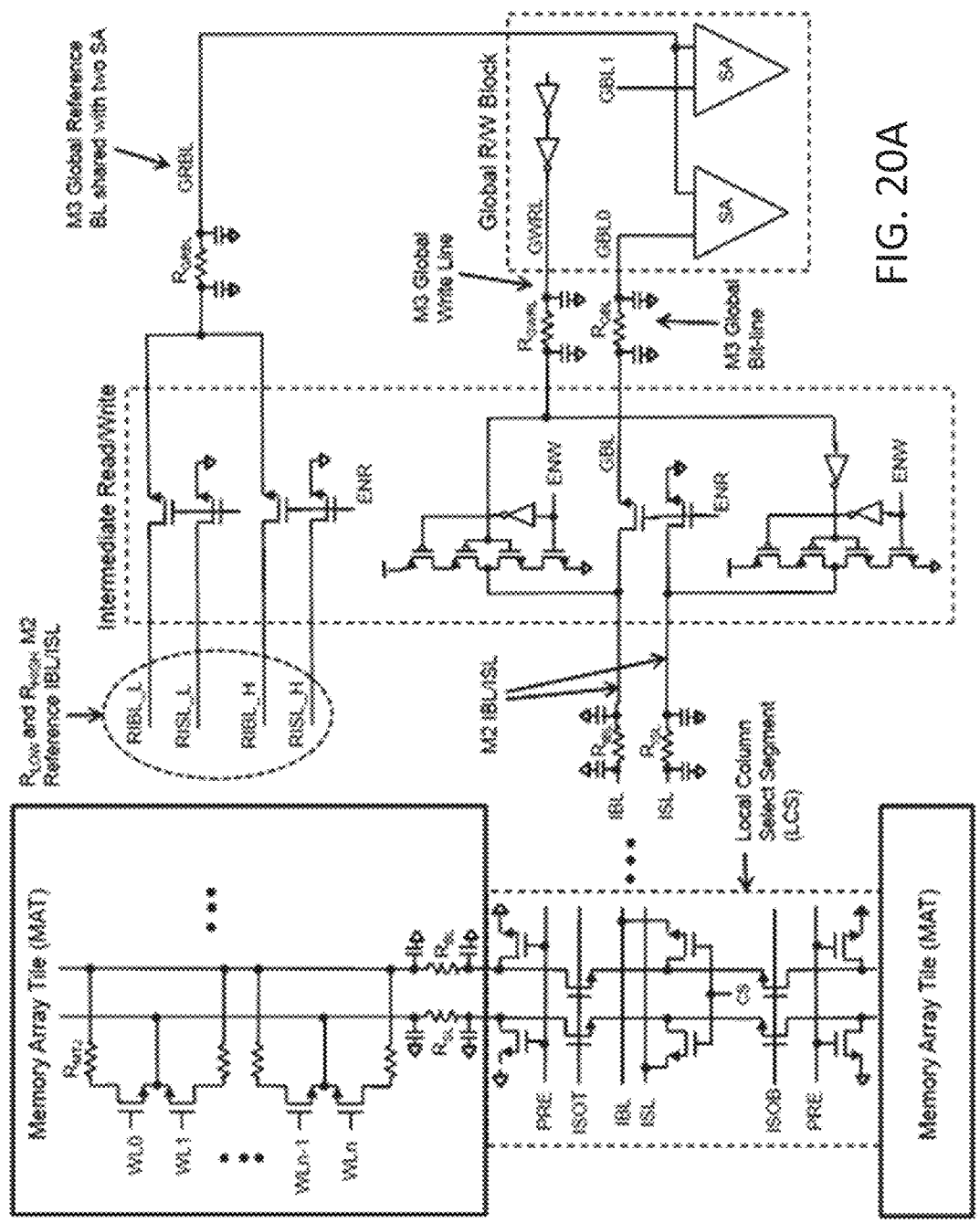
FIG. 20A provides schematic circuit diagrams of a memory array and control circuit according to inventive concepts.
Figure 20B:
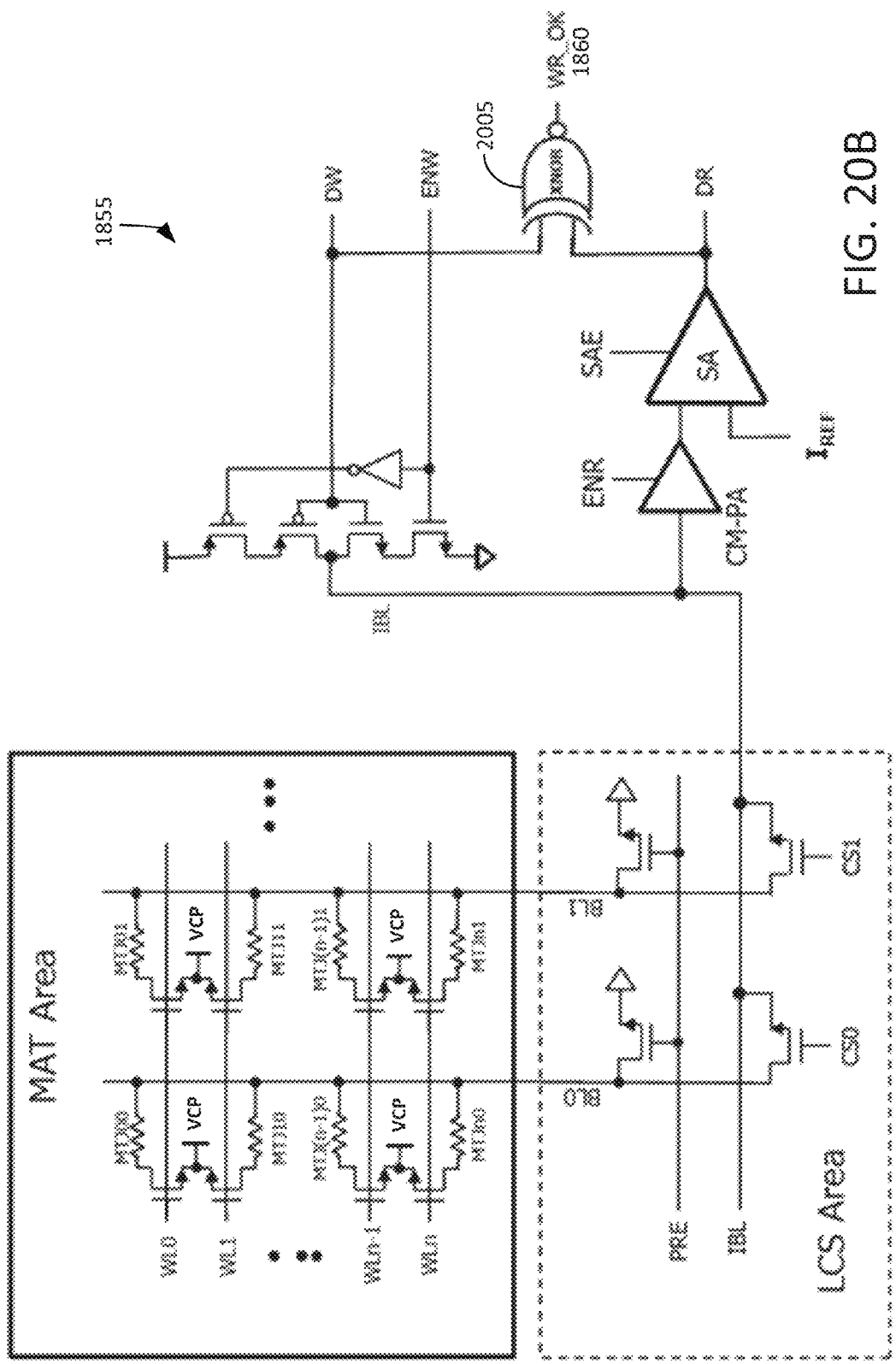
FIG. 20B is a schematic circuit and logic diagram of a write confirmation circuit constructed according to inventive concepts.

FIG. 20A provides schematic diagrams of a memory array and control circuit. FIG. 20B is a schematic diagram of a write confirmation circuit 1855. Referring to FIG. 20B, a write verify and re-write operation will now be described. During a write operation, a memory cell in the Memory Array Tile (MAT) Area is selected by activating its corresponding wordline (WL) and bitline (BL). Data is then written into the selected memory cell. A write control circuit disables the local write enable signal (ENW) after the required write pulse width (tWP), e.g., 5 ns. A local read enable signal (ENR) is then generated to read the data from the same address location that was just written to during the write operation. The data-in (DW) line is held valid and compared to the data-out (DR) line via the XNOR gate 2005. If the two data signals (DW and DR) are different, the write ok (WR_OK) signal 1860 remains low, indicating that the write operation has not been successful. If the two data signals (DW and DR) are the same (indicating that the data that was supposed to be written to the memory cell was the same as the data that was read from that cell), then the WR_OK signal 1860 goes high, signaling a successful write operation. As discussed previously, the WR_OK signal 1860 can then be used to generate an acknowledgement signal 1515, which indicates to the memory controller that the write operation was successful. Alternatively, a re-settable register or enable circuit (not shown) can be used to ensure WR_OK is reset low and held low until after the write operation starts and the DR is valid.

Read tracking can be used to complete the write-verify read operation and strobe the compare output (WR_OK) signal 1860. When the WR_OK signal 1860 goes high, the write cycle is complete. If a low signal is detected in the WR_OK signal 1860, the write control circuit generates a new write cycle in the same address location to re-write the data, and the verification process repeats itself. This process can continue until the write operation is successful or until the cell is determined to be defective and its address is reported to the NVM Program Memory 195.

Figure 21:
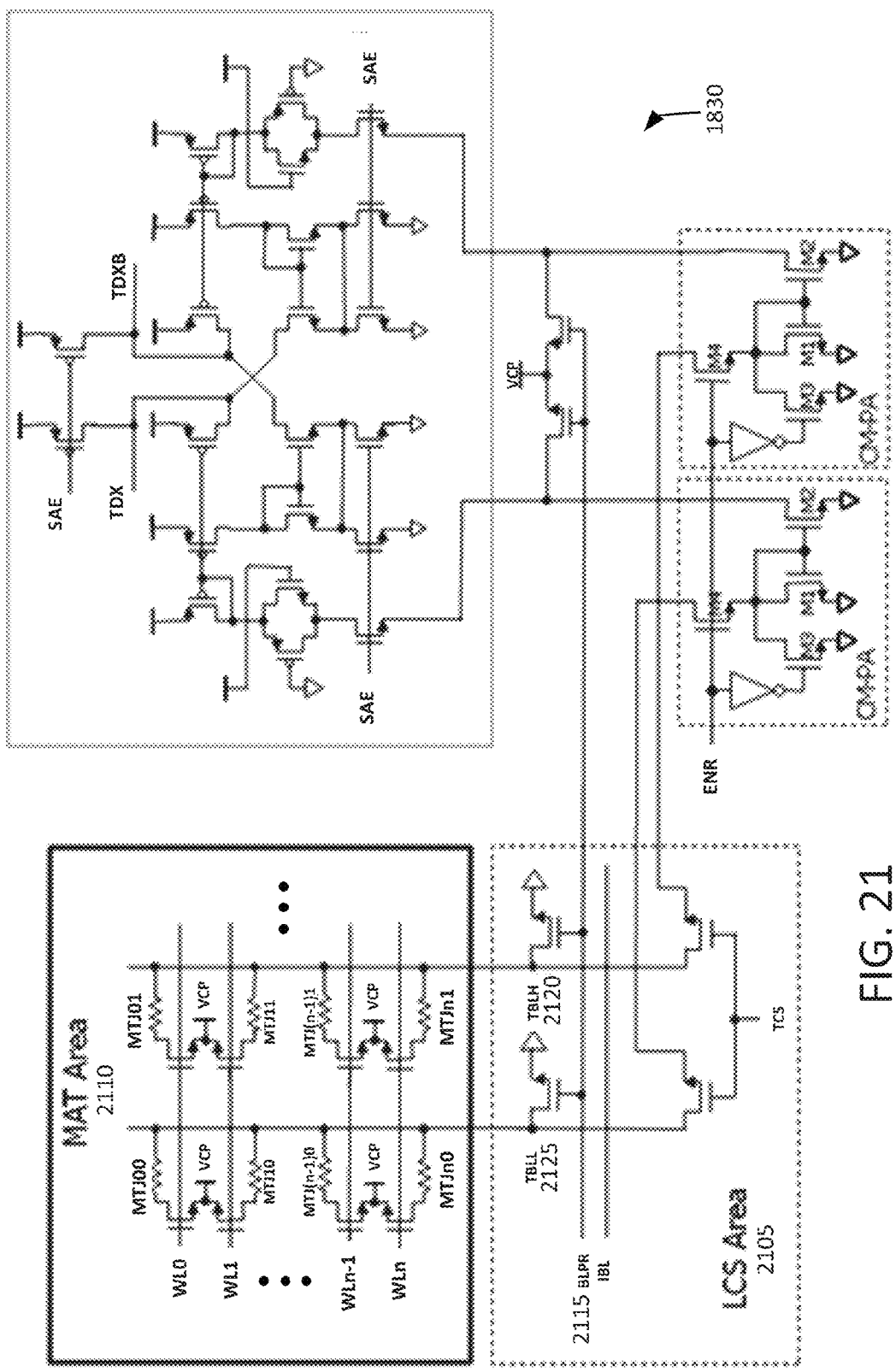
FIG. 21 is a schematic diagram of a read tracking circuit constructed according to inventive concepts.
Figure 22:
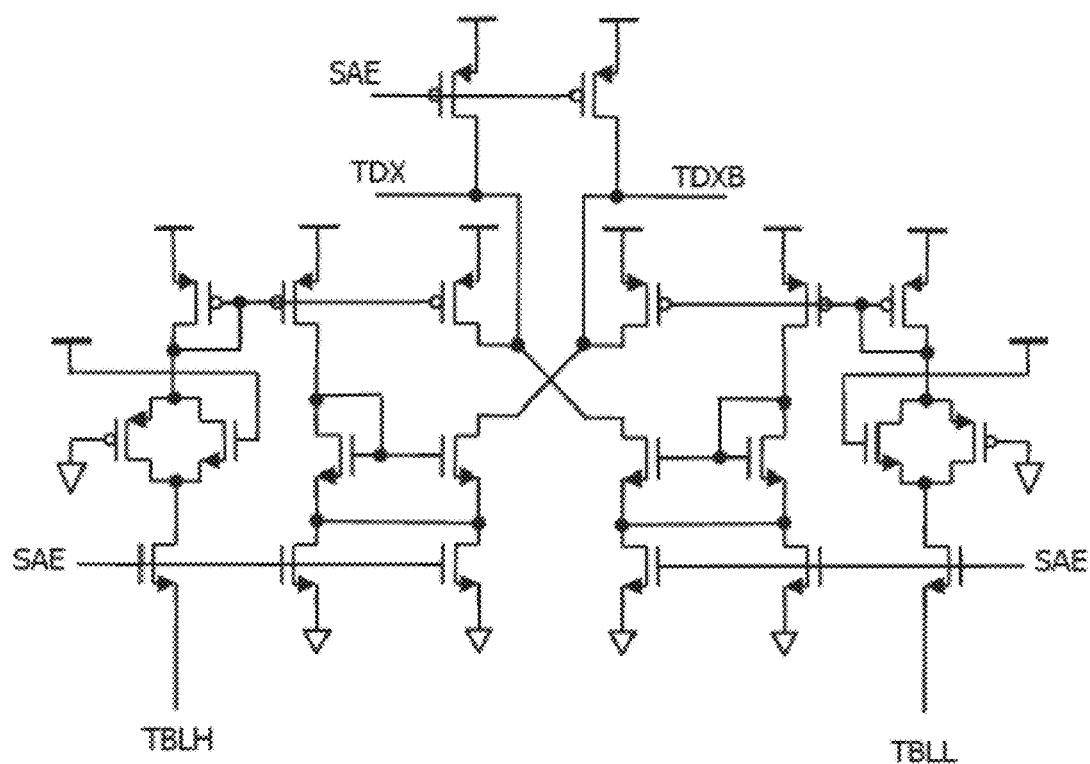
FIG. 22 is a schematic diagram of current-voltage converter and amplification circuitry according to inventive concepts.
Figure 23A:
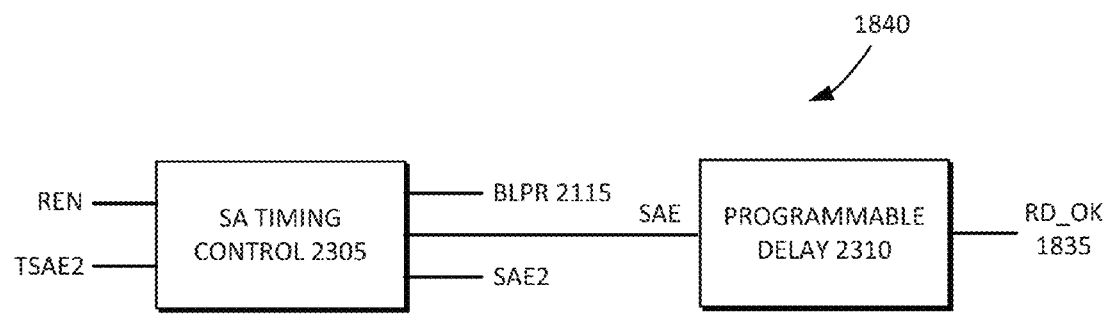
FIGS. 23A and 23B include schematic block diagrams of SAE timing tracking and control circuitry according to inventive concepts.
Figure 23B:
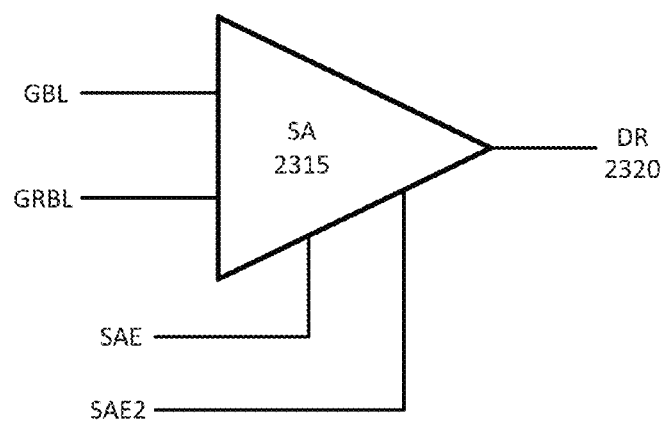
Figure 24:
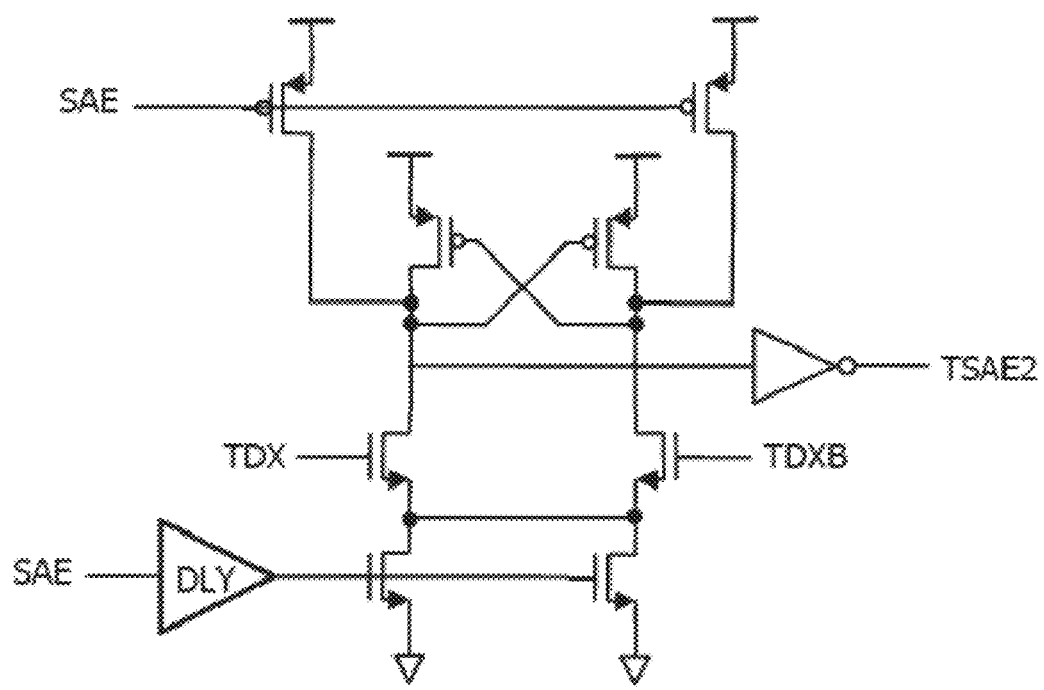
FIG. 24 is a schematic diagram of analog to digital conversion circuitry according to further inventive concepts.

FIG. 21 is a schematic diagram of a read tracking circuit 1830. FIG. 22 is a schematic diagram of current-voltage converter and amplification circuitry. FIGS. 23A and 23B include schematic block diagrams of SAE timing tracking and control circuitry. FIG. 24 is a schematic diagram of analog to digital conversion circuitry.

Referring now to FIGS. 20A, 20B, 21, 22, 23A, 23B and 24, in the read tracking circuitry 1830, a dummy read path can be used to track the read circuit (RC) delay. The read tracking circuit 1830 can include current-voltage conversion and voltage amplification circuitry, along with current meter pre-amplifier circuits (similar to that shown and described with respect to FIG. 7). Local Column Select (LCS) circuitry 2105 communicates with the MAT area 2110 and passes a bitline precharge signal (BLPR) 2115 to the read tracking circuit 1830 along with data sensed on the selected true and complement bitlines (TBLH 2120 and TBLL 2125).

The dummy read path can include bit lines (BLs), column select transistors, pre-amps, and global sense amps. True and complement dummy BLs ($R_{high}$, TBLH, $R_{low}$, and TBLL) are used to generate the sensing delay. An output tracking sense amp signal (e.g., TSAE2 of FIG. 24) of the dummy sense amp activates when enough separation is generated from the first stage (TDX/TDXB). An active TSAE2 signal triggers SAE2 (of FIGS. 23A and 23B) to latch normal data in the regular sense amp (SA) 2315 and isolate the current path in each SA stage.

The Read Enable signal (REN) and TSAE2 are input into a sense amp timing control circuit 2305 (of FIG. 23A). The sense amp timing control circuit 2305 generates the bitline precharge (BLPR) signal 2115 and the sense amp enable signals (e.g., SAE and SAE2). The bitline precharge (BLPR) signal 2115 is held high until about the time the read operation is to be performed. After it is released (i.e., shut off), the read is performed. More specifically, either REN or WEN can deactivate the BLPR signal, which releases the bitlines for reading or writing. The sense amp enable signal (SAE) is passed through a programmable delay 2310 (of FIG. 23A) to produce the RD_OK signal 1835. The sense amp (SA) 2315 (of FIG. 23B) receives the sense amp enable signals (SAE and SAE2) and global bitline voltages (GBL and GRBL) (see FIG. 19) and outputs the read data signal DR 2320.

Figure 25A:
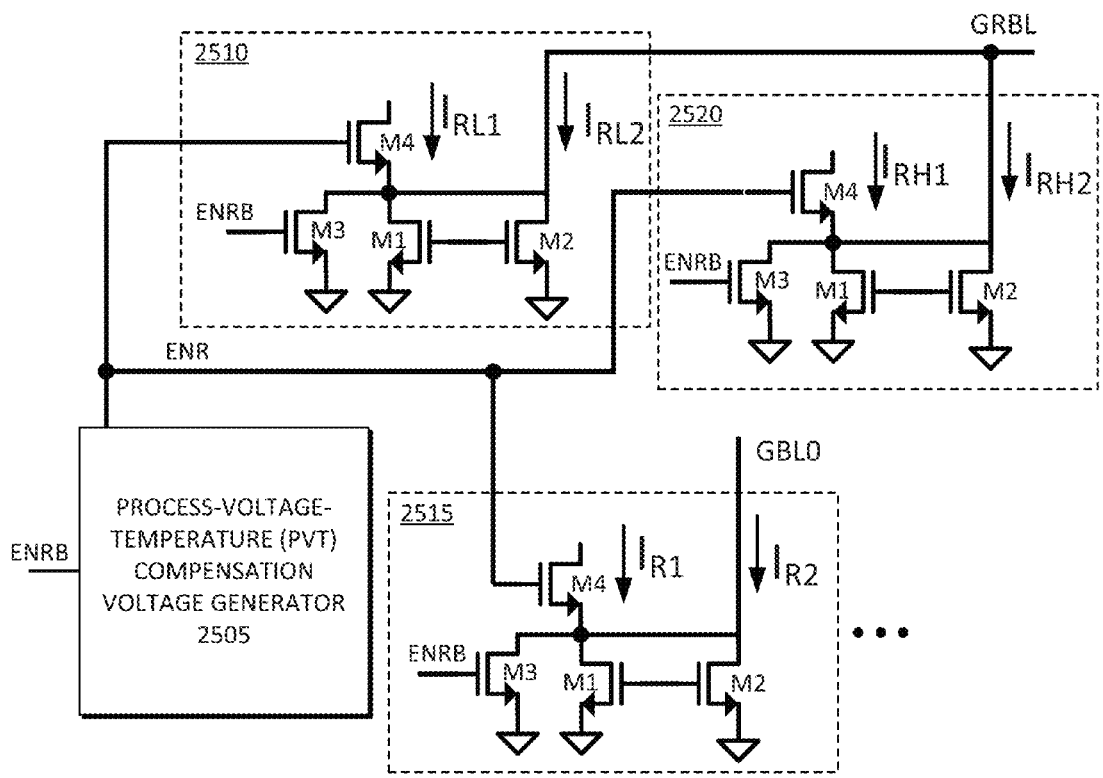
FIG. 25A is a schematic block and circuit diagram of temperature compensation voltage generation circuitry, according to further inventive concepts.
Figure 25B:
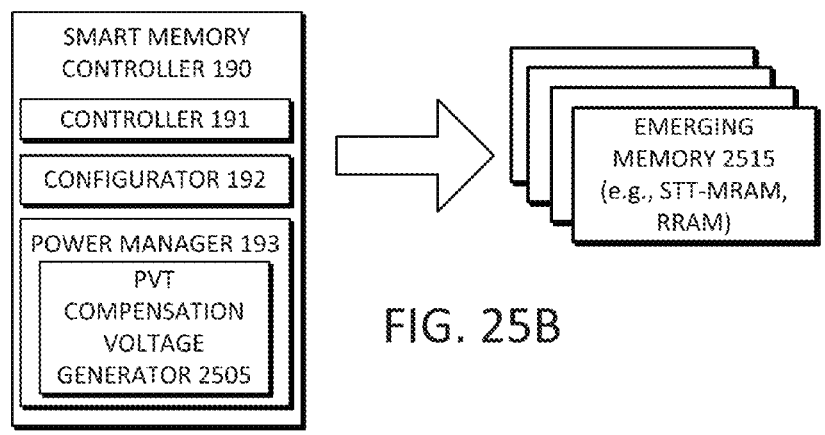
FIG. 25B is a schematic system block diagram including the circuitry of FIG. 25A.

FIG. 25A is a schematic block and circuit diagram of temperature compensation voltage generation circuitry 2505, according to further inventive concepts. FIG. 25B is a schematic system block diagram including the circuitry of FIG. 25A. Reference is now made to FIGS. 25A and 25B.

Power management systems can be important in STT-RAM memory applications, for example, because low read voltages and currents assist in preventing read disturbances during the read operation. A read current that is too high could result in data corruption, for example, by causing the data to switch from a "1" to a "0" value.

The smart memory controller 190 may include power manager 193. The power manager 193 may include a process-voltage-temperature (PVT) compensation voltage generator 2505. The PVT compensation voltage generator 2505 controls a voltage level of an enable read (ENR) signal to provide a stable and constant read current through M1 transistors. The PVT compensation voltage generator 2505 can compensate for temperature fluctuations and other power variables to provide stable supply voltages for the memory operations. The PVT compensation voltage generator 2505 may be coupled to multiple groups (e.g., 2510, 2515, and 2520) of MOS transistors (e.g., M1, M2, M3, and M4). The PVT compensation voltage generator 2505 may transmit the voltage-level-controlled ENR signal to the groups of MOS transistors. The ENR and ENRB signals cause stable and constant read currents to flow through the MOS transistors. For example, currents $I_{RL1}$ and $I_{RL2}$ are associated with group 2510, currents $I_{RH1}$ and $I_{RH2}$ are associated with group 2520, and currents $I_{R1}$ and $I_{R2}$ are associated with group 2515.

The smart memory system can therefore be configured according to additional principles of the present inventive concepts to implement power management technologies, which can control the sense amp (SA) read current, control SA clamp voltages, control SA read delay, control write voltage, control periphery voltage during stand-by, and/or control other power requirements of the memory device 2515. The power management system can further provide temperature-based compensations to the voltage levels.

Figure 26A:
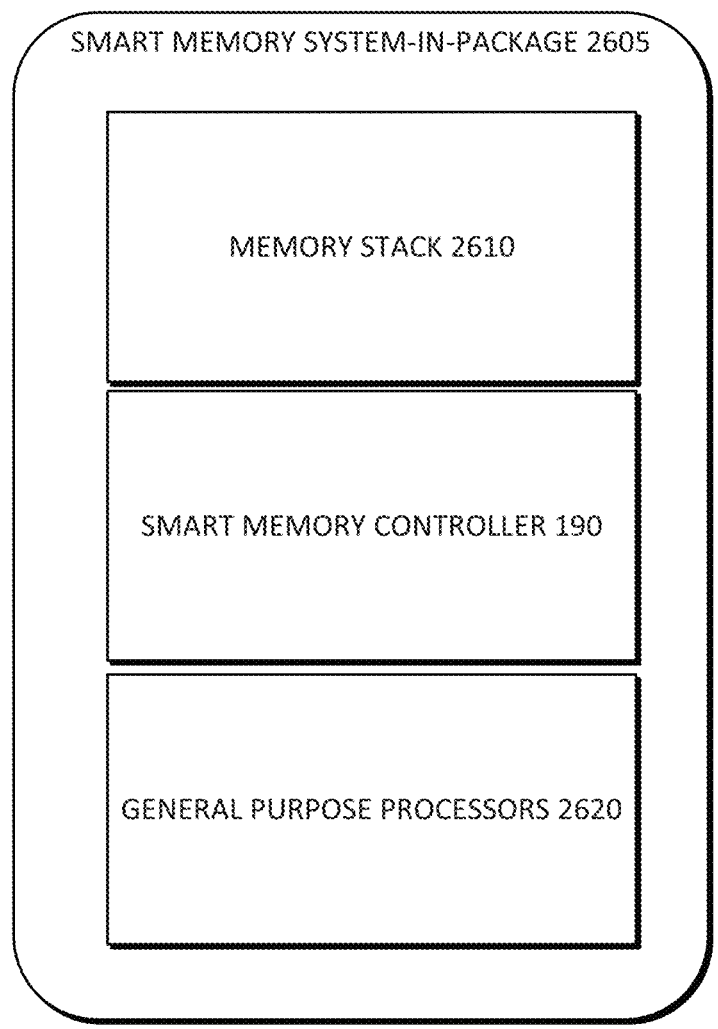
FIGS. 26A and 26B are schematic block diagrams illustrating a System-in-Package (SiP) smart memory system configuration according to inventive concepts.
Figure 26B:
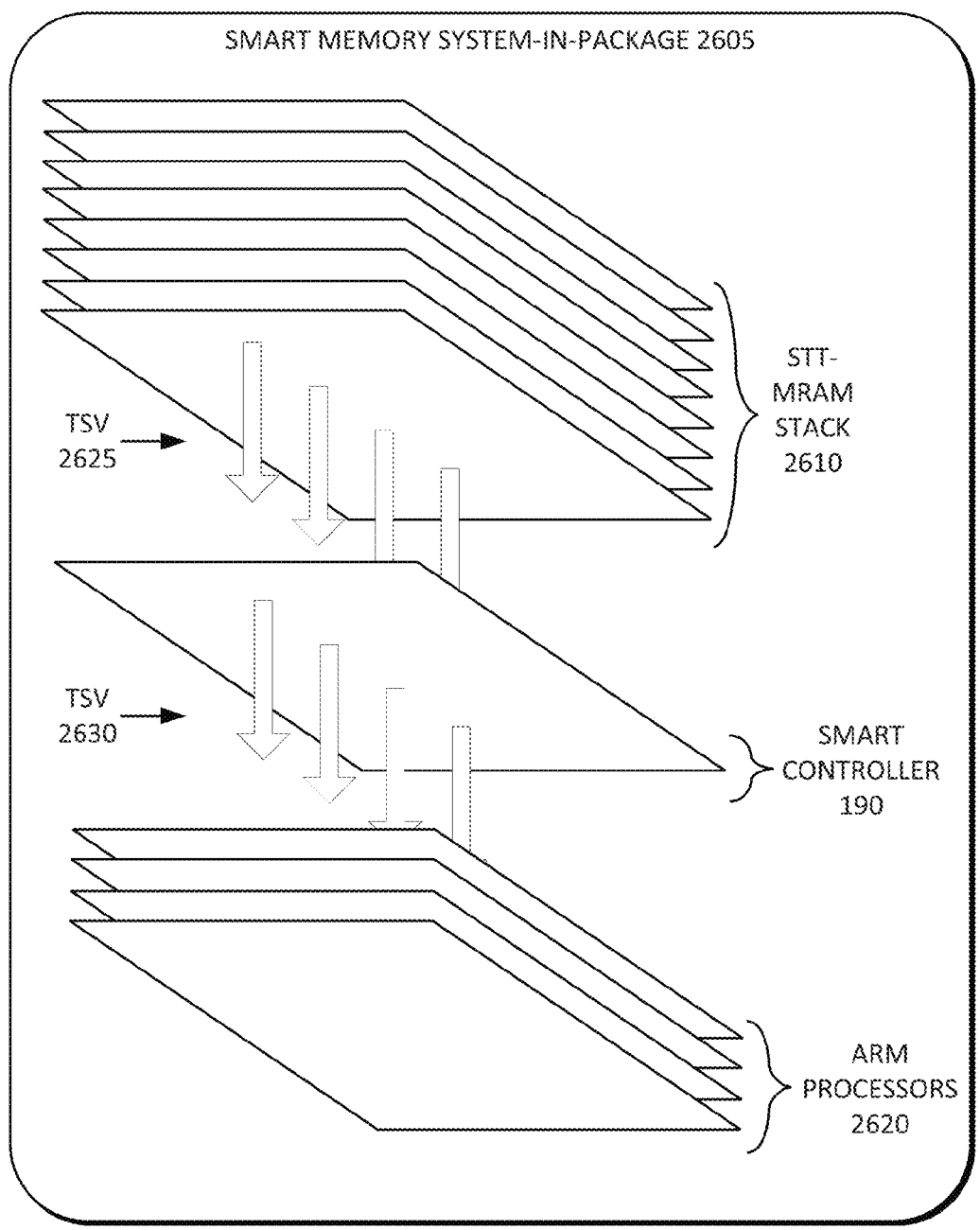

FIGS. 26A and 26B are schematic block diagrams illustrating a System-in-Package (SiP) smart memory system 2605 according to inventive concepts. The smart memory system 2605 may include a memory stack 2610, a smart memory controller 190, and one or more general purpose processors 2620. Certain features and benefits of this inventive concept can be achieved, for example, through incorporation of the smart memory system in a System in Package (SiP) or System on Chip (SoC) design.

It should be noted that implementation of certain of the inventive features in a SiP device benefit from good connectivity between the memory array and memory processor chips to provide improved system performance. This may be accomplished, for instance, by utilizing low latency and high throughput SiP interconnects such as True Silicon Via (TSV) or other System-in-Package (SiP) technology. For example, TSV interconnects 2625 may provide connectivity between the memory stack 2610 and the smart memory controller 190. Similarly, TSV interconnects 2630 may provide connectivity between the smart memory controller 190 and the one or more arm processors 2620. Any cost disadvantages of such a system may be minimized as interconnect technology costs continue to decrease.

Referring specifically to FIG. 26B, a smart memory system according to various principles of the present inventive concept can be implemented as an SiP device. The SiP device can include a memory stack (such as an STT-MRAM memory stack 2610, for example) arranged on a smart memory controller 190, which in turn is arranged on one or more RISC processors (such as general purpose ARM processors 2620, for instance). The memory stack can communicate with the smart memory controller 190, and the smart memory controller 190 with the processors 2620 through respective True Silicon Vias (TSVs) 2625 and 2630, respectively.

Figure 27:
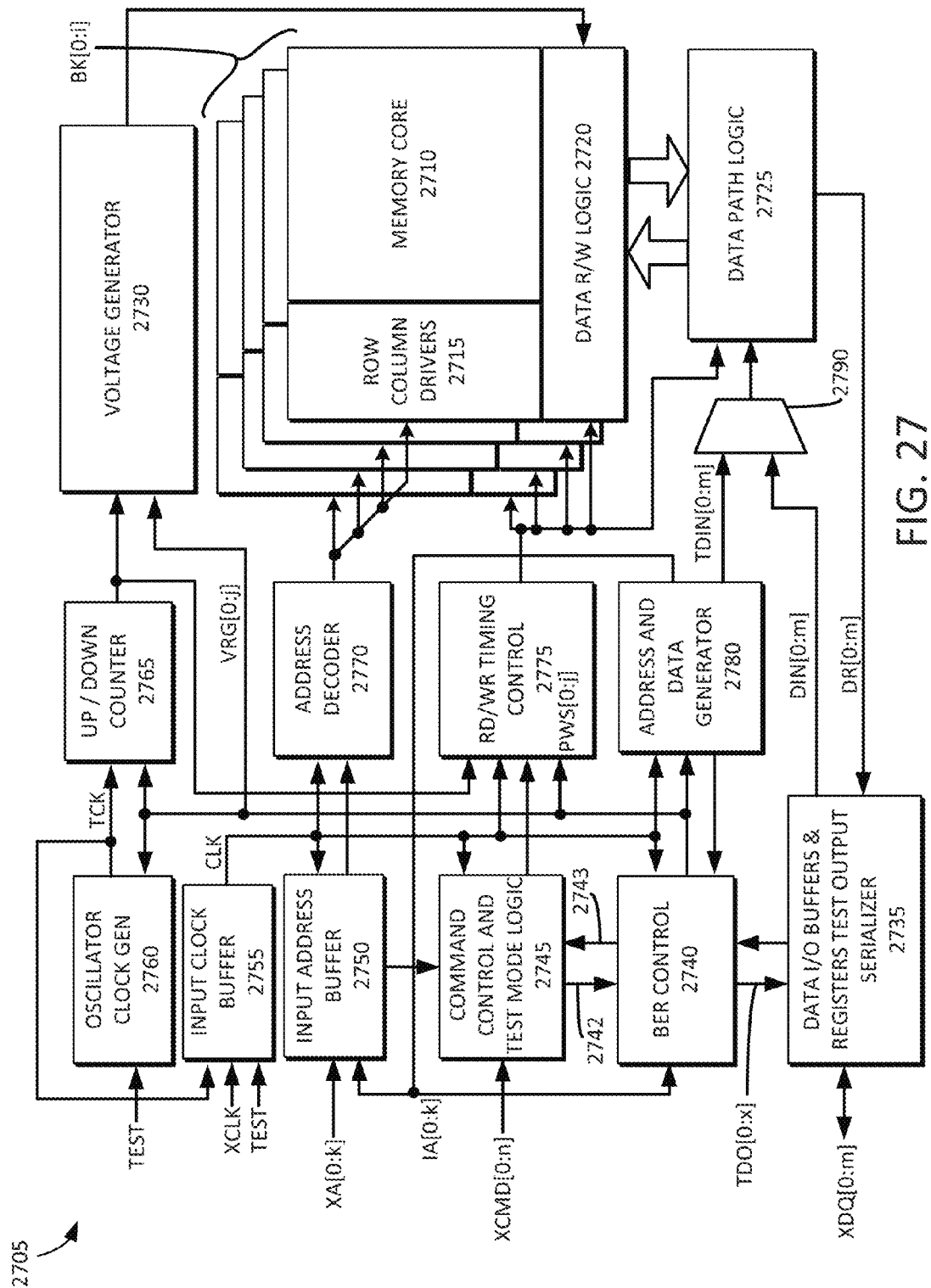
FIG. 27 is a schematic memory block diagram according to inventive concepts.

FIG. 27 is a schematic memory block diagram 2705 according to inventive concepts. FIGS. 28A, 28B, 29-30, 31A, and 31B are schematic block diagrams of bit error rate control logic 2740 of the memory block diagram of FIG. 27 according to inventive concepts.

The inventive concepts discussed with respect to these figures provide the ability to perform a bit error rate (BER) built-in self test on a memory device. After entering a test mode, error rate timing patterns are internally generated. The BER built-in self test is performed based on the internally generated error rate timing pattern. An error rate resulting from the BER built-in self test is measured. Based on the measured error rate, one or more test parameters can be automatically adjusted, and the bit error rate built-in self test can be repeated using the adjusted parameters. Voltage levels and/or pulse widths may be automatically adjusted for an address location, an address segment, or for an entire chip associated with the memory device. Subsequent tests may incorporate the adjusted voltage levels and/or pulse widths, which can refine and improve the built-in self test. These and other inventive aspects are discussed in detail below.

The inventive concepts can be implemented in resistive type memory such as STT-MRAM, PCM and ReRAM memory products to screen out memory bits with high error rates. The inventive concepts can be extended to simple functional test, stability tests, and/or retention tests. A single or multiple test modes can be used to evaluate WER and RER automatically, and the results can be read out after complete testing or after each voltage step and address location. The smart memory controller can monitor the health of memory bits in the field and automatically re-assign memory space when, for example, BER increases beyond the system error correcting code (ECC) capability. The smart memory controller may use the WER and/or RER results to make adjustments in write or read voltage and pulse widths for each address location, address segment, or for an entire memory chip. A single smart memory controller or ATE can initiate tests in multiple chips. In wafer and package level testing, the ATE can initiate the test mode, the memory chips can complete self-testing, and the ATE can then read the final results. In some embodiments, particularly when the memory chips are already deployed in the field, the data stored in the memory chip can be off-loaded to another module prior to testing, and then restored after the testing, to ensure that no data corruption occurs during testing. In some embodiments, the voltage applied during testing is controlled or supplied externally. Thus, failed memory locations can be identified and repaired or isolated. In addition, the RER and WER built-in self tests allow for easy test generation and data collection for a memory chip.

Referring to the memory block diagram 2705 of FIG. 27, the memory device may include one or more memory cores 2710, one or more row column drivers 2715, and one or more data read/write logic sections 2720. Such memory cores 2710, drivers 2715, and logic sections 2720 may be arranged in blocks (i.e., BK[0:i]). Bit error rate (BER) control logic 2740 may control a bit error rate built-in self test. The smart memory controller and/or ATE may send code to put the memory 2705 into a BER test mode. The BER control logic 2740 may receive one or more input address (e.g., IA[0:k]) signals. The BER control logic 2740 may generate voltage regulator control signals for read/write voltage adjustment (i.e., Vrd and Vwr), which can be distributed to various components of the memory 2705 as illustrated. An address and data generator 2780 is coupled to the BER control logic 2740. The address and data generator 2780 may receive the one or more input addresses (e.g., IA[0:k]) and may internally generate one or more addresses and/or data for use in the BER built-in self test. The address and data generator 2780 may include a write error rate test pattern generator to generate a write error test pattern for the bit error rate built-in self test, and a read error rate test pattern generator to generate a read error test pattern for the bit error rate built-in self test.

The BER control logic 2740 may be coupled to command control and test mode logic 2745. The command control and test mode logic 2745 may receive one or more external command XCMD[0:n] signals, and an input address from input address buffer 2750 to set test mode registers. The input address buffer receives input addresses from external address signals XA[0:k] in normal operation, or internally generated addresses IA[0:k] in the BER test mode. The command control and test mode logic 2745 may generate one or more test signals 2742, which may include a write reset (RSTW), write (WR), read (RD), and/or exit test (EXTST) signal, and which may be received by the BER control logic 2740. The BER control logic 2740 may generate one or more signals 2743, which may include a test (TEST), test wire error rate (TWER), test read error rate (TRER), test pulse width (TPWS), and/or test voltage regulator (TVRG) signal, and which may be received by the command control and test mode logic 2745. The BER control logic 2740 may also generate one or more test data out (e.g., TDO[0:x]) signals, which may be received by data I/O buffers and registers test output serializer 2735.

The memory 2705 may also include read and/or write timing control logic 2775, which may be coupled to the command control and test mode logic 2745 and to the BER control logic 2740. The read and/or write timing control logic 2775 may also be coupled to corresponding data read/write logic 2720.

The address and data generator 2780 may generate one or more test data in (e.g., TDIN[0:m]) signals, which may be fed to a selector 2790 such as a multiplexor. The selector 2790 may also receive one or more data in (e.g., DIN[0:m]) signals, and transmit the selected signals to data path logic 2725. The data path logic 2725 may interface with the corresponding data read/write logic 2720. The data path logic 2725 may also generate and transmit one or more data read (e.g., DR[0:m]) signals to the data I/O buffers and registers test output serializer 2735. The data I/O buffers and registers test output serializer 2735 may receive one or more external data I/O (e.g., XDQ[0:m]) signals, process such signals, and generate the or more data in (e.g., DIN[0:m]) signals.

The input address buffer 2750 may receive the one or more internally generated address (e.g., IA[0:k]) signals as well as one or more external address (e.g., XA[0:k]) signals. The input address buffer 2750 is coupled to the command control and test mode logic 2745 and to an address decoder 2770. The address decoder 2770 can decode the addresses and interface with the row column drivers 2715.

An input clock buffer 2755 can receive the test clock signal (e.g., TCK), the XCLK clock signal, and or the TEST signal. The input clock buffer 2755 outputs the clock signal CLK, which can be fed to the input address buffer 2750, the address decoder 2770, the command control and test mode logic 2745, the read/write timing control logic 2775, the BER control logic 2740, and/or the address and data generator 2780.

An on-chip oscillator clock generator 2760 may receive the TEST signal and may generate an internal test clock (e.g., TCK) signal. The TCK clock signal may be fed to an up/down counter 2765, the output of which may be coupled to a voltage generator 2730 and the read/write timing control logic 2775. The voltage generator 2730 may receive the output of the up/down counter 2765 as well as the VRG[0:j] signals from the BER control logic 2740. VRG[0:j] signals may select j+1 voltage levels. The voltage generator 2730 may output a separate (j+1) read voltage (Vrd) levels and (j+1) write voltage (Vwr) levels, which may be received by the data read/write logic 2720. The Vrd power bus can drive the sense amplifier, particularly the read current bias circuit. The Vwr power bus can drive the write drivers.

FIGS. 28A, 28B, 29-30, 31A, and 31B are schematic block diagrams of circuitry of the BER control logic 2740 of the memory 2705 of FIG. 27 according to inventive concepts.

Figure 28A:
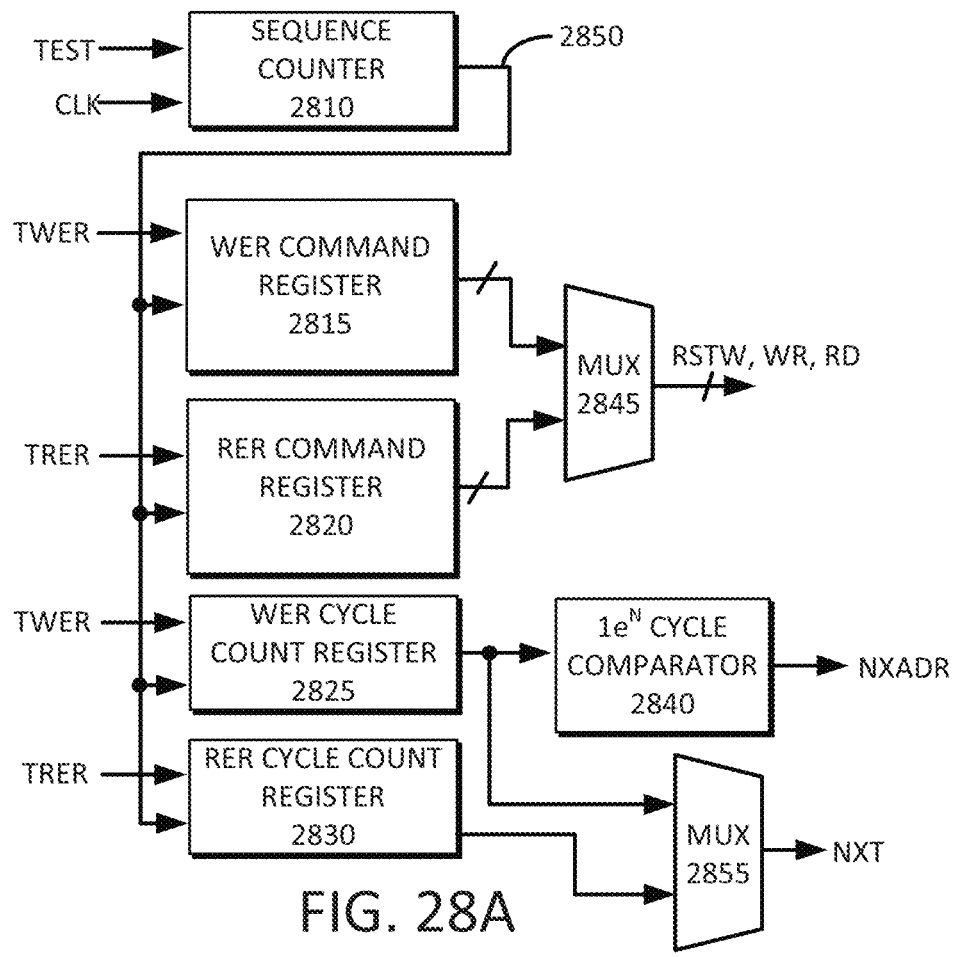
FIGS. 28A, 28B, 29-30, 31A, and 31B are schematic block diagrams of bit error rate control logic of the memory block diagram of FIG. 27 according to inventive concepts.

Referring to FIG. 28A, a sequence counter 2810 may receive the TEST signal and the clock signal CLK, and generate a sequence signal 2850, which can be transmitted to a write error rate (WER) command register 2815, a read error rate (RER) command register 2820, a WER cycle count register 2825, and/or a RER cycle count register 2830. The WER command register 2815 and the WER cycle count register 2825 may each receive the TWER signal. The RER command register 2820 and the RER cycle count register 2830 may each receive the TRER signal. A selector 2845 selects between the output of the WER command register 2815 and the RER command register 2820. The selector 2845 can output the RSTW signal, the WR signal, and/or the RD signal. A selector 2855 selects between the output of the WER cycle count register 2825 and the RER cycle count register 2830. The selector 2855 can output the NXT signal for moving to the next voltage and/or pulse width.

A 1 $e^N$ cycle comparator 2840 receives outputs of the WER cycle count register 2825 or the RER cycle count register 2830, and produces a next address (e.g., NXADR) pulse signal to increment to the next memory address location. For WER tests, write voltages can start from $V_{sw0}$ and increment by dV after 1 $e^N$ WER cycles. One WER cycle includes a reset-verify-write-verify sequence. The reset can be implemented at a maximum write voltage. The verify can be implemented at a nominal read voltage. Switching of the bit may then be checked. $V_{sw0}$ is the start write (i.e, set) voltage, which can be, for example, 0.5 Volts or thereabout. dV is the incremental change in write voltage, which can be, for example, 0.1 Volts or thereabout. The ending write voltage is programmable. For example, the ending write voltage can be configured to end at $V_{sw0}$+(N× dV). For example, the ending write voltage can be configured to end at 0.5V+(10×0.1V)=1.5V.

For RER tests, the read voltage can start from $V_{rd0}$ and increment by dV after 1 $e^M$ read cycles. In one embodiment, each RER pattern includes a reset-verify sequence once followed by 1 $e^K$ read cycles. In some embodiments, M=K patterns×N of repeats. In some embodiments, RER= 1 $e^{-(K+N)}$.

In one embodiment, data out is read normally and captured by the smart memory controller or ATE. In another embodiment, the WER and/or RER results may be read, as well as the associated failed address locations, after each voltage step. Such results and address locations may be read via pre-assigned DQ pins.

Figure 28B:

Referring to FIG. 28B, a last address comparator 2835 can receive the TEST signal, the IA[0:k] signals, and the CLK signal, and produce the EXTST signal.

Figure 29:
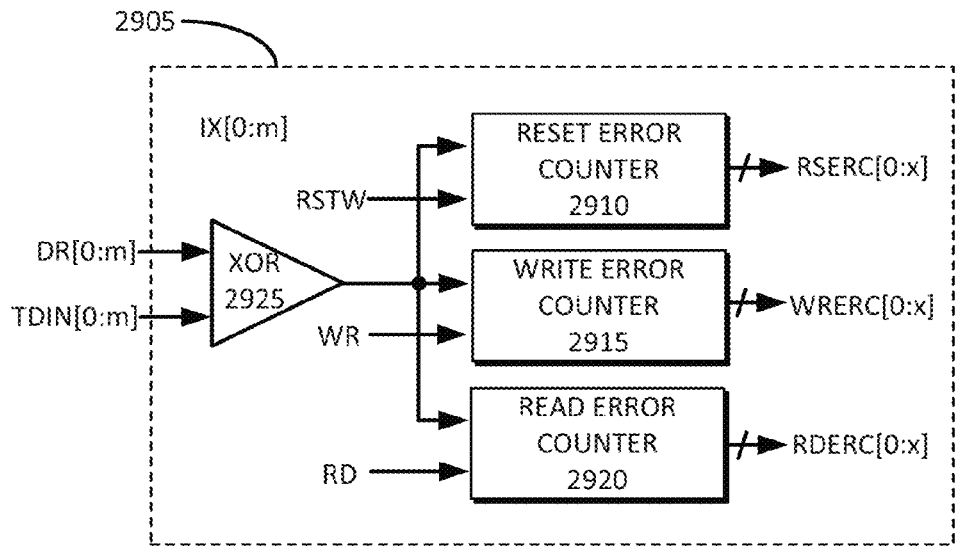

Referring to FIG. 29, a counter 2905 can count reset errors, write errors, and/or read errors. The counter 2905 may include an XOR gate 2925. The XOR gate 2925 may receive the DR[0:m] and TDIN[0:m] signals. The output of the XOR gate 2925 may be fed to a reset error counter 2910, a write error counter 2915, and a read error counter 2920. The reset error counter 2910 can count a number of reset errors of the built-in self test. The write error counter 2915 can count a number of write errors of the built-in self test. The read error counter 2920 can count a number of read errors of the built-in self test.

The reset error counter 2910 may receive the RSTW signal. The write error counter 2915 may receive the WR signal. And the read counter 2920 may receive the RD signal. The reset error counter 2910 may produce a reset error count (e.g., RSERC[0:x]) signal. The write error counter 2915 may produce a write error count (e.g., WRERC [0:x]) signal. The read error counter 2920 may produce a read error count (e.g., RDERC[0:x]) signal. For example, a 40-bit counter can count up to 1.1 e−12. In such case, x=39; i.e. RSERC[0:39], WRERC[0:39], and RDERC[0:39]. To save area, just one counter can be used for reset errors, write errors, and read errors. In such an embodiment, the 3-to-1 multiplexor shown in FIG. 30 is not needed and can be removed.

Figure 30:
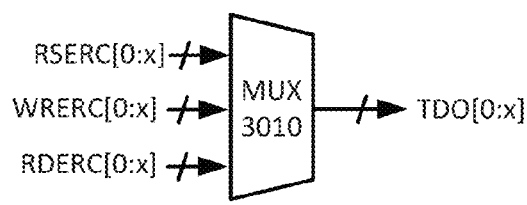

Referring to FIG. 30, a selector 3010 may select between the RSERC[0:x], WRERC[0:x], and RDERC[0:x] signals. The selected signal is output by the selector 3010 as the test data out (e.g., TDO[0:x]) signal. The selector 3010 can be, for example, a multiplexer.

Figure 31A:
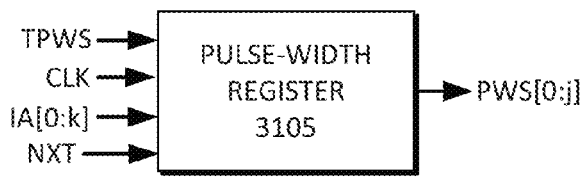

Referring to FIG. 31A, a pulse-width register 3105 can store a pulse-width. The pulse-width register 3105 can receive the TPWS signal, the CLK signal, the IA[0:k] signal, and/or the NXT signal. The pulse-width register 3105 can produce one or more pulse width (e.g., PWS[0:j]) signals. The pulse-width register 3105 provides the code to select the intended pulse width delay in the pulse width generator circuit. A 4-bit code, PWS[0:3] can select 16 different pulse widths, for example. Write error rates and read error rates depend on an amount of current flow through the memory cells. Embodiments of the inventive concept provide for programmable pulse widths and programmable $V_{bias}$ voltages.

Figure 31B:

Referring to FIG. 31B, a voltage regulator register 3110 can produce voltage level selector signals, VRG[0:j]. The voltage regulator register 3110 can receive the TVRG signal, the CLK signal, the IA[0:k] signal, and/or the NXT signal. The voltage regulator register 3110 can produce a code to select the voltage bias level in the voltage generator. For example, a 4-bit code, VRG[0:3], can select 16 different levels. A value stored in or otherwise generated by the voltage regulator register 3110 can be based on a reset error count, write error count, and/or read error count.

Figure 32:
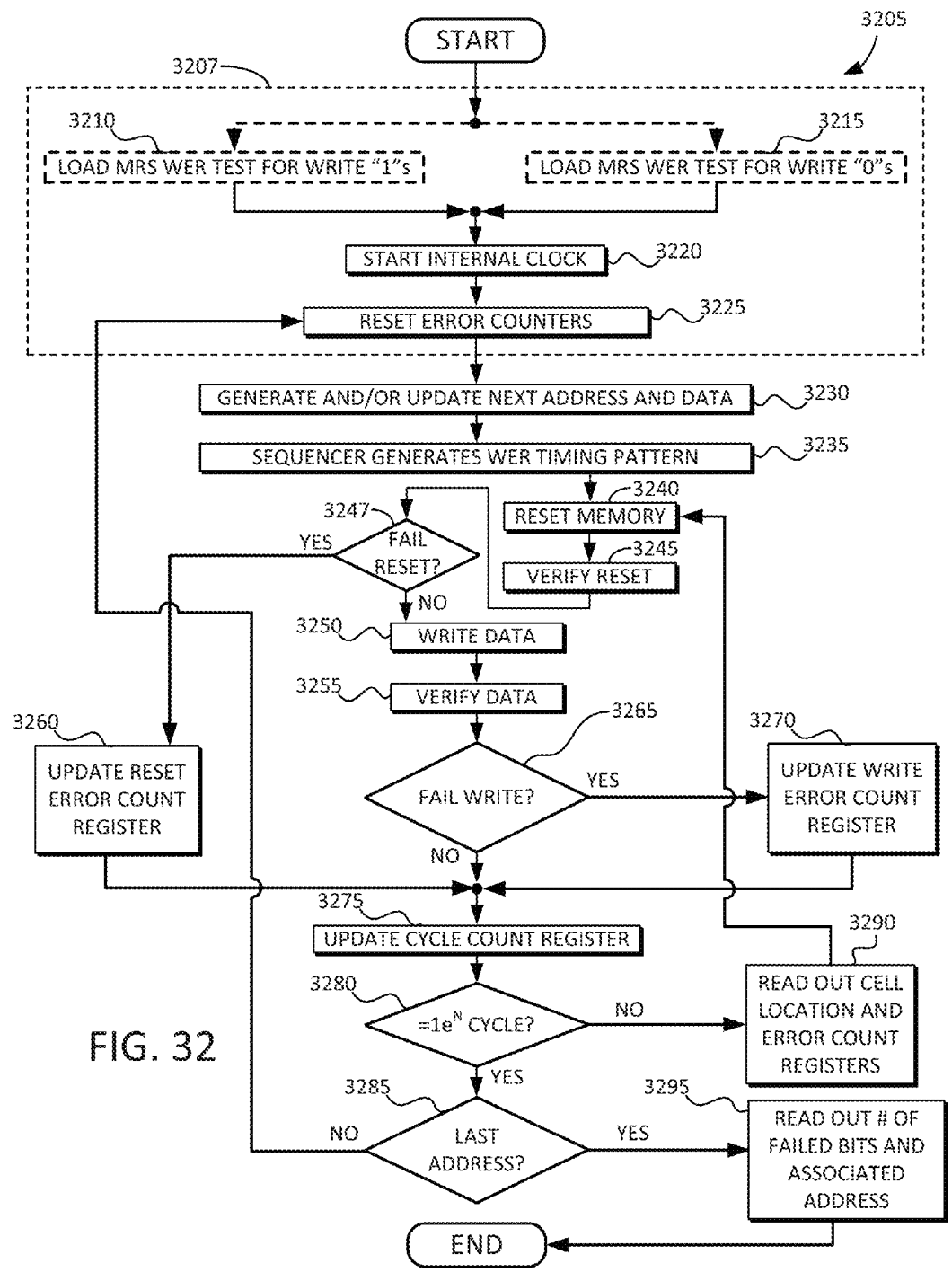
FIG. 32 is a flow chart illustrating steps of a performing a write error rate built-in self test, in accordance with inventive concepts.

FIG. 32 is a flow chart 3205 illustrating steps of a performing a write error rate built-in self test, in accordance with inventive concepts. The flow begins at start phase 3207 along one of two paths 3210 and 3215, where a mode register set command is loaded for a WER test for write "1"s (i.e., path 3210) or a mode register set command is loaded for a WER test for write "0"s (i.e., path 3215). At 3220, an internal clock is started. The flow proceeds to 3225, where the error counters are reset. All error counters and cycle counters should be reset the start of the test. After the start phase 3207, next address and data are generated and/or updated at 3230. At 3235, a sequencer generates a WER timing pattern. Thereafter, at 3240, 3245, 3250, and 3255, the memory is reset, reset is verified, data is written, and data is verified, respectively. For example, to write "1" data, memory is first reset to "0" (write "0" regardless of what is initially stored). Then memory is read to verify that "0"s were written. Then the actual write "1" is performed. Data is then read again to verify that "1"s were written. If the first reset failed, it means either the bit was stuck at "1", or that initial data was a "0" and flipped to "1", which is known as a back-hopping phenomenon. To determine if back-hopping occurs, the stuck bits must first be identified.

A check is made at 3247 after the reset is verified at 3245 whether or not the reset failed. If NO, the flow proceeds to 3250 for the write/verify operations. Otherwise, if YES, meaning the reset failed, then the flow proceeds directly to 3260 where the reset error count register is updated.

At 3265, resulting data is evaluated and a determination is made whether the write operation failed. If the write operation failed, the flow proceeds to 3270, where the write error count register is updated, after which the flow proceeds to 3275, where the cycle count register is updated. Otherwise, if the write operation succeeded, the flow converges at 3275, where the cycle count register is updated.

At 3280, a determination is made whether the number of cycles has reached $1\,e^N$. The value of N may be, for example, 15. If NO, the flow proceeds to 3290 where cell location (i.e., memory address), and error count are read out, after which the flow returns to 3240 for additional reset-verify-write-verify sequence testing. In most cases, multiple cells are tested at the same time with multiple DQ configuration (e.g., X8, X16, or X32, etc). With address compression, multiple bits per DQ can be tested simultaneously. Depending on the configuration, the resulting error rate may not be exact and the test time can be substantially reduced. The results may be read out, for example, through pre-assigned DQ pins either sequentially, in parallel, or in a combination thereof. Block 3290 may be optionally configured to be skipped in order to save test time, or enabled to debug or analyze test results at each step. Otherwise, if YES, meaning that the number of cycles is less than $1\,e^N$, the flow continues to 3285 where another determination is made whether the last address is reached. If YES, the flow proceeds to 3295 and the number of bits with WER more than $1\,e^{-N}$ (i.e., read out the number of failed bits) and their associated addresses are read out, after which the test is completed. As before, the results may be read out, for example, through pre-assigned DQ pins either sequentially, in parallel, or in a combination thereof. Otherwise, if NO, meaning the last address has not been reached, the flow returns to 3225 where the error counters are reset, and the test continues.

Figure 33:
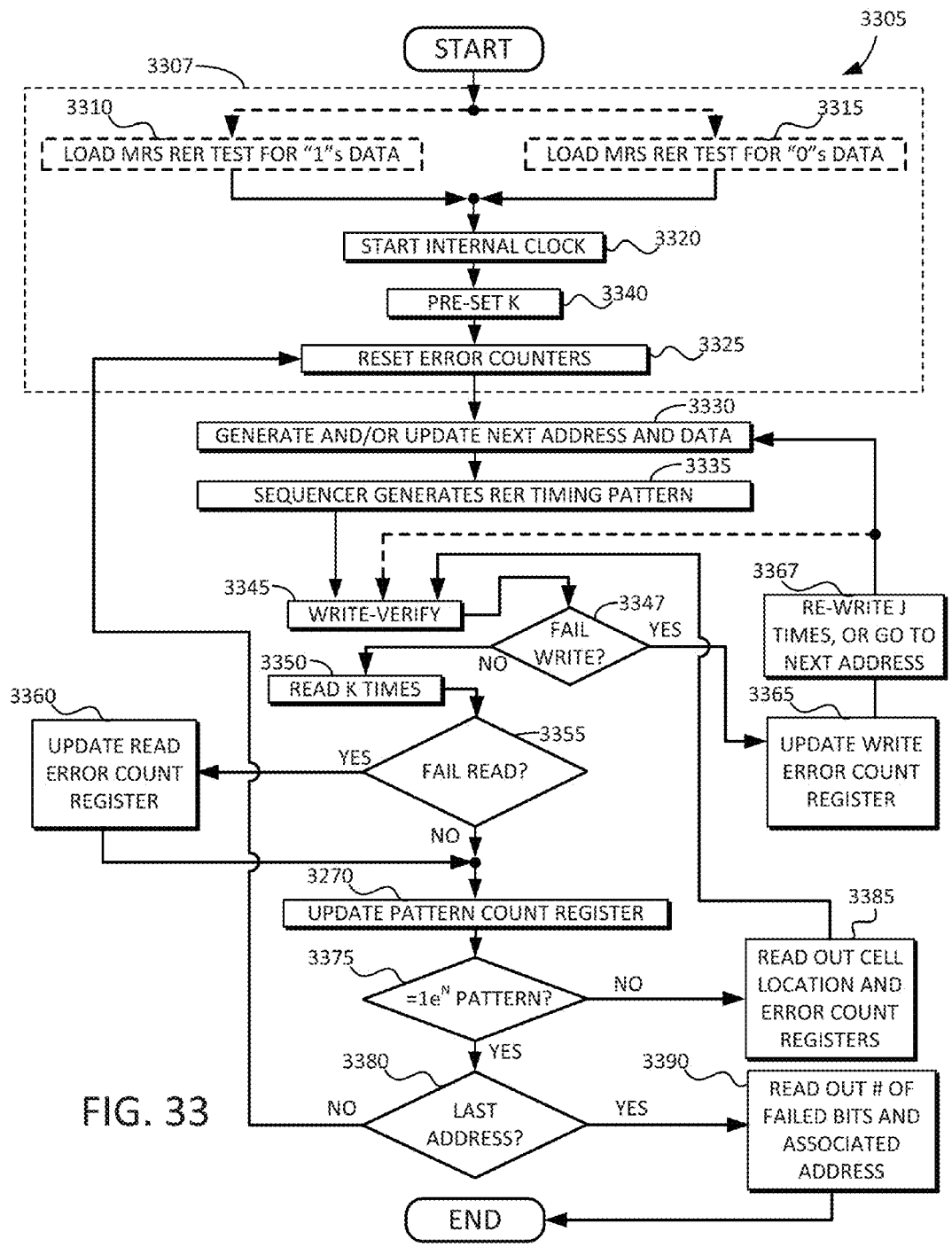
FIG. 33 is a flow chart illustrating steps of a performing a read error rate built-in self test, in accordance with inventive concepts.

FIG. 33 is a flow chart 3305 illustrating steps of a performing a read error rate built-in self test, in accordance with inventive concepts. The flow begins at start phase 3307 along one of two paths 3310 and 3315, where a mode register set command is loaded for a RER test for read "1"s (i.e., path 3310) or a mode register set command is loaded for a RER test for read "0"s (i.e., path 3315). At 3320, an internal clock is started. The flow proceeds to 3340 where a K value is pre-set, after which the flow proceeds to 3325, where error counters are reset. All error counters and cycle counters should be reset at the start of the test.

After the start phase 3307, next address and data are generated and/or updated at 3330. At 3335, a sequencer generates a RER timing pattern. Thereafter, at 3345 a write-verify operation is performed once.

After the write-verify operation at 3345, a determination is made at 3347 whether the write failed or not. If YES, the flow proceeds to 3365 where a write error count register is updated, and thereafter, the flow proceeds to 3367, which branches to 3330 for processing a next address, or takes an alternate route back to 3345 for another write-verify operation (which can be repeated for J re-write operations, where J is, for example, between 5 to 20 or thereabout). Otherwise, if NO, meaning the write did not fail, then the flow proceeds to 3350 where the stored bit is read K times.

At 3355, resulting data is evaluated and a determination is made whether the read operation failed. If the read operation failed, the flow proceeds to 3360, where the read error count register is updated. Otherwise, if the read operation succeeded, the flow converges at 3270 where the pattern count register is updated.

At 3375, a determination is made whether the number of patterns has reached $1\,e^N$. The value of N may be, for example, 15. The total read cycles may be, for example, N×K. If NO, the flow proceeds to 3385 where cell location and read error count registers are read out, after which the flow returns to 3345 write-verify sequence testing. The results may be read out, through pre-assigned DQ pins either sequentially, in parallel, or in a combination thereof. Otherwise, if YES, meaning that the number of patterns is less than $1\,e^N$, the flow continues to 3380 where another determination is made whether the last address is reached. If YES, the flow proceeds to 3390 and the number of bits with RER more than $1\,e^{-(N+K)}$ (i.e., read out the number of failed bits) and their associated addresses are read out, after which the test is completed. As before, the results may be read out, for example, through pre-assigned DQ pins either sequentially, in parallel, or in a combination thereof. Otherwise, if NO, meaning the last address has not been reached, then the flow returns to 3225 where the error counters are reset, and then to 3330, where the next address and data are generated and/or updated, and the test continues.

Figure 34:
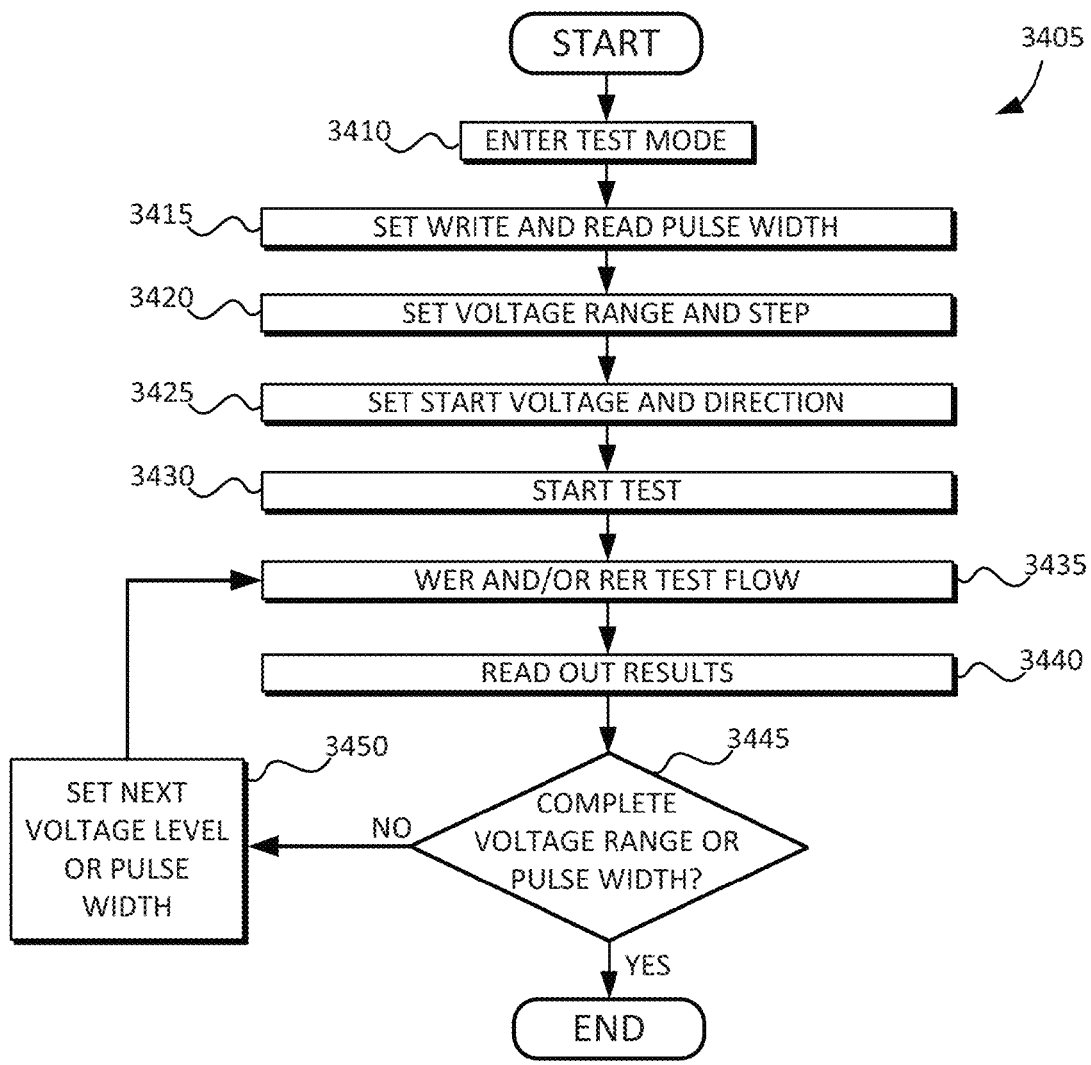
FIG. 34 is a flow chart illustrating steps of a performing a bit error rate built-in self test, in accordance with inventive concepts.

FIG. 34 is a flow chart 3405 illustrating steps of a performing a bit error rate built-in self test, in accordance with inventive concepts. The flow begins at 3410, where a test mode is entered, and either a WER test for data "0" or "1" is initiated or a RER test for data "0" or "1" is initiated. The flow proceeds to 3415, where the write and read pulse width are set. At 3420, a voltage range and step can be set. In other words, registers for read/write voltage range and voltage step can be configured. At 3425, a start voltage and direction can be set. For example, a start voltage and increment or decrement flag can be configured. At 3430, the test can be started. At 3435, the WER and/or RER test flow can be performed, as illustrated and described with reference to FIGS. 32 and 33. At 3440, results are read out, for example, through pre-assigned DQ pins either sequentially, in parallel, or in a combination thereof. At 3445, a determination is made whether the complete voltage range has been tested or whether the complete range of pulse width has been tested. If YES, the test is completed. Otherwise, if NO, meaning additional voltages within the voltage range are yet to be tested, or additional pulse widths are yet to be tested, the flow proceeds to 3450, where the test voltage can be set to the next programmed voltage level, or the pulse width can be set to the next programmed pulse width. The flow then returns to 3435 where additional WER and/or RER testing continues or is otherwise repeated.

In some embodiments, WER data can be plotted as probability of not switching (1/p) versus write voltage (or 1/p versus write pulse width); where p=probability of switching (not shown). Error count can be taken at each voltage or pulse width regardless of the previous error count. The write error rate can equal the write error count divided by the total valid write attempts. In this case, an invalid write attempt is the case where the reset has failed. A reset fail may mean two things: (1) the bit was stuck; or (2) back-hopping occurred. For example, in the case of a WER "0" being performed, "1" is first written (i.e., reset operation), then it is verified (i.e., expect to read "1"), then "0" is written, and it is expected that a "0" will thereafter be read. If the reset failed, then a "0" is read where a "1" was expected. The cycle that reset failed can be excluded from the WER calculations. If the initial state of the bit is "0", that means it didn't switch (or is otherwise stuck at "0"). If the initial state of the bit is "1", that means it switched to "0" even though "1" was being written. This is called back-hopping, which usually happens at higher write voltages. Furthermore, one can deduce that back-hopping occurs when both the reset and write cycles fail at the same time.

The RER case is similar although somewhat conceptually different in that the RER data can be plotted as probability of switching versus voltage or pulse width. Embodiments of the inventive concept allow all raw data to be read into the tester or microcontroller. The engineer or technician analyzing the data can decide what data to use.

Figure 35:
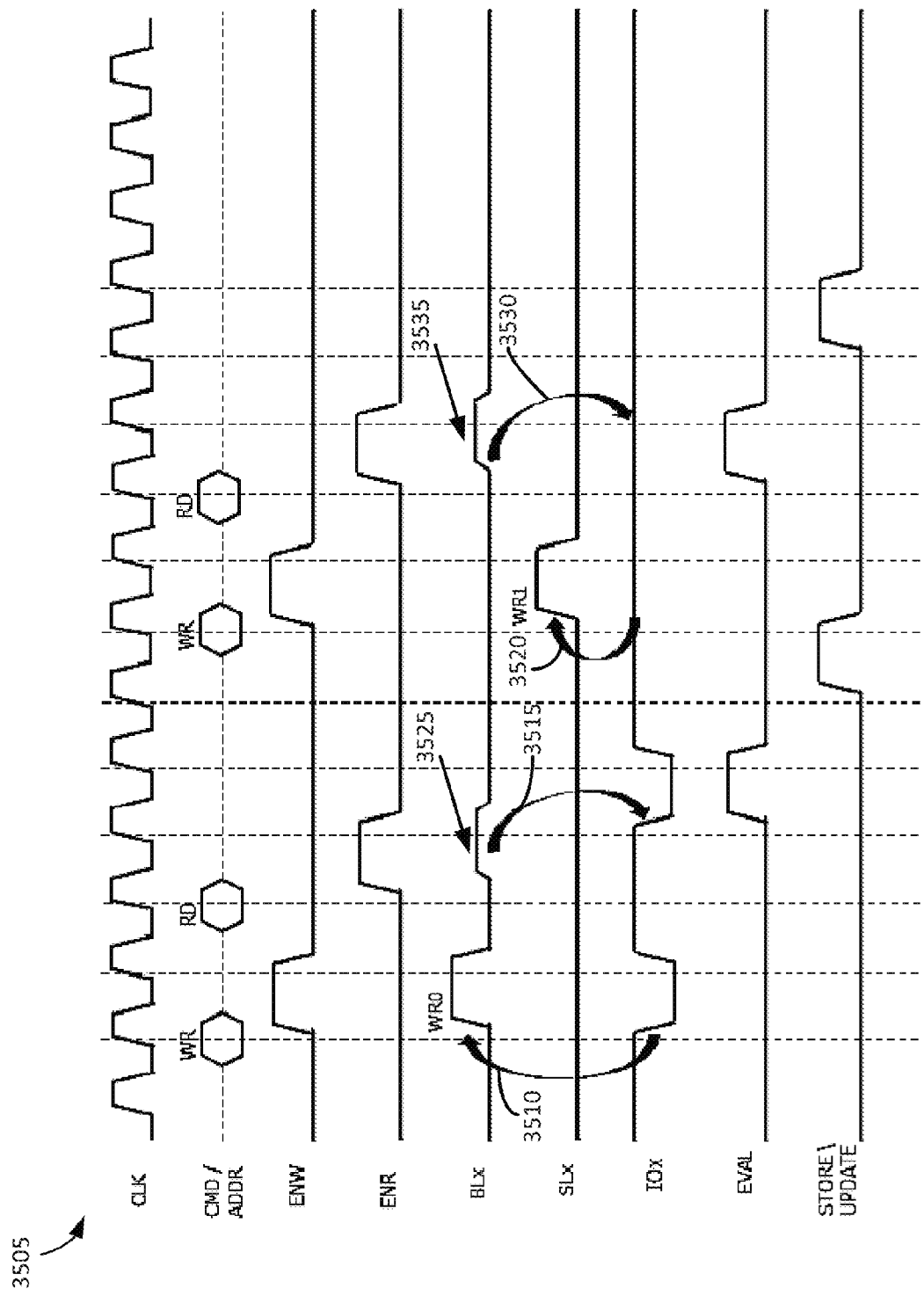
FIG. 35 is an example waveform timing diagram of a data "1" write error rate built-in self test, in accordance with inventive concepts.

FIG. 35 is an example waveform timing diagram 3505 of a data "1" WER built-in self test, in accordance with inventive concepts. As can be seen, a write command is followed by a read command, the sequence of which repeats. As can also be seen, when IOx is pulled low, bit line BLx is asserted at a relatively higher voltage level at 3510, and WR0 (i.e., "0") is written. The BLx is asserted at a relatively lower voltage level at 3525, and the data is read at 3515. At 3520, source line SLx is asserted at a relatively higher voltage level, and WR1 (i.e., "1") is written. Thereafter, the BLx is asserted at a relatively lower voltage level at 3535, and the data is read at 3530.

Although not shown, the data "1" RER built-in self test is similar, with the primary difference being that after the initial write, the read operation (e.g., at 3525, 3535) can be repeated for many times (e.g., 1,000 times, 10,000 times, etc.). Different patterns can be tested. For example, each pattern can be tested for 10,000 cycles. After the final cycle, the data value for the memory cell can be evaluated to determine whether the data was disturbed or not. Such test can be run, for example, overnight and checked in the morning to review and analyze the results.

Figure 36:
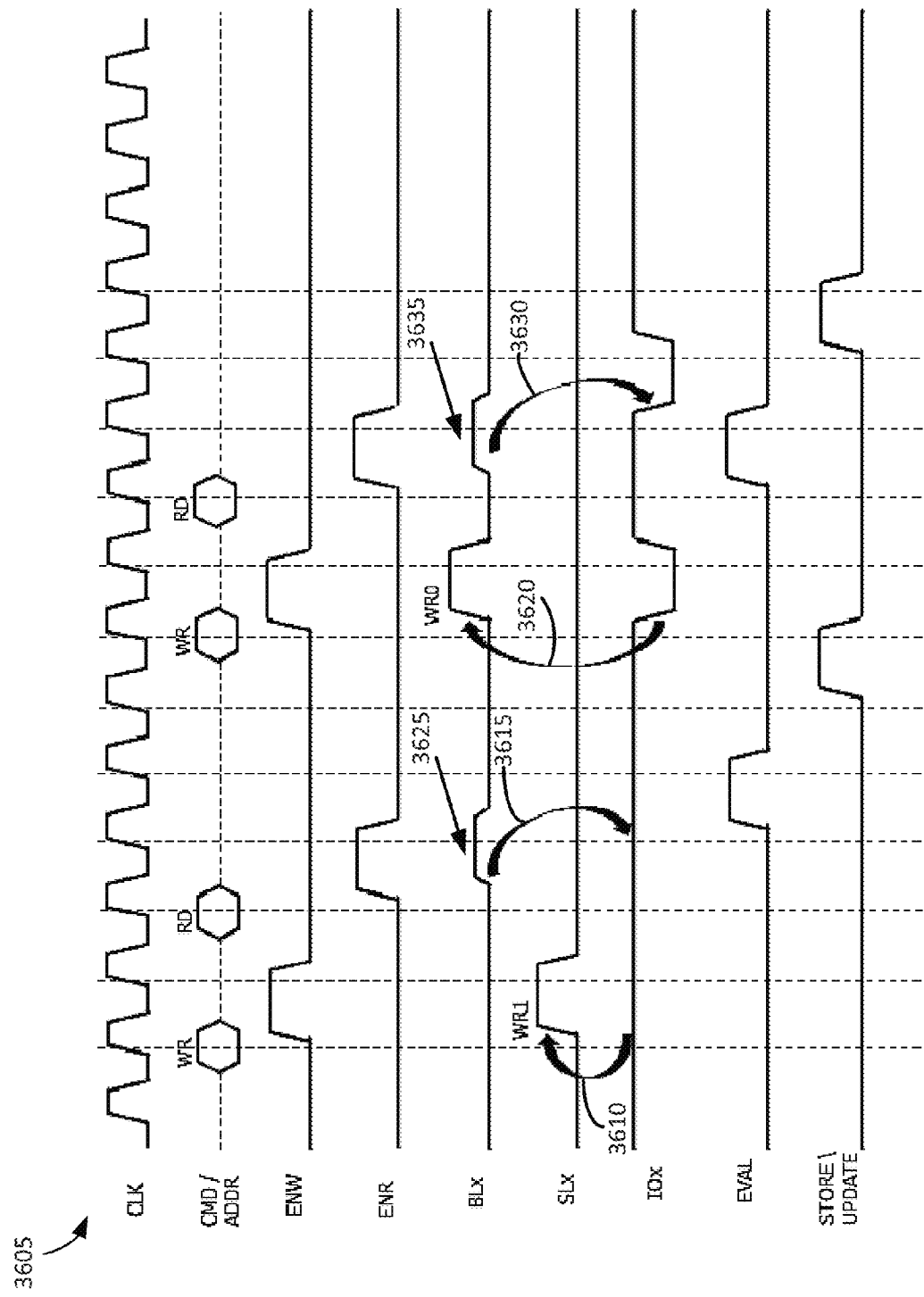
FIG. 36 is an example waveform timing diagram of a data "0" write error rate built-in self test, in accordance with inventive concepts.

FIG. 36 is an example waveform timing diagram 3605 of a data "0" WER built-in self test, in accordance with inventive concepts. As can be seen, a write command is followed by a read command, the sequence of which repeats. As can also be seen, when IOx is pulled high, source line SLx is asserted at a relatively higher voltage level at 3610, and WR1 (i.e., "1") is written. The BLx is asserted at a relatively lower voltage level at 3625, and the data is read at 3615. At 3620, bit line BLx is asserted at a relatively higher voltage level, and WR0 (i.e., "0") is written. Thereafter, the BLx is asserted at a relatively lower voltage level at 3635, and the data is read at 3630.

Although not shown, the data "0" RER built-in self test is similar, with the primary difference being that after the initial write, the read operation (e.g., at 3625, 3635) can be repeated for many times (e.g., 1,000 times, 10,000 times, etc.). Different patterns can be tested. For example, each pattern can be tested for 10,000 cycles. After the final cycle, the data value for the memory cell can be evaluated to determine whether the data was disturbed or not. Such test can be run, for example, overnight and checked in the morning to review and analyze the results.

Figure 37:
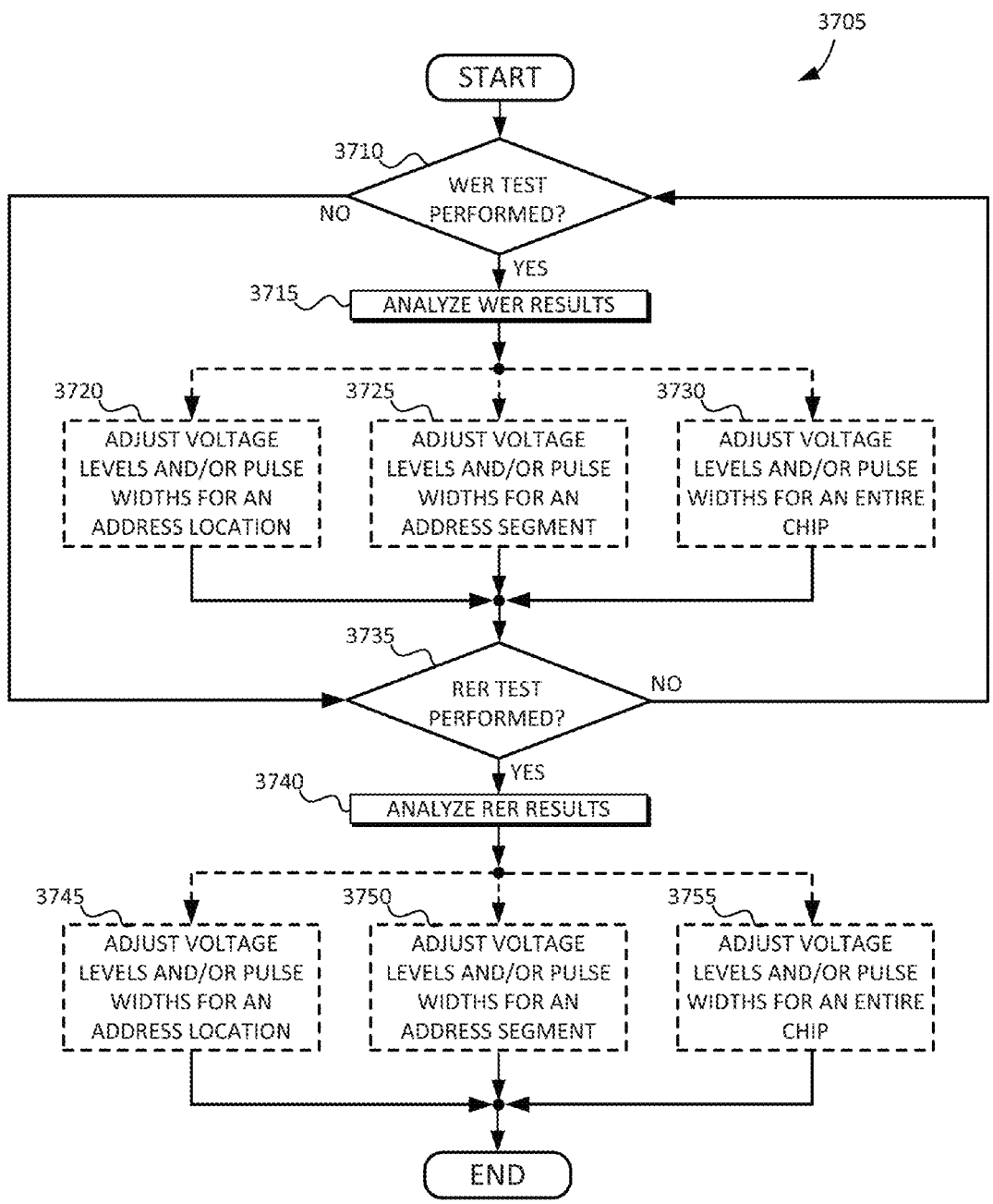
FIG. 37 is a flow chart illustrating steps of a performing a bit error rate built-in self test, in accordance with inventive concepts.

FIG. 37 is a flow chart 3705 illustrating steps of a performing a bit error rate built-in self test, in accordance with inventive concepts. The flow begins at 3710 where a determination is made whether a WER test was performed. If YES, the flow proceeds to 3715, where WER test results are analyzed. Thereafter, the voltage levels and/or pulse widths may be adjusted at 3720 for an address location. In an alternative embodiment, the voltage levels and/or pulse widths may be adjusted at 3725 for an address segment. In yet another alternative embodiment, the voltage levels and/or pulse widths may be adjusted at 3730 for an entire chip.

Otherwise, if NO, meaning that a WER test has not yet been performed, the flow proceeds to 3735, where a determination is made whether a RER test has been performed. If NO, the flow returns to 3710 for further determinations and processing. Otherwise, if YES, the flow proceeds to 3740, where RER test results are analyzed. Thereafter, the voltage levels and/or pulse widths may be adjusted at 3745 for an address location. In an alternative embodiment, the voltage levels and/or pulse widths may be adjusted at 3750 for an address segment. In yet another alternative embodiment, the voltage levels and/or pulse widths may be adjusted at 3755 for an entire chip. Analyzing the WER or RER data needs adequate processing power running an appropriate analytical software program. It may be more efficient to perform the analysis off chip. Such off chip analysis may be done in an SoC with this capability that is coupled to the memory (in the case of SiP), or on a tester computer (e.g., PC). The results of the analysis can be used to perform, for example, 3720, 3725, 3730, 3745, 3750, and 3755. In addition, the memory chip can be designed to have such features built-in.

It will be understood that the elements and determinations in the flow diagrams illustrated and described herein need not occur in the specific order as described, but rather, such elements and determinations can be made at different times or in a different order.

Figure 38:
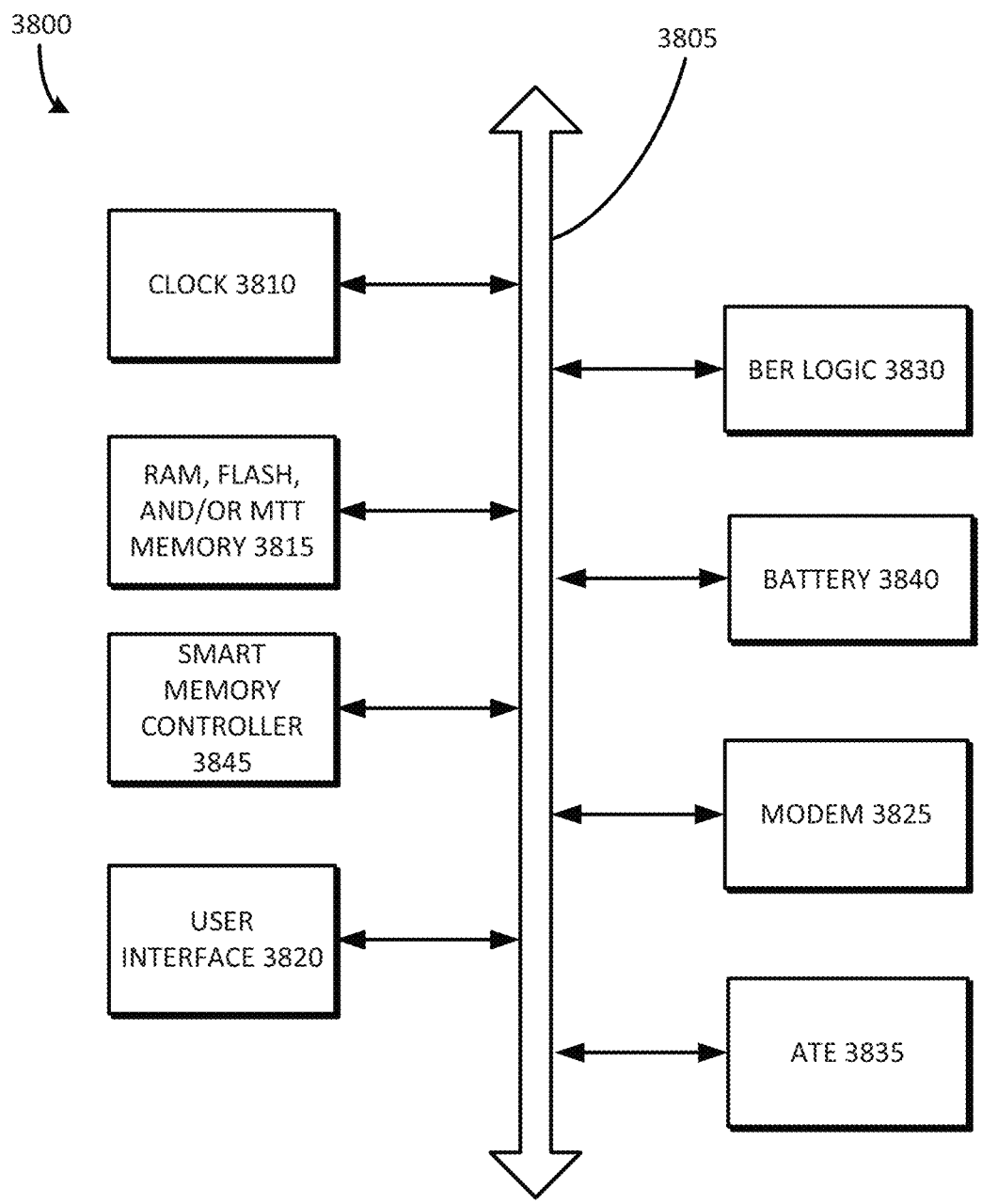
FIG. 38 is an example system diagram including bit error rate built-in self test generator and control logic, in accordance with inventive concepts.

FIG. 38 is an example system diagram 3800 including bit error rate built-in self test generator and control logic 3830, in accordance with inventive concepts. The BER control logic 3830 may be electrically connected to a system bus 3805. The computing system 3800 may also include a clock 3810, a random access memory (RAM), flash memory, or MTT memory 3815, a smart memory controller 3845, a user interface 3820, a modem 3825 such as a baseband chipset, and/or automated test equipment (ATE) 3835, any or all of which may be electrically coupled to the system bus 3805.

If the computing system 3800 is a mobile device, it may further include a battery 3840, which powers the computing system 3800. Although not shown in FIG. 38, the computing system 3800 may further include an application chipset, a camera image processor (CIS), a mobile DRAM, and the like. The smart memory controller 3845 and the memory 3815 may constitute a solid state drive/disk (SSD), which uses a nonvolatile memory to store data.

In example embodiments, the computing system 3800 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the inventive concepts as described herein.

It should be noted that the inventive concepts are not limited by any of the specific embodiments described in the foregoing summary, and that numerous other aspects and embodiments utilizing the present inventive concepts will be readily understood by those of ordinary skill in the art from the disclosures provided herein. Details of these and other embodiments are included in the detailed description and the accompanying drawings.

The foregoing illustrative embodiments are not to be construed as limiting the invention thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A method for providing a bit error rate built-in self test on a memory device, the method comprising:
   entering a test mode;
   internally generating, by the memory device, an error rate timing pattern;
   performing, by the memory device, the bit error rate built-in self test based on the internally generated error rate timing pattern; and
   measuring an error rate resulting from the bit error rate built-in self test;
   wherein performing the bit error rate built-in self test further comprises:
      receiving a mode register set command for a write error rate built-in self test;
      entering the test mode responsive to receiving the mode register set command;
      generating a next address;
      resetting a memory value at the next address by writing a "0";
      updating a cycle count register;
      determining whether or not a number of cycles based on the cycle count register has reached $1\,e^N$, wherein N is a positive integer; and
      in response to determining that the number of cycles has not reached $1\,e^N$:
         adjusting, based on the measured error rate, one or more test parameters; and
         repeating the bit error rate built-in self test,
         wherein repeating includes repeating the bit error rate built-in self test using the adjusted one or more test parameters.

2. The method of claim 1, wherein performing the bit error rate built-in self test further comprises:
   receiving the mode register set command for the write error rate built-in self test for write "1"s;
   reading the memory value at the next address and verifying that the "0" was written;
   determining whether the resetting of the memory value failed;
   in response to determining that the resetting failed, updating a reset error count register;
   in response to determining that the resetting did not fail:
      writing the memory value at the next address with a "1";
      reading the memory value at the next address and verifying that the "1" was written;
      determining whether the writing of the memory value at the next address with the "1" failed; and
      in response to determining that the writing failed, updating a write error count register.

3. The method of claim 2, wherein:
   performing the bit error rate built-in self test includes performing a write error rate test;
   measuring includes measuring a write error rate;
   adjusting includes adjusting, based on the measured write error rate, the one or more test parameters; and
   repeating includes repeating the write error rate test using the adjusted parameters.

4. The method of claim 2, wherein:
   performing the bit error rate built-in self test includes performing a read error rate test;
   measuring includes measuring a read error rate;

adjusting includes adjusting, based on the measured read error rate, the one or more test parameters; and repeating includes repeating the read error rate test using the adjusted parameters.

5. The method of claim 1, wherein entering the test mode further comprises:

receiving one or more mode register set commands; and entering the test mode responsive to the one or more mode register set commands.

6. The method of claim 1, further comprising:

receiving one or more mode register set commands; and configuring the one or more test parameters responsive to the one or more mode register set commands.

7. The method of claim 6, wherein configuring the one or more test parameters further comprises:

setting at least one of a start voltage, a voltage range, and a voltage step.

8. The method of claim 6, wherein configuring the one or more test parameters further comprises:

setting at least one of a test mode read pulse width and a test mode write pulse width.

9. The method of claim 1, wherein adjusting the one or more test parameters further comprises:

automatically setting a read voltage to a next programmed voltage level.

10. The method of claim 1, wherein adjusting the one or more test parameters further comprises:

automatically setting a write voltage to a next programmed voltage level.

11. The method of claim 1, further comprising:

automatically re-assigning memory space within the memory device when the measured error rate exceeds a predefined threshold.

12. A method for providing a bit error rate built-in self test on a memory device, the method comprising:

performing, by the memory device, at least one of a write error rate built-in self test and a read error rate built-in self test; and measuring an error rate resulting from at least one of the write error rate built-in self test and the read error rate built-in self test;

wherein performing the at least one of the write error rate built-in self test and the read error rate built-in self test further comprises:

receiving a mode register set command for the write error rate built-in self test;

entering a test mode responsive to receiving the mode register set command;

generating a next address;

resetting a memory value at the next address by writing a "0";

updating a cycle count register;

determining whether or not a number of cycles based on the cycle count register has reached 1 $e^N$, wherein N is a positive integer; and in response to determining that the number of cycles has not reached 1 $e^N$:

automatically adjusting, based on the measured error rate, one or more test parameters; and repeating the at least one of the write error rate built-in self test and the read error rate built-in self test, wherein repeating includes repeating the at least one of the write error rate built-in self test and the read error built-in self test using the adjusted one or more test parameters.

13. The method of claim 12, wherein automatically adjusting further comprises:

automatically adjusting a voltage level for an address location responsive to the measured error rate.

14. The method of claim 12, wherein automatically adjusting further comprises:

automatically adjusting a voltage level for an address segment responsive to the measured error rate.

15. The method of claim 12, wherein automatically adjusting further comprises:

automatically adjusting a voltage level for an entire chip associated with the memory device responsive to the measured error rate.

16. The method of claim 12, wherein automatically adjusting further comprises:

automatically adjusting a pulse width based on a next programmed test pulse width for an address location.

17. The method of claim 12, wherein automatically adjusting further comprises:

automatically adjusting a pulse width based on a next programmed test pulse width for an address segment.

18. The method of claim 12, wherein automatically adjusting further comprises:

automatically adjusting a pulse width based on a next programmed test pulse width for an entire chip associated with the memory device.

19. A memory device, comprising:

bit error rate control logic configured to control a bit error rate built-in self test;

an on-chip oscillator configured to generate an internal reference clock for the bit error rate built-in self test;

a write error rate test pattern generator configured to generate a write error test pattern for the bit error rate built-in self test; and a read error rate test pattern generator configured to generate a read error test pattern for the bit error rate built-in self test;

measuring an error rate resulting from at least one of the write error test pattern and the read error test pattern;

wherein the bit error rate control logic is configured to:

receive a mode register set command for the bit error rate built-in self test;

enter a test mode responsive to receiving the mode register set command;

generate a next address;

reset a memory value at the next address by writing a "0";

update a cycle count register;

determine whether or not a number of cycles based on the cycle count register has reached 1 $e^N$, wherein N is a positive integer; and in response to determining that the number of cycles has not reached 1 $e^N$:

automatically adjust, based on the measured error rate, one or more test parameters; and repeat the bit error rate built-in self test using the adjusted one or more test parameters.

20. The memory device of claim 19, further comprising:

logic configured to count cycles of the bit error rate built-in self test.

21. The memory device of claim 19, further comprising:

a write error rate cycle count register configured to store a number of write cycles; and a read error rate cycle count register configured to store a number of read cycles.

22. The memory device of claim 19, further comprising:
a pulse width generator circuit; and
a pulse width register configured to provide code to select an intended pulse width delay in the pulse width generator circuit.

23. The memory device of claim 19, further comprising:
a voltage generator; and
a voltage regulator register configured to produce a code to select a voltage bias level in the voltage generator.

24. The memory device of claim 23, further comprising:
a write error counter configured to count a number of write errors of the bit error rate built-in self test; and
a read error counter configured to count a number of read errors of the bit error rate built-in self test.

25. A system for providing a bit error rate built-in self test, comprising:
a bus;
a memory coupled to the bus; and
a smart memory controller, including:
bit error rate control logic configured to control a bit error rate built-in self test;
an on-chip oscillator configured to generate an internal reference clock for the bit error rate built-in self test;
a write error rate test pattern generator configured to generate a write error test pattern for the bit error rate built-in self test; and
a read error rate test pattern generator configured to generate a read error test pattern for the bit error rate built-in self test;
measuring an error rate resulting from at least one of the write error test pattern and the read error test pattern;
wherein the bit error rate control logic is configured to:
receive a mode register set command for the bit error rate built-in self test;
enter a test mode responsive to receiving the mode register set command;
generate a next address;
reset a memory value at the next address by writing a "0";
update a cycle count register;
determine whether or not a number of cycles based on the cycle count register has reached $1\ e^N$, wherein N is a positive integer; and
in response to determining that the number of cycles has not reached $1\ e^N$:
automatically adjust, based on the measured error rate, one or more test parameters; and
repeat the bit error rate built-in self test using the adjusted one or more test parameters.

26. The system of claim 25, wherein the smart memory controller further comprises:
logic configured to count cycles of the bit error rate built-in self test.

27. The system of claim 25, wherein the smart memory controller further comprises:
a write error rate cycle count register configured to store a number of write cycles; and
a read error rate cycle count register configured to store a number of read cycles.

28. The system of claim 25, wherein the smart memory controller further comprises:
a pulse width generator circuit; and
a pulse width register configured to provide code to select an intended pulse width delay in the pulse width generator circuit.

29. The system of claim 25, wherein the smart memory controller further comprises:
a voltage generator; and
a voltage regulator register configured to produce a code to select a voltage bias level in the voltage generator.

30. The system of claim 29, wherein the smart memory controller further comprises:
a write error counter configured to count a number of write errors of the bit error rate built-in self test; and
a read error counter configured to count a number of read errors of the bit error rate built-in self test.

* * * * *